(12) United States Patent
Doring et al.

(10) Patent No.: US 10,294,314 B2
(45) Date of Patent: May 21, 2019

(54) FUNCTIONALIZED ELASTOMERIC POLYMER COMPOSITIONS, THEIR PREPARATION METHODS AND CROSSLINKED RUBBER COMPOSITIONS THEREOF

(71) Applicant: Trinseo Europe GMBH, Horgen (CH)

(72) Inventors: Christian Doring, Markranstadt (DE); Sven Thiele, Halle (DE); Daniel Heidenreich, Halle (DE); Michael Rossle, Merseburg (DE)

(73) Assignee: TRINSEO EUROPE GMBH, Horgen (CH)

( * ) Notice: Subject to any disclaimer, the term of this patent is extended or adjusted under 35 U.S.C. 154(b) by 64 days.

(21) Appl. No.: 15/542,827

(22) PCT Filed: Dec. 30, 2015

(86) PCT No.: PCT/EP2015/081416
§ 371 (c)(1),
(2) Date: Jul. 11, 2017

(87) PCT Pub. No.: WO2016/113115
PCT Pub. Date: Jul. 21, 2016

(65) Prior Publication Data
US 2017/0369606 A1 Dec. 28, 2017

(30) Foreign Application Priority Data
Jan. 14, 2015 (EP) ..................... 15151112

(51) Int. Cl.
| | | |
|---|---|---|
| C08L 9/00 | (2006.01) | |
| C08F 8/42 | (2006.01) | |
| C08C 19/44 | (2006.01) | |
| C08F 236/10 | (2006.01) | |
| C08L 15/00 | (2006.01) | |
| C08L 9/06 | (2006.01) | |
| C08L 91/00 | (2006.01) | |
| C08K 3/04 | (2006.01) | |
| C08K 3/06 | (2006.01) | |
| C08K 3/22 | (2006.01) | |
| C08K 3/36 | (2006.01) | |
| C08K 5/09 | (2006.01) | |
| C08K 5/18 | (2006.01) | |
| C08K 5/31 | (2006.01) | |
| C08K 5/47 | (2006.01) | |
| C08K 5/548 | (2006.01) | |

(52) U.S. Cl.
CPC .............. *C08F 8/42* (2013.01); *C08C 19/44* (2013.01); *C08F 236/10* (2013.01); *C08L 9/00* (2013.01); *C08L 9/06* (2013.01); *C08L 15/00* (2013.01); *C08L 91/00* (2013.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/31* (2013.01); *C08K 5/47* (2013.01); *C08K 5/548* (2013.01); *C08L 2205/06* (2013.01)

(58) Field of Classification Search
CPC . C08K 5/548; C08K 3/06; C08K 3/22; C08K 3/36; C08K 5/09; C08K 5/18; C08K 5/31; C08K 5/47; C08F 8/42; C08F 236/10; C08F 4/488; C08L 9/00; C08L 9/06; C08L 91/00; C08L 15/00; C08L 2205/06; C08C 19/44
See application file for complete search history.

(56) References Cited

U.S. PATENT DOCUMENTS

| | | | |
|---|---|---|---|
| 3,629,213 A | 12/1971 | Onishi et al. | |
| 3,951,936 A | 4/1976 | Hanlon | |
| 4,172,100 A | 10/1979 | Tung et al. | |
| 4,172,190 A | 10/1979 | Tung et al. | |
| 4,689,368 A | 8/1987 | Jenkins | |
| 4,931,376 A | 6/1990 | Ikematsu et al. | |
| 4,982,029 A | 1/1991 | Chang | |
| 5,086,136 A | 2/1992 | Takashima et al. | |
| 5,089,574 A | 2/1992 | Castner | |
| 5,134,199 A * | 7/1992 | Hattori et al. ........ | C08F 297/04 525/250 |
| 5,448,002 A | 9/1995 | Castner | |
| 5,521,255 A | 5/1996 | Roy | |

(Continued)

FOREIGN PATENT DOCUMENTS

| | | |
|---|---|---|
| EP | 0 316 857 | 5/1989 |
| EP | 0 413 294 | 2/1991 |

(Continued)

OTHER PUBLICATIONS

Kim, J. et al., "Anionic Synthesis of Macromonomer Carrying Amino Group Using Diphenylethylene Derivative", *Functional Polymers*, vol. 704, May 8, 1998, pp. 85-95.
International Search Report in corresponding International Application No. PCT/EP2015/081416, dated Mar. 18, 2016, 4 pages.

*Primary Examiner* — Nathan M Nutter
(74) *Attorney, Agent, or Firm* — Barnes & Thornburg LLP; G. Peter Nichols

(57) ABSTRACT

The invention relates to an elastomeric polymer composition and its preparation. The polymer composition includes, in combination, a single terminally modified conjugated diene (co)polymer and a dual terminally modified conjugated diene (co)polymer. The polymer composition is useful in the preparation of a vulcanized and, thus, crosslinked elastomeric composition having relatively low hysteresis loss, good grip and low heat build-up properties.

21 Claims, 1 Drawing Sheet

(56) References Cited

U.S. PATENT DOCUMENTS

| | | |
|---|---|---|
| 5,561,210 A | 10/1996 | Roy |
| 5,753,579 A | 5/1998 | Jalics et al. |
| 5,753,761 A | 5/1998 | Sandstrom et al. |
| 5,834,573 A | 11/1998 | Castner |
| 6,018,007 A | 1/2000 | Lynch |
| 6,103,842 A | 8/2000 | Halasa et al. |
| 6,184,168 B1 | 2/2001 | Lynch |
| 6,229,036 B1 | 5/2001 | Batz-Sohn et al. |
| 6,310,152 B1 | 10/2001 | Castner |
| 6,489,415 B2 | 12/2002 | Hsu et al. |
| 6,617,406 B2 | 9/2003 | Castner |
| 6,627,715 B2 | 9/2003 | Halasa et al. |
| 6,693,160 B1 | 2/2004 | Halasa et al. |
| 6,984,687 B2 | 1/2006 | Henning et al. |
| 8,865,829 B2 * | 10/2014 | Nebhani et al. .......... B60C 1/00 524/575 |

FOREIGN PATENT DOCUMENTS

| | | |
|---|---|---|
| EP | 0 924 214 | 6/1999 |
| EP | 0 964 008 | 12/1999 |
| EP | 1 367 069 | 12/2003 |
| EP | 2 518 104 | 10/2012 |
| JP | 3889509 | 3/2007 |
| JP | 2009-256566 | 11/2009 |
| WO | WO 2007/047943 | 4/2007 |
| WO | WO 2009/148932 | 12/2009 |

* cited by examiner

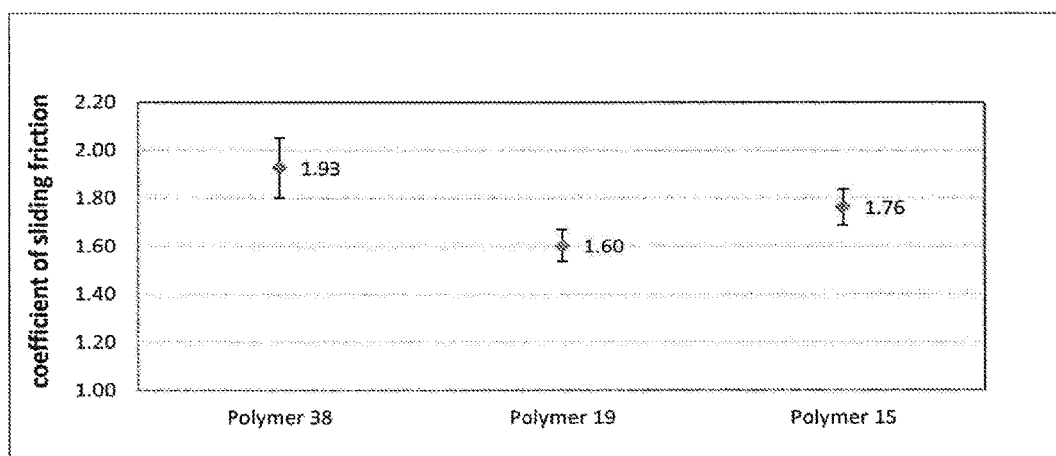

FUNCTIONALIZED ELASTOMERIC POLYMER COMPOSITIONS, THEIR PREPARATION METHODS AND CROSSLINKED RUBBER COMPOSITIONS THEREOF

This application claims priority to International Application No. PCT/EP2015/081416 filed Dec. 30, 2015 and to European Application No. 15151112.8 filed Jan. 14, 2015; the entire contents of each are incorporated herein by reference.

FIELD OF THE INVENTION

The invention relates to an elastomeric polymer composition and its preparation. The polymer composition comprises in combination a single terminally modified conjugated diene (co)polymer and a dual terminally modified conjugated diene (co)polymer. The polymer composition is useful in the preparation of a vulcanized and, thus, crosslinked elastomeric composition having relatively low hysteresis loss, good grip and low heat build-up properties. Such compositions are useful in many articles, including tire treads having low heat build-up and fuel consumption, in combination with a good balance of other desirable physical and chemical properties, for example, good wet grip, ice grip, abrasion resistance, tensile strength and excellent processability.

BACKGROUND OF THE INVENTION

The hysteretic energy loss of a rubber vulcanizate is commonly associated with the number of free polymer chain ends. For example a polymer with a high molecular weight exhibits a decreased weight content of the end groups and has a reduced hysteresis loss but also results in reduced processability of the rubber compounds. The functionalization of chain ends with polar groups suitable to interact with filler leads to a reduced amount of free chain ends and usually reduces hysteresis. Nevertheless, a high amount of chain end-filler interactions leads to a remarkably reduced workability of the compound.

Elastomeric polymers obtained by anionic polymerization processes mainly contain linear polymer chains. Highly linear elastomeric polymer chains show high solution viscosities and cold flow properties. To overcome these drawbacks, coupling processes have been applied to generate at least partially branching of the polymer chains. Commonly used coupling agents are divinylbenzene, halide or alkoxide compounds of tin or silicon. However, branched or star shaped polymers which result from such coupling reactions often exhibit increased hysteresis loss or decreased abrasion resistance.

WO 2007/047943 describes the use of a silane sulfide omega chain end modifier to produce a chain end-modified elastomeric polymer which is used as component in a vulcanized elastomeric polymer composition or a tire tread.

According to WO 2007/047943, a silane sulfide compound is reacted with anionically-initiated living polymers to produce "chain end-modified" polymers, which are subsequently blended with fillers, vulcanizing agents, accelerators or oil extenders to produce a vulcanized elastomeric polymer composition having low hysteresis loss.

The vulcanized elastomeric polymer compositions are described as exhibiting lower tan δ values at 60° C., particularly as compared to compounds based on corresponding non-modified polymers, without negatively affecting tan δ values at 0° C. and processing characteristics, such as compound Mooney values. Lower values of tan δ at 60° C. correspond to a lower rolling resistance, whereas a higher tan δ at 0° C. corresponds to an improved wet grip of a tire. Exemplary cured polymer formulations have been shown to result in reduced tan δ at 60° C. and heat build-up values but equivalent tan δ values at 0° C. They are described as being useful in preparing tire treads having lower rolling resistance, while maintaining good wet grip properties. Although cured rubber hysteresis properties can be improved significantly through application of the technology described in WO 2007/047943, the impact of the technology is limited due to the fact that only one polymer chain end can be functionalized by using the modifier compound described. Accordingly, there is a need for an efficient modification of the second polymer chain end.

EP 2 518 104 discloses a rubber composition for tire application comprising a diene monomer based polymer and silica. The diene polymer is prepared with an initiator to produce living polymer chains having two living polymer ends.

There is a need for modification methods and resulting polymers, including modified polymers, imparting an excellent balance of dynamic properties to crosslinked rubber compounds containing silica such as low hysteresis loss and high abrasion resistance, corresponding to a high wet grip, low rolling resistance and high abrasion resistance in tires, and maintain an acceptable or improved processability. Likewise, it is desirable to provide a polymer which exhibits good processability (a) during the manufacturing process of the polymer itself, for example due to low stickiness during the solvent and moisture removal process, and (b) in the course of the further processing steps such as preparation and processing of silica-filled rubber formulations. These needs have been met by the following invention.

SUMMARY OF THE INVENTION

In a first aspect, the present invention provides a polymer composition which, in its general embodiment (also referred to herein as "the first polymer composition"), comprises modified polymers according to the following Formula 1 and Formula 2:

wherein $P^1$ and $P^2$ are each independently a polymer chain obtainable by anionic polymerization of one or more polymerizable monomers selected from conjugated dienes and aromatic vinyl compounds, wherein each polymer chain $P^1$ and $P^2$ contains at least 40% by weight of repeating units obtained by polymerization of said conjugated dienes, and wherein at least the anionic polymerization for polymer chain $P^1$ is carried out in the presence of a compound of the following Formula 9a:

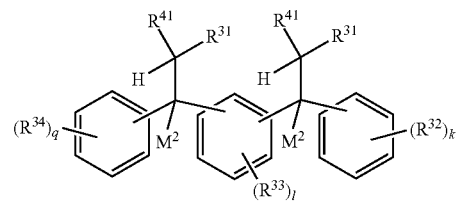

wherein each $R^{31}$ is independently selected from hydrogen, $(C_1-C_{10})$ alkyl, $(C_6-C_{12})$ aryl and $(C_7-C_{18})$ aralkyl; each $R^{32}$, $R^{33}$ and $R^{34}$ is independently selected from hydrogen, $(C_1-C_{18})$ alkyl and $(C_1-C_{18})$ alkoxy; each $R^{41}$ is independently selected from $(C_1-C_{100})$ alkyl and $(C_2-C_{100})$ alkenyl, wherein each $R^{41}$ is optionally substituted with one to three $(C_6-C_{12})$ aryl groups and is optionally bonded to the skeleton of Formula 9a via an oligomer chain composed of up to 25 monomer units selected from conjugated dienes, especially 1,3-butadiene and isoprene, and aromatic vinyl compounds, especially styrene and divinylbenzene; each $M^2$ is independently selected from lithium, sodium and potassium; and k, l and q are integers independently selected from 0, 1, 2 and 3;

$A^1$, $A^2$ and $A^3$ are independently selected from the following Formula 3 to Formula 8:

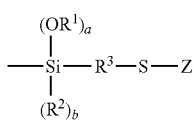

Formula 3 wherein
each $R^1$ is independently selected from $(C_1-C_{16})$ alkyl;
each $R^2$ is independently selected from $(C_1-C_{16})$ alkyl, $(C_6-C_{18})$ aryl and $(C_7-C_{18})$ aralkyl;
a and b are integers independently selected from 0, 1 and 2, with a+b=2;
$R^3$ is independently selected from divalent $(C_1-C_{16})$ alkyl, divalent $(C_6-C_{18})$ aryl, divalent $(C_7-C_{18})$ aralkyl and —$R^4$—O—$R^5$—, wherein $R^4$ and $R^5$ are independently selected from divalent $(C_1-C_6)$ alkyl; and
Z is independently selected from $(C_1-C_{16})$ alkyl, $(C_6-C_{18})$ aryl, $(C_7-C_{18})$ aralkyl, (C=S)—S—$R^6$, wherein $R^6$ is selected from $(C_1-C_{16})$ alkyl, $(C_6-C_{18})$ aryl and $(C_7-C_{18})$ aralkyl, and -$M^1(R^7)_c(R^8)_d$, wherein
$M^1$ is silicon or tin,
each $R^7$ is independently selected from $(C_1-C_{16})$ alkyl, $(C_6-C_{18})$ aryl and $(C_7-C_{18})$ aralkyl;
each $R^8$ is independently selected from —S—$R^3$—Si$(OR^1)_r(R^2)_s$, wherein $R^1$, $R^2$ and $R^3$ are as defined for Formula 3 above, r is an integer independently selected from 1, 2 and 3 and s is an independently integer selected from 0, 1 and 2, with r+s=3;
c is an integer independently selected from 2 and 3; d is an integer independently selected from 0 and 1; and c+d=3;

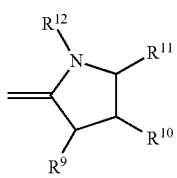

Formula 4

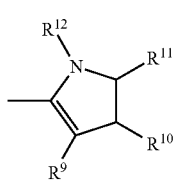

Formula 5 wherein $R^9$, $R^{10}$, $R^{11}$ and $R^{12}$ are independently selected from hydrogen, $(C_1-C_{16})$ alkyl, $(C_6-C_{16})$ aryl and $(C_7-C_{16})$ aralkyl;

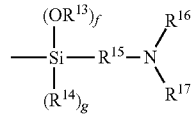

Formula 6

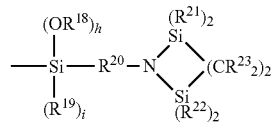

Formula 7 wherein each $R^{13}$, $R^{14}$, $R^{18}$ and $R^{19}$ is independently selected from $(C_1-C_{16})$ alkyl;
$R^{15}$ and $R^{20}$ are independently selected from divalent $(C_1-C_{16})$ alkyl, divalent $(C_6-C_{18})$ aryl, divalent $(C_7-C_{18})$ aralkyl and —$R^{24}$—O—$R^{25}$—, wherein $R^{24}$ and $R^{25}$ are independently selected from divalent $(C_1-C_6)$ alkyl;
$R^{16}$ and $R^{17}$ are independently selected from $(C_1-C_{16})$ alkyl and —$SiR^{26}R^{27}R^{28}$, wherein $R^{26}$, $R^{27}$ and $R^{28}$ are independently selected from $(C_1-C_{16})$ alkyl, $(C_6-C_{18})$ aryl and $(C_7-C_{18})$ aralkyl;
each $R^{21}$ and $R^{22}$ is independently selected from $(C_1-C_{16})$ alkyl, $(C_6-C_{18})$ aryl and $(C_7-C_{18})$ aralkyl;
each $R^{23}$ is independently selected from hydrogen and $(C_1-C_6)$ alkyl;
f, g, h and i are integers independently selected from 0, 1 and 2; f+g=2; and h+i=2;

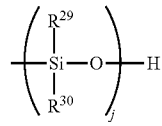

Formula 8 wherein each $R^{29}$ and $R^{30}$ is independently selected from $(C_1-C_{16})$ alkyl, $(C_6-C_{18})$ aryl, $(C_7-C_{18})$ aralkyl and vinyl; and
j is an integer selected from 1 to 200; and
wherein the amount of the polymer of Formula 1 is 15 to 85% by mole based on the total amount of polymer of Formula 1 and polymer of Formula 2.

The polymer composition of the invention may comprise one or more further components selected from (i) components which are added to or formed as a result of the polymerization process used for making the polymers of Formulae 1 and 2 and (ii) components which remain after solvent removal from the polymerization process. This embodiment of the first aspect of the invention is also referred to herein as "the second polymer composition". Components which are added to the polymerization process include, in particular, softeners (extender oils), stabilizers and polymers which are not a polymer of Formula 1 or Formula 2. Components which are formed as a result of the polymerization process and which remain after solvent removal from the polymerization process include, in particular, polymers which are not a polymer of Formula 1 or Formula 2.

The polymer composition of the invention (both first and second polymer composition) may also comprise one or more further components which are added after the polymerization process, including one or more fillers, one or more further polymers which are not a polymer of Formula 1 or Formula 2, and one or more crosslinking agents (vulcanizing agents). This embodiment of the first aspect of the invention is also referred to herein as "the third polymer composition". The components added after the polymerization are usually added to the polymer composition after solvent removal from the polymerization process, and are usually added with mechanical mixing.

In a second aspect, the present invention provides a method of preparing the polymer composition of the first aspect, said method comprising the steps of i) reacting a polymerization initiator mixture obtainable by reacting a compound of the following Formula 9:

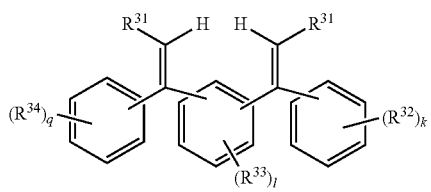

Formula 9 wherein each $R^{31}$ is independently selected from hydrogen, $(C_1-C_{10})$ alkyl, $(C_6-C_{12})$ aryl and $(C_7-C_{18})$ aralkyl; each $R^{32}$, $R^{33}$ and $R^{34}$ is independently selected from hydrogen, $(C_1-C_{18})$ alkyl and $(C_1-C_{18})$ alkoxy; k, l and q are integers independently selected from 0, 1, 2 and 3; with a compound of the following Formula 10

$$M^2-R^{41} \qquad \text{Formula 10}$$

wherein $M^2$ is selected from lithium, sodium and potassium and $R^{41}$ is selected from $(C_1-C_{100})$ alkyl and $(C_2-C_{100})$ alkenyl, wherein each $R^{41}$ is optionally substituted with one to three $(C_6-C_{12})$ aryl groups and is optionally bonded to $M^2$ via an oligomer chain composed of up to 25 monomer units selected from conjugated dienes, especially 1,3-butadiene and isoprene, and aromatic vinyl compounds, especially styrene and divinylbenzene;

with one or more polymerizable monomers selected from conjugated dienes and aromatic vinyl compounds to obtain living polymer chains, wherein the living polymer chains contain at least 40% by weight of repeating units obtained by polymerization of said conjugated dienes, and wherein the molar ratio of compounds of Formula 10 to compounds of Formula 9 is in the range of from 1:1 to 8:1, and ii) reacting the living polymer chains of step i) with one or more chain end-modifying agents selected from compounds of the following Formula 11 to Formula 15:

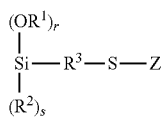

Formula 11 wherein $R^1$, $R^2$, $R^3$, Z, r and s are as defined for Formula 3 above;

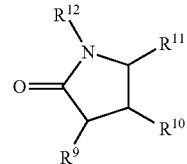

Formula 12 wherein $R^9$, $R^{10}$, $R^{11}$ and $R^{12}$ are as defined for Formula 4 above;

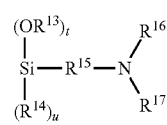

Formula 13 wherein $R^{13}$, $R^{14}$, $R^{15}$, $R^{16}$ and $R^{17}$ are as defined for Formula 6 above; t is an integer selected from 1, 2 and 3; u is an integer selected from 0, 1 and 2; and t+u=3;

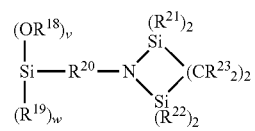

Formula 14 wherein $R^{18}$, $R^{19}$, $R^{20}$, $R^{21}$, $R^{22}$ and $R^{23}$ are as defined for Formula 7 above; v is an integer selected from 1, 2 and 3; w is an integer selected from 0, 1 and 2; and v+w=3;

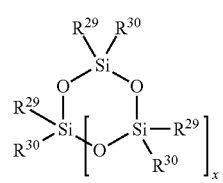

Formula 15 wherein each $R^{29}$ and $R^{30}$ is as defined for Formula 8 above; and x is an integer selected from 1 to 6; and wherein chain end-modifying agents of Formula 11 to Formula 15 are used in a total amount of
(i) 0.15 to 0.85 moles per mole of compounds of Formula 10 when the molar ratio of compounds of Formula 10 to compounds of Formula 9 is in the range of from 1:1 to 2.1:1, and
(ii) 0.5 to 3 moles per mole of compounds of Formula 10 when the molar ratio of compounds of Formula 10 to compounds of Formula 9 is in the range of from more than 2.1:1 to 8:1.

In a third aspect, the present invention provides a crosslinked polymer composition which is obtained by crosslinking a polymer composition of the invention which comprises one or more crosslinking (vulcanizing) agents.

In a fourth aspect, the present invention provides a method of preparing the crosslinked polymer composition of the third aspect, said method comprising the step of crosslinking a polymer composition which comprises one or more crosslinking agents.

In a fifth aspect, the present invention provides an article comprising at least one component formed from a cross-linked polymer composition of the invention. The article may be, for example, a tire, a tire tread, a tire side wall, an automotive part, a footwear component, a golf ball, a belt, a gasket, a seal or a hose.

DRAWING

The FIGURE shows sliding friction coefficients of polymer examples.

DETAILED DESCRIPTION OF THE INVENTION

Polymerization Initiator Mixture and Preparation Method

The polymerization initiator for making the polymer composition of the first aspect of the invention is the reaction product of a compound of Formula 9 with a compound of Formula 10. The reaction product is a dianionic compound of Formula 9a as defined above having at least two carbanions which are each linked to a metal atom $M^2$. Typical structures and preparation methods for such product are described, for example, in EP 0 316 857, U.S. Pat. Nos. 4,172,190, 5,521,255, 5,561,210 and EP 0 413 294.

In one embodiment of the compound of Formula 9a and of the underlying reaction between a compound of Formula 9 and a compound of Formula 10, $M^2$ is lithium;

$R^{41}$ is selected from $(C_1-C_{10})$ alkyl;

each $R^{31}$ is independently selected from hydrogen and $(C_1-C_{10})$ alkyl, preferably hydrogen;

$R^{32}$ and $R^{34}$ are identical and are selected from hydrogen and $(C_1-C_{18})$ alkyl;

each $R^{33}$ is independently selected from hydrogen and $(C_1-C_{18})$ alkyl;

all other substituents or groups are as generally defined for Formula 9 and Formula 10.

Specific preferred species of the compound of Formula 9 include the following compounds:

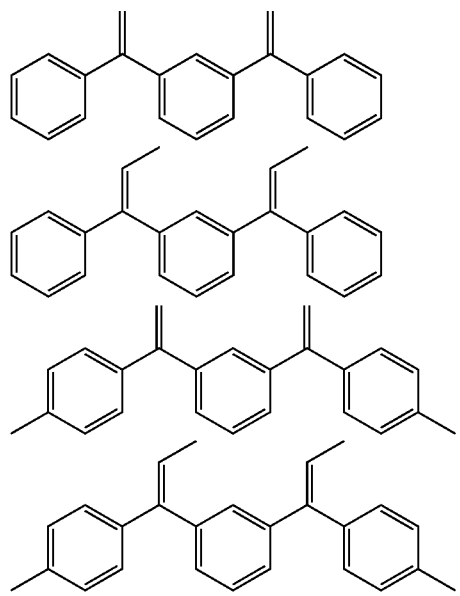

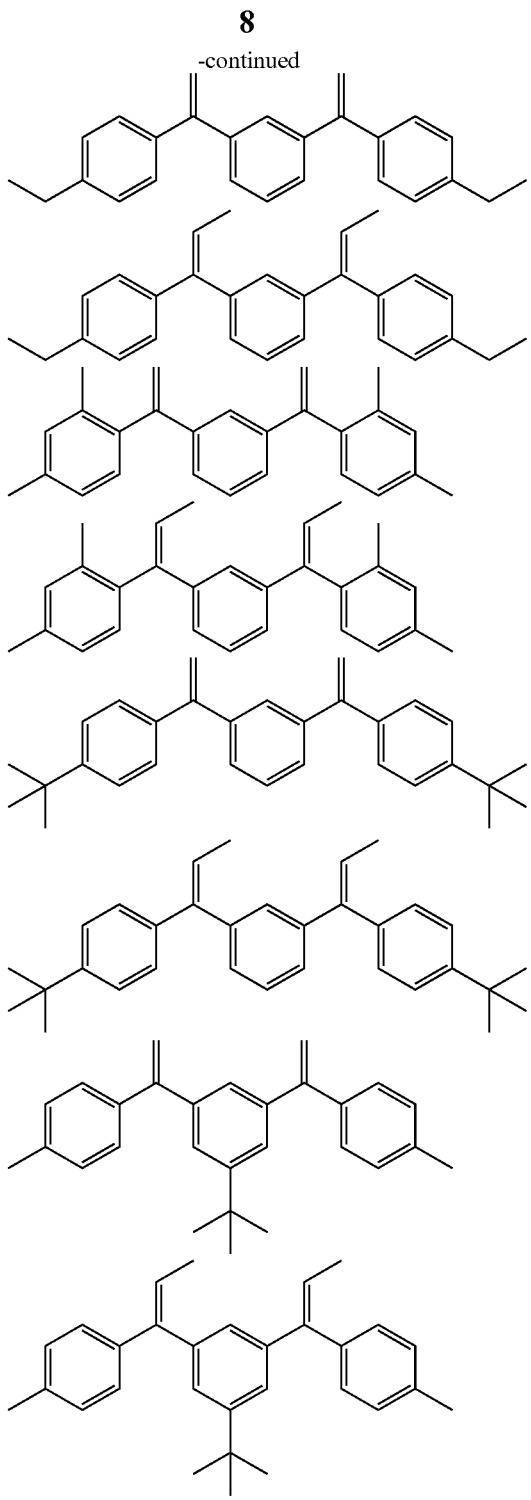

Specific preferred species of the compound of Formula 10 include the following compounds:

methyllithium, ethyllithium, propyllithium, n-butyllithium, sec-butyllithium, tert-butyllithium, phenyllithium, hexyllithium, preferably n-butyllithium and sec-butyllithium.

Specific preferred species of the compound of Formula 9a include those obtainable by reacting one or more of the above specific preferred species of the compound of Formula 9 with one or more of the above specific preferred species of the compound of Formula 10.

The molar ratio in the reaction between the compound of Formula 10 and the compound of Formula 9 is in the range of from 1:1 to 8:1, preferably from 1.5:1 to 8:1 and more preferably from 2:1 to 6:1. At a ratio below 1:1, the amount of the compound of Formula 9 remaining after the reaction with the compound of Formula 10 may cause significant gelation during the polymerization process. At a ratio above 8:1, the amount of the compound of Formula 10 remaining after the reaction with the compound of Formula 9 will lead to less than 15% of the polymer of Formula 1 (based on the total amount of polymer of Formula 1 and polymer of Formula 2).

In one embodiment, 1 to 2.1 equivalents of the compound of Formula 10 are reacted with one equivalent of the compound of Formula 9. In this case (accounting for experimental error), the complete amount of the compound of Formula 10 reacts with the compound of Formula 9. In the subsequent preparation of the polymer composition of the present invention, it is then necessary to use a less than molar (less than equivalent) amount of chain end-modifying agents of Formula 11 to Formula 15 relative to the molar amount of the compound of Formula 9 in order to obtain a composition comprising polymers of both Formula 1 and Formula 2.

In an alternative embodiment, more than 2.1 and up to 8 equivalents of the compound of Formula 10 are reacted with one equivalent of a compound of Formula 9, thus obtaining a mixture (composition) of a dianionic initiator (of Formula 9a) and a monoanionic initiator (remaining amount of compound of Formula 10). In such case, the molar amount of chain end-modifying agents of Formula 11 to Formula 15 to be used in the preparation of the polymer composition of the present invention can be less than, equal to or more than the molar amount of the compound of Formula 9 (corresponding to the molar amount of the compound of Formula 9a). A preferred molar ratio of the compound of Formula 10 to the compound of Formula 9 in this embodiment is in the range of from more than 2.1:1 to 7:1, more preferably from more than 2.1:1 to 6:1, even more preferably from 2.5:1 to 3.5:1, or approximately 3:1.

The method for making the polymerization initiator mixture comprises the step of reacting an initiator precursor compound of Formula 9 with at least one compound of Formula 10, optionally in the presence of a Lewis base. The reaction is preferably performed in a nonpolar solvent, including hydrocarbon solvent, including aliphatic and aromatic solvent, preferably aliphatic solvent, such as hexane, heptane, pentane, isopar, cyclohexane and methylcyclohexane, and is usually carried out for a period of from 2 seconds to 10 days, preferably from 5 seconds to 5 days, even more preferably from 10 seconds to 2 days, at a temperature ranging from −60° C. to 130° C., preferably from 0° C. to 100° C. and even more preferably from 20° C. to 70° C.

In one embodiment, the compound of Formula 10 can be reacted, prior to the reaction with a compound of Formula 9, with up to 25 monomer molecules selected from conjugated dienes, especially 1,3-butadiene and isoprene, and aromatic vinyl compounds, especially styrene. The resulting "oligomer", which is within the scope of Formula 10, is subsequently reacted with the initiator precursor compound of Formula 9, as described herein.

The optional Lewis base may be added to the precursor compound of Formula 9 prior to the addition of and reaction with the compound of Formula 10, so as to be present in the reaction from the beginning Alternatively, it may be added during the reaction or after completion of the reaction. Any of these alternative additions will result in the formation of a Lewis base adduct with the reaction product, i.e. with a compound of Formula 9a. When a Lewis base is present, it is usually used at a ratio of initiator precursor compound of Formula 9 to Lewis base in terms of mole equivalents of from 0.01 to 20, preferably from 0.05 to 5.0 and even more preferably from 0.1 to 3.0.

For increasing the storage stability (shelf life) of the polymerization initiator mixture, it is possible to contact the resulting reaction mixture containing the polymerization initiator mixture and including alkali metal $M^2$ with one or more polymerizable monomers selected from conjugated diene monomers, especially selected from butadiene and isoprene, and aromatic vinyl compounds, especially styrene. For this purpose, an amount of up to 1000 equivalents, preferably up to 200 equivalents, most preferably up to 75 equivalents of polymerizable monomer per alkali metal equivalent is suitably used.

Polymer Composition

The polymer composition of the first aspect of the invention comprises modified elastomeric polymers according to Formula 1 and Formula 2 as defined herein. Generally, the amount of polymer of Formula 1 is 15-85% by mole based on the total amount of polymer of Formula 1 and polymer of Formula 2. If the amount of polymer of Formula 1 is more than 85% by mole, the processability of the polymer composition, when additionally containing one or more fillers, may be negatively affected. If the amount of polymer of Formula 1 is less than 15% by mole, the performance of a crosslinked polymer composition of the invention may be negatively affected, particularly in terms of rolling resistance.

Specific preferred embodiments of the polymer of Formula 1 include, but are not limited to the following structures (with $P^1$ being as defined herein):

[Me$_3$Si—S—(CH$_2$)$_3$—Si(OMe)(Me)]$_2$P$^1$, [Me$_3$Si—S—(CH$_2$)$_3$—Si(OEt)(Me)]$_2$P$^1$,
[Me$_3$Si—S—(CH$_2$)$_3$—Si(OMe)$_2$]$_2$P$^1$, [Me$_3$Si—S—(CH$_2$)$_3$—Si(OEt)$_2$]$_2$P$^1$,
[Me$_3$Si—S—(CH$_2$)$_3$—Si(OPr)(Me)]$_2$P$^1$, [Me$_3$Si—S—(CH$_2$)$_3$—Si(OBu)(Me)]$_2$P$^1$,
[Me$_3$Si—S—(CH$_2$)$_3$—Si(OPr)$_2$]$_2$P$^1$, [Me$_3$Si—S—(CH$_2$)$_3$—Si(OBu)$_2$]$_2$P$^1$,
[Et$_3$Si—S—(CH$_2$)$_3$—Si(OMe)(Me)]$_2$P$^1$, [Et$_3$Si—S—(CH$_2$)$_3$—Si(OEt)(Me)]$_2$P$^1$,
[Et$_3$Si—S—(CH$_2$)$_3$—Si(OMe)$_2$]$_2$P$^1$, [Et$_3$Si—S—(CH$_2$)$_3$—Si(OEt)$_2$]$_2$P$^1$,
[Et$_3$Si—S—(CH$_2$)$_3$—Si(OPr)(Me)]$_2$P$^1$, [Et$_3$Si—S—(CH$_2$)$_3$—Si(OBu)(Me)]$_2$P$^1$,
[Et$_3$Si—S—(CH$_2$)$_3$—Si(OPr)$_2$]$_2$P$^1$, [Et$_3$Si—S—(CH$_2$)$_3$—Si(OBu)$_2$]$_2$P$^1$,
[(Bu)Me$_2$Si—S—(CH$_2$)$_3$—Si(OMe)(Me)]$_2$P$^1$, [(Bu)Me$_2$Si—S—(CH$_2$)$_3$—Si(OEt)(Me)]$_2$P$^1$,
[(Bu)Me$_2$Si—S—(CH$_2$)$_3$—Si(OMe)$_2$]$_2$P$^1$, [(Bu)Me$_2$Si—S—(CH$_2$)$_3$—Si(OEt)$_2$]$_2$P$^1$,
[(Bu)Me$_2$Si—S—(CH$_2$)$_3$—Si(OPr)(Me)]$_2$P$^1$, [(Bu)Me$_2$Si—S—(CH$_2$)$_3$—Si(OBu)(Me)]$_2$P$^1$,
[(Bu)Me$_2$Si—S—(CH$_2$)$_3$—Si(OPr)$_2$]$_2$P$^1$, [(Bu)Me$_2$Si—S—(CH$_2$)$_3$—Si(OBu)$_2$]$_2$P$^1$,
[Me$_3$Si—S—(CH$_2$)—Si(OMe)$_2$]$_2$P$^1$, [Me$_3$Si—S—(CH$_2$)—Si(OEt)$_2$]$_2$P$^1$,
[Me$_3$Si—S—(CH$_2$)$_2$—Si(OMe)$_2$]$_2$P$^1$, [Me$_3$Si—S—(CH$_2$)$_2$—Si(OEt)$_2$]$_2$P$^1$,
[Me$_3$Si—S—(CH$_2$)—Si(OMe)(Me)]$_2$P$^1$, [Me$_3$Si—S—(CH$_2$)—Si(OEt)(Me)]$_2$P$^1$,
[Me$_3$Si—S—(CH$_2$)$_2$—Si(OMe)(Me)]$_2$P$^1$, [Me$_3$Si—S—(CH$_2$)$_2$—Si(OEt)(Me)]$_2$P$^1$,

[Me₃Si—S—(CH₂)—C(H)Me-(CH₂)—Si(OMe)₂]₂P¹,
[Me₃Si—S—(CH₂)—C(H)Me-(CH₂)—Si(OEt)₂]₂P¹,
[Me₃Si—S—(CH₂)—C(H)Me-(CH₂)—Si(OMe)(Me)]₂P¹,
[Me₃Si—S—(CH₂)—C(H)Me-(CH₂)—Si(OEt)(Me)]₂P¹,
[(Bu)Me₂Si—S—(CH₂)—Si(OMe)₂]₂P¹,
[(Bu)Me₂Si—S—(CH₂)—Si(OEt)₂]₂P¹, [(Bu)Me₂Si—S—(CH₂)₂—Si(OMe)₂]₂P¹,
[(Bu)Me₂Si—S—(CH₂)₂—Si(OEt)₂]₂P¹, [(Bu)Me₂Si—S—(CH₂)—Si(OMe)(Me)]₂P¹,
[(Bu)Me₂Si—S—(CH₂)—Si(OEt)(Me)]₂P¹, [(Bu)Me₂Si—S—(CH₂)₂—Si(OMe)(Me)]₂P¹,
[(Bu)Me₂Si—S—(CH₂)₂—Si(OEt)(Me)]₂P¹, [(Bu)Me₂Si—S—(CH₂)—C(H)Me-(CH₂)—Si(OMe)₂]₂P¹,
[(Bu)Me₂Si—S—(CH₂)—C(H)Me-(CH₂)—Si(OEt)₂]₂P¹,
[(Bu)Me₂Si—S—(CH₂)—C(H)Me-(CH₂)—Si(OMe)(Me)]₂P¹,
[(Bu)Me₂Si—S—(CH₂)—C(H)Me-(CH₂)—Si(OEt)(Me)]₂P¹,
[Me₃Si—S—C(H)Me-(CH₂)₂—Si(OMe)₂]₂P¹, [Me₃Si—S—C(H)Me-(CH₂)₂—Si(OEt)₂]₂P¹,
[Me₃Si—S—C(H)Me-(CH₂)₂—Si(OMe)(Me)]₂P¹,
[Me₃Si—S—C(H)Me-(CH₂)₂—Si(OEt)(Me)]₂P¹,
[(Bu)Me₂Si—S—C(H)Me-(CH₂)₂—Si(OMe)₂]₂P¹, [(Bu)Me₂Si—S—C(H)Me-(CH₂)₂—Si(OEt)₂]₂P¹,
[(Bu)Me₂Si—S—C(H)Me-(CH₂)₂—Si(OMe)(Me)]₂P¹,
[(Bu)Me₂Si—S—C(H)Me-(CH₂)₂—Si(OEt)(Me)]₂P¹,
[Me₃Si—S—(CH₂)₁₁—Si(OMe)₂]₂P¹,
[Me₃Si—S—(CH₂)₁₁—Si(OEt)₂]₂P¹, [Me₃Si—S—(CH₂)₁₁—Si(OMe)(Me)]₂P¹,
[Me₃Si—S—(CH₂)₁₁—Si(OEt)(Me)]₂P¹, [(Bu)Me₂Si—S—(CH₂)₁₁—Si(OMe)₂]₂P¹,
[(Bu)Me₂Si—S—(CH₂)₁₁—Si(OEt)₂]₂P¹, [(Bu)Me₂Si—S—(CH₂)₁₁—Si(OMe)(Me)]₂P¹,
[(Bu)Me₂Si—S—(CH₂)₁₁—Si(OEt)(Me)]₂P¹,
[(MeO)₃Si—(CH₂)₃—S—Si(Me)₁-S—(CH₂)₃—Si(OMe)₂]₂P¹,
[(MeO)₃Si—(CH₂)₃—S—Si(Me)₁-S—(CH₂)₃—Si(OMe)₂]₂P¹,
[(MeO)₃Si—(CH₂)₃—S—Si(Bu)₂-S—(CH₂)₃—Si(OMe)₂]₂P¹,
[(EtO)₃Si—(CH₂)₃—S—Si(Me)₁-S—(CH₂)₃—Si(OEt)₂]₂P¹,
[(EtO)₃Si—(CH₂)₃—S—Si(Et)₂-S—(CH₂)₃—Si(OEt)₂]₂P¹,
[(EtO)₃Si—(CH₂)₃—S—Si(Bu)₂-S—(CH₂)₃—Si(OEt)₂]₂P¹,
[(PrO)₃Si—(CH₂)₃—S—Si(Me)₁-S—(CH₂)₃—Si(OPr)₂]₂P¹,
[(PrO)₃Si—(CH₂)₃—S—Si(Et)₂-S—(CH₂)₃—Si(OPr)₂]₂P¹,
[(PrO)₃Si—(CH₂)₃—S—Si(Bu)₂-S—(CH₂)₃—Si(OPr)₂]₂P¹,
[(BuO)₃Si—(CH₂)₃—S—Si(Me)₁-S—(CH₂)₃—Si(OBu)₂]₂P¹,
[(BuO)₃Si—(CH₂)₃—S—Si(Et)₂-S—(CH₂)₃—Si(OBu)₂]₂P¹,
[(BuO)₃Si—(CH₂)₃—S—Si(Bu)₂-S—(CH₂)₃—Si(OBu)₂]₂P¹,
[(Me)(MeO)₂Si—(CH₂)₃—S—Si(Me)₁-S—(CH₂)₃—Si(Me)(OMe)]₂P¹,
[(Me)(MeO)₂Si—(CH₂)₃—S—Si(Et)₂-S—(CH₂)₃—Si(Me)(OMe)]₂P¹,
[(Me)(MeO)₂Si—(CH₂)₃—S—Si(Bu)₂-S—(CH₂)₃—Si(Me)(OMe)]₂P¹,
[(Me)(EtO)₂Si—(CH₂)₃—S—Si(Me)₁-S—(CH₂)₃—Si(Me)(OEt)]₂P¹,

[(Me)(EtO)₂Si—(CH₂)₃—S—Si(Et)₂-S—(CH₂)₃—Si(Me)(OEt)]₂P¹,
[(Me)(EtO)₂Si—(CH₂)₃—S—Si(Bu)₂-S—(CH₂)₃—Si(Me)(OEt)(Me)]₂P¹,
[(MeO)₂(Me)Si—CH₂—C(H)Me-CH₂—S—Si(Me)₁-S—CH₂—C(H)Me-CH₂—Si(OMe)(Me)]₂P¹,
[(MeO)₂(Me)Si—CH₂—C(H)Me-CH₂—S—Si(Et)₂-S—CH₂—C(H)Me-CH₂—Si(OMe)(Me)]₂P¹,
[(EtO)₂(Me)Si—CH₂—C(H)Me-CH₂—S—Si(Me)₁-S—CH₂—C(H)Me-CH₂—Si(OEt)(Me)]₂P¹,
[(EtO)₂(Me)Si—CH₂—C(H)Me-CH₂—S—Si(Et)₂-S—CH₂—C(H)Me-CH₂—Si(OEt)(Me)]₂P¹,
[(MeO)₃Si—(CH₂)—S—Si(Me)₁-S—(CH₂)—Si(OMe)₂]₂P¹,
[(MeO)₃Si—(CH₂)—S—Si(Et)₂-S—(CH₂)—Si(OMe)₂]₂P¹,
[(EtO)₃Si—(CH₂)—S—Si(Me)₁-S—(CH₂)—Si(OEt)₂]₂P¹,
[(EtO)₃Si—(CH₂)—S—Si(Et)₂-S—(CH₂)—Si(OEt)₂]₂P¹,
[(Me)(MeO)₂Si—(CH₂)—S—Si(Me)₁-S—(CH₂)—Si(Me)(OMe)]₂P¹,
[(Me)(MeO)₂Si—(CH₂)—S—Si(Et)₂-S—(CH₂)—Si(Me)(OMe)]₂P¹,
[(Me)(EtO)₂Si—(CH₂)—S—Si(Me)₁-S—(CH₂)—Si(Me)(OEt)]₂P¹,
[(Me)(EtO)₂Si—(CH₂)—S—Si(Et)₂-S—(CH₂)—Si(Me)(OEt)]₂P¹,
[(MeO)₃Si—(CH₂)₂—S—Si(Me)₁-S—(CH₂)₂—Si(OMe)₂]₂P¹,
[(MeO)₃Si—(CH₂)₂—S—Si(Et)₂-S—(CH₂)₂—Si(OMe)₂]₂P¹,
[(EtO)₃Si—(CH₂)₂—S—Si(Me)₁-S—(CH₂)₂—Si(OEt)₂]₂P¹,
[(EtO)₃Si—(CH₂)₂—S—Si(Et)₂-S—(CH₂)₂—Si(OEt)₂]₂P¹,
[(Me)(MeO)₂Si—(CH₂)₂—S—Si(Me)₁-S—(CH₂)₂—Si(Me)(OMe)]₂P¹,
[(Me)(MeO)₂Si—(CH₂)₂—S—Si(Et)₂-S—(CH₂)₂—Si(Me)(OMe)]₂P¹,
[(Me)(EtO)₂Si—(CH₂)₂—S—Si(Me)₁-S—(CH₂)₂—Si(Me)(OEt)]₂P¹,
[(Me)(EtO)₂Si—(CH₂)₂—S—Si(Et)₂-S—(CH₂)₂—Si(Me)(OEt)]₂P¹,
[(MeO)₃Si—(CH₂)₃—S—Sn(Me)₂-S—(CH₂)₃—Si(OMe)₂]₂P¹,
[(MeO)₃Si—(CH₂)₃—S—Sn(Et)₂-S—(CH₂)₃—Si(OMe)₂]₂P¹,
[(MeO)₃Si—(CH₂)₃—S—Sn(Bu)₂-S—(CH₂)₃—Si(OMe)₂]₂P¹,
[(EtO)₃Si—(CH₂)₃—S—Sn(Me)₂-S—(CH₂)₃—Si(OEt)₂]₂P¹,
[(EtO)₃Si—(CH₂)₃—S—Sn(Et)₂-S—(CH₂)₃—Si(OEt)₂]₂P¹,
[(EtO)₃Si—(CH₂)₃—S—Sn(Bu)₂-S—(CH₂)₃—Si(OEt)₂]₂P¹,
[(PrO)₃Si—(CH₂)₃—S—Sn(Me)₂-S—(CH₂)₃—Si(OPr)₂]₂P¹,
[(PrO)₃Si—(CH₂)₃—S—Sn(Et)₂-S—(CH₂)₃—Si(OPr)₂]₂P¹,
[(PrO)₃Si—(CH₂)₃—S—Sn(Bu)₂-S—(CH₂)₃—Si(OPr)₂]₂P¹,
[(BuO)₃Si—(CH₂)₃—S—Sn(Me)₂-S—(CH₂)₃—Si(OBu)₂]₂P¹,
[(BuO)₃Si—(CH₂)₃—S—Sn(Et)₂-S—(CH₂)₃—Si(OBu)₂]₂P¹,
[(BuO)₃Si—(CH₂)₃—S—Sn(Bu)₂-S—(CH₂)₃—Si(OBu)₂]₂P¹,

[(Me)(MeO)$_2$Si—(CH$_2$)$_3$—S—Sn(Me)$_2$-S—(CH$_2$)$_3$—Si(Me)(OMe)]$_2$P$^1$,
[(Me)(MeO)$_2$Si—(CH$_2$)$_3$—S—Sn(Et)$_2$-S—(CH$_2$)$_3$—Si(Me)(OMe)]$_2$P$^1$,
[(Me)(MeO)$_2$Si—(CH$_2$)$_3$—S—Sn(Bu)$_2$-S—(CH$_2$)$_3$—Si(OMe)(Me)]$_2$P$^1$,
[(Me)(EtO)$_2$Si—(CH$_2$)$_3$—S—Sn(Me)$_2$-S—(CH$_2$)$_3$—Si(Me)(OEt)]$_2$P$^1$,
[(Me)(EtO)$_2$Si—(CH$_2$)$_3$—S—Sn(Et)$_2$-S—(CH$_2$)$_3$—Si(Me)(OEt)]$_2$P$^1$,
[(Me)(EtO)$_2$Si—(CH$_2$)$_3$—S—Sn(Bu)$_2$-S—(CH$_2$)$_3$—Si(OEt)(Me)]$_2$P$^1$,
[(MeO)$_2$(Me)Si—CH$_2$—C(H)Me-CH$_2$—S—Sn(Me)$_2$-S—CH$_2$—C(H)Me-CH$_2$—Si(OMe)(Me)]$_2$P$^1$,
[(MeO)$_2$(Me)Si—CH$_2$—C(H)Me-CH$_2$—S—Sn(Et)$_2$-S—CH$_2$—C(H)Me-CH$_2$—Si(OMe)(Me)]$_2$P$^1$,
[(EtO)$_2$(Me)Si—CH$_2$—C(H)Me-CH$_2$—S—Sn(Me)$_2$-S—CH$_2$—C(H)Me-CH$_2$—Si(OEt)(Me)]$_2$P$^1$,
[(EtO)$_2$(Me)Si—CH$_2$—C(H)Me-CH$_2$—S—Sn(Et)$_2$-S—CH$_2$—C(H)Me-CH$_2$—Si(OEt)(Me)]$_2$P$^1$,
[(MeO)$_3$Si—(CH$_2$)—S—Sn(Me)$_2$-S—(CH$_2$)—Si(OMe)$_2$]$_2$P$^1$,
[(MeO)$_3$Si—(CH$_2$)—S—Sn(Et)$_2$-S—(CH$_2$)—Si(OMe)$_2$]$_2$P$^1$,
[(EtO)$_3$Si—(CH$_2$)—S—Sn(Me)$_2$-S—(CH$_2$)—Si(OEt)$_2$]$_2$P$^1$,
[(EtO)$_3$Si—(CH$_2$)—S—Sn(Et)$_2$-S—(CH$_2$)—Si(OEt)$_2$]$_2$P$^1$,
[(Me)(MeO)$_2$Si—(CH$_2$)—S—Sn(Me)$_2$-S—(CH$_2$)—Si(Me)(OMe)]$_2$P$^1$,
[(Me)(MeO)$_2$Si—(CH$_2$)—S—Sn(Et)$_2$-S—(CH$_2$)—Si(Me)(OMe)]$_2$P$^1$,
[(Me)(EtO)$_2$Si—(CH$_2$)—S—Sn(Me)$_2$-S—(CH$_2$)—Si(Me)(OEt)]$_2$P$^1$,
[(Me)(EtO)$_2$Si—(CH$_2$)—S—Sn(Et)$_2$-S—(CH$_2$)—Si(Me)(OEt)]$_2$P$^1$,
[(MeO)$_3$Si—(CH$_2$)$_2$—S—Sn(Me)$_2$-S—(CH$_2$)$_2$—Si(OMe)$_2$]$_2$P$^1$,
[(MeO)$_3$Si—(CH$_2$)$_2$—S—Sn(Et)$_2$-S—(CH$_2$)$_2$—Si(OMe)$_2$]$_2$P$^1$,
[(EtO)$_3$Si—(CH$_2$)$_2$—S—Sn(Me)$_2$-S—(CH$_2$)$_2$—Si(OEt)$_2$]$_2$P$^1$,
[(EtO)$_3$Si—(CH$_2$)$_2$—S—Sn(Et)$_2$-S—(CH$_2$)$_2$—Si(OEt)$_2$]$_2$P$^1$,
[(Me)(MeO)$_2$Si—(CH$_2$)$_2$—S—Sn(Me)$_2$-S—(CH$_2$)$_2$—Si(Me)(OMe)]$_2$P$^1$,
[(Me)(MeO)$_2$Si—(CH$_2$)$_2$—S—Sn(Et)$_2$-S—(CH$_2$)$_2$—Si(Me)(OMe)]$_2$P$^1$,
[(Me)(EtO)$_2$Si—(CH$_2$)$_2$—S—Sn(Me)$_2$-S—(CH$_2$)$_2$—Si(Me)(OEt)]$_2$P$^1$,
[(Me)(EtO)$_2$Si—(CH$_2$)$_2$—S—Sn(Et)$_2$-S—(CH$_2$)$_2$—Si(Me)(OEt)]$_2$P$^1$,

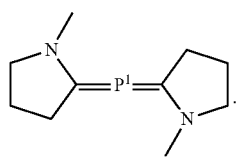

Specific preferred embodiments of the polymer of Formula 2 include, but are not limited to the following structures (with P$^2$ being as defined herein):
Me$_3$Si—S—(CH$_2$)$_3$—Si(OMe)(Me)P$^2$, Me$_3$Si—S—(CH$_2$)$_3$—Si(OEt)(Me)P$^2$,
Me$_3$Si—S—(CH$_2$)$_3$—Si(OMe)$_2$P$^2$, Me$_3$Si—S—(CH$_2$)$_3$—Si(OEt)$_2$P$^2$, Me$_3$Si—S—(CH$_2$)$_3$—Si(OPr)(Me)P$^2$,
Me$_3$Si—S—(CH$_2$)$_3$—Si(OBu)(Me)P$^2$, Me$_3$Si—S—(CH$_2$)$_3$—Si(OPr)$_2$P$^2$, Me$_3$Si—S—(CH$_2$)$_3$—Si(OBu)$_2$P$^2$,
Et$_3$Si—S—(CH$_2$)$_3$—Si(OMe)(Me)P$^2$, Et$_3$Si—S—(CH$_2$)$_3$—Si(OEt)(Me)P$^2$, Et$_3$Si—S—(CH$_2$)$_3$—Si(OMe)$_2$P$^2$,
Et$_3$Si—S—(CH$_2$)$_3$—Si(OEt)$_2$P$^2$, Et$_3$Si—S—(CH$_2$)$_3$—Si(OPr)(Me)P$^2$, Et$_3$Si—S—(CH$_2$)$_3$—Si(OBu)(Me)P$^2$,
Et$_3$Si—S—(CH$_2$)$_3$—Si(OPr)$_2$P$^2$, Et$_3$Si—S—(CH$_2$)$_3$—Si(OBu)$_2$P$^2$,
(Bu)Me$_2$Si—S—(CH$_2$)$_3$—Si(OMe)(Me)P$^2$, (Bu)Me$_2$Si—S—(CH$_2$)$_3$—Si(OEt)(Me)P$^2$,
(Bu)Me$_2$Si—S—(CH$_2$)$_3$—Si(OMe)$_2$P$^2$, (Bu)Me$_2$Si—S—(CH$_2$)$_3$—Si(OEt)$_2$P$^2$,
(Bu)Me$_2$Si—S—(CH$_2$)$_3$—Si(OPr)(Me)P$^2$, (Bu)Me$_2$Si—S—(CH$_2$)$_3$—Si(OBu)(Me)P$^2$,
(Bu)Me$_2$Si—S—(CH$_2$)$_3$—Si(OPr)$_2$P$^2$, (Bu)Me$_2$Si—S—(CH$_2$)$_3$—Si(OBu)$_2$P$^2$,
Me$_3$Si—S—(CH$_2$)—Si(OMe)$_2$P$^2$, Me$_3$Si—S—(CH$_2$)—Si(OEt)$_2$P$^2$, Me$_3$Si—S—(CH$_2$)$_2$—Si(OMe)$_2$P$^2$,
Me$_3$Si—S—(CH$_2$)$_2$—Si(OEt)$_2$P$^2$, Me$_3$Si—S—(CH$_2$)—Si(OMe)(Me)P$^2$, Me$_3$Si—S—(CH$_2$)—Si(OEt)(Me)P$^2$,
Me$_3$Si—S—(CH$_2$)$_2$—Si(OMe)(Me)P$^2$, Me$_3$Si—S—(CH$_2$)$_2$—Si(OEt)(Me)P$^2$,
Me$_3$Si—S—(CH$_2$)—C(H)Me-(CH$_2$)—Si(OMe)$_2$P$^2$, Me$_3$Si—S—(CH$_2$)—C(H)Me-(CH$_2$)—Si(OEt)$_2$P$^2$,
Me$_3$Si—S—(CH$_2$)—C(H)Me-(CH$_2$)—Si(OMe)(Me)P$^2$, Me$_3$Si—S—(CH$_2$)—C(H)Me-(CH$_2$)—Si(OEt)(Me)P$^2$,
(Bu)Me$_2$Si—S—(CH$_2$)—Si(OMe)$_2$P$^2$, (Bu)Me$_2$Si—S—(CH$_2$)—Si(OEt)$_2$P$^2$, (Bu)Me$_2$Si—S—(CH$_2$)$_2$—Si(OMe)$_2$P$^2$,
(Bu)Me$_2$Si—S—(CH$_2$)$_2$—Si(OEt)$_2$P$^2$, (Bu)Me$_2$Si—S—(CH$_2$)—Si(OMe)(Me)P$^2$,
(Bu)Me$_2$Si—S—(CH$_2$)—Si(OEt)(Me)P$^2$, (Bu)Me$_2$Si—S—(CH$_2$)$_2$—Si(OMe)(Me)P$^2$,
(Bu)Me$_2$Si—S—(CH$_2$)$_2$—Si(OEt)(Me)P$^2$, (Bu)Me$_2$Si—S—(CH$_2$)—C(H)Me-(CH$_2$)—Si(OMe)$_2$P$^2$,
(Bu)Me$_2$Si—S—(CH$_2$)—C(H)Me-(CH$_2$)—Si(OEt)$_2$P$^2$,
(Bu)Me$_2$Si—S—(CH$_2$)—C(H)Me-(CH$_2$)—Si(OMe)(Me)P$^2$,
(Bu)Me$_2$Si—S—(CH$_2$)—C(H)Me-(CH$_2$)—Si(OEt)(Me)P$^2$,
Me$_3$Si—S—C(H)Me-(CH$_2$)$_2$—Si(OMe)$_2$P$^2$,
Me$_3$Si—S—C(H)Me-(CH$_2$)$_2$—Si(OEt)$_2$P$^2$, Me$_3$Si—S—C(H)Me-(CH$_2$)$_2$—Si(OMe)(Me)P$^2$,
Me$_3$Si—S—C(H)Me-(CH$_2$)$_2$—Si(OEt)(Me)P$^2$, (Bu)Me$_2$Si—S—C(H)Me-(CH$_2$)$_2$—Si(OMe)$_2$P$^2$,
(Bu)Me$_2$Si—S—C(H)Me-(CH$_2$)$_2$—Si(OEt)$_2$P$^2$, (Bu)Me$_2$Si—S—C(H)Me-(CH$_2$)$_2$—Si(OMe)(Me)P$^2$,
(Bu)Me$_2$Si—S—C(H)Me-(CH$_2$)$_2$—Si(OEt)(Me)P$^2$,
Me$_3$Si—S—(CH$_2$)$_{11}$—Si(OMe)$_2$P$^2$,
Me$_3$Si—S—(CH$_2$)$_{11}$—Si(OEt)$_2$P$^2$, Me$_3$Si—S—(CH$_2$)$_{11}$—Si(OMe)(Me)P$^2$,
Me$_3$Si—S—(CH$_2$)$_{11}$—Si(OEt)(Me)P$^2$, (Bu)Me$_2$Si—S—(CH$_2$)$_{11}$—Si(OMe)$_2$P$^2$,
(Bu)Me$_2$Si—S—(CH$_2$)$_{11}$—Si(OEt)$_2$P$^2$, (Bu)Me$_2$Si—S—(CH$_2$)$_{11}$—Si(OMe)(Me)P$^2$,
(Bu)Me$_2$Si—S—(CH$_2$)$_{11}$—Si(OEt)(Me)P$^2$, (MeO)$_3$Si—(CH$_2$)$_3$—S—Si(Me)$_1$-S—(CH$_2$)$_3$—Si(OMe)$_2$P$^2$,
(MeO)$_3$Si—(CH$_2$)$_3$—S—Si(Et)$_2$-S—(CH$_2$)$_3$—Si(OMe)$_2$P$^2$,
(MeO)$_3$Si—(CH$_2$)$_3$—S—Si(Bu)$_2$-S—(CH$_2$)$_3$—Si(OMe)$_2$P$^2$,
(EtO)$_3$Si—(CH$_2$)$_3$—S—Si(Me)$_1$-S—(CH$_2$)$_3$—Si(OEt)$_2$P$^2$,
(EtO)$_3$Si—(CH$_2$)$_3$—S—Si(Et)$_2$-S—(CH$_2$)$_3$—Si(OEt)$_2$P$^2$,
(EtO)$_3$Si—(CH$_2$)$_3$—S—Si(Bu)$_2$-S—(CH$_2$)$_3$—Si(OEt)$_2$P$^2$,
(PrO)$_3$Si—(CH$_2$)$_3$—S—Si(Me)$_1$-S—(CH$_2$)$_3$—Si(OPr)$_2$P$^2$,
(PrO)$_3$Si—(CH$_2$)$_3$—S—Si(Et)$_2$-S—(CH$_2$)$_3$—Si(OPr)$_2$P$^2$,
(PrO)$_3$Si—(CH$_2$)$_3$—S—Si(Bu)$_2$-S—(CH$_2$)$_3$—Si(OPr)$_2$P$^2$,
(BuO)$_3$Si—(CH$_2$)$_3$—S—Si(Me)$_1$-S—(CH$_2$)$_3$—Si(OBu)$_2$P$^2$, (BuO)₃Si—(CH₂)₃—S—Si(Et)₂-S—(CH₂)₃—Si(OBu)₂P²,
(BuO)₃Si—(CH₂)₃—S—Si(Bu)₂-S—(CH₂)₃—Si(OBu)₂P²,
(Me)(MeO)₂Si—(CH₂)₃—S—Si(Me)₁-S—(CH₂)₃—Si(Me)(OMe)P²,
(Me)(MeO)₂Si—(CH₂)₃—S—Si(Et)₂-S—(CH₂)₃—Si(Me)(OMe)P²,
(Me)(MeO)₂Si—(CH₂)₃—S—Si(Bu)₂-S—(CH₂)₃—Si(OMe)(Me)P²,
(Me)(EtO)₂Si—(CH₂)₃—S—Si(Me)₁-S—(CH₂)₃—Si(Me)(OEt)P²,
(Me)(EtO)₂Si—(CH₂)₃—S—Si(Et)₂-S—(CH₂)₃—Si(Me)(OEt)P²,
(Me)(EtO)₂Si—(CH₂)₃—S—Si(Bu)₂-S—(CH₂)₃—Si(OEt)(Me)P²,
(MeO)₂(Me)Si—CH₂—C(H)Me-CH₂—S—Si(Me)₁-S—CH₂—C(H)Me-CH₂—Si(OMe)(Me)P²,
(MeO)₂(Me)Si—CH₂—C(H)Me-CH₂—S—Si(Et)₂-S—CH₂—C(H)Me-CH₂—Si(OMe)(Me)P²,
(EtO)₂(Me)Si—CH₂—C(H)Me-CH₂—S—Si(Me)₁-S—CH₂—C(H)Me-CH₂—Si(OEt)(Me)P²,
(EtO)₂(Me)Si—CH₂—C(H)Me-CH₂—S—Si(Et)₂-S—CH₂—C(H)Me-CH₂—Si(OEt)(Me)P²,
(MeO)₃Si—(CH₂)—S—Si(Me)₁-S—(CH₂)—Si(OMe)₂P²,
(MeO)₃Si—(CH₂)—S—Si(Et)₂-S—(CH₂)—Si(OMe)₂P²,
(EtO)₃Si—(CH₂)—S—Si(Me)₁-S—(CH₂)—Si(OEt)₂P²,
(EtO)₃Si—(CH₂)—S—Si(Et)₂-S—(CH₂)—Si(OEt)₂P²,
(Me)(MeO)₂Si—(CH₂)—S—Si(Me)₁-S—(CH₂)—Si(Me)(OMe)P²,
(Me)(MeO)₂Si—(CH₂)—S—Si(Et)₂-S—(CH₂)—Si(Me)(OMe)P²,
(Me)(EtO)₂Si—(CH₂)—S—Si(Me)₁-S—(CH₂)—Si(Me)(OEt)P²,
(Me)(EtO)₂Si—(CH₂)—S—Si(Et)₂-S—(CH₂)—Si(Me)(OEt)P²,
(MeO)₃Si—(CH₂)₂—S—Si(Me)₁-S—(CH₂)₂—Si(OMe)₂P²,
(MeO)₃Si—(CH₂)₂—S—Si(Et)₂-S—(CH₂)₂—Si(OMe)₂P²,
(EtO)₃Si—(CH₂)₂—S—Si(Me)₁-S—(CH₂)₂—Si(OEt)₂P²,
(EtO)₃Si—(CH₂)₂—S—Si(Et)₂-S—(CH₂)₂—Si(OEt)₂P²,
(Me)(MeO)₂Si—(CH₂)₂—S—Si(Me)₁-S—(CH₂)₂—Si(Me)(OMe)P²,
(Me)(MeO)₂Si—(CH₂)₂—S—Si(Et)₂-S—(CH₂)₂—Si(Me)(OMe)P²,
(Me)(EtO)₂Si—(CH₂)₂—S—Si(Me)₁-S—(CH₂)₂—Si(Me)(OEt)P²,
(Me)(EtO)₂Si—(CH₂)₂—S—Si(Et)₂-S—(CH₂)₂—Si(Me)(OEt)P²,
(MeO)₃Si—(CH₂)₃—S—Sn(Me)₂-S—(CH₂)₃—Si(OMe)₂P²,
(MeO)₃Si—(CH₂)₃—S—Sn(Et)₂-S—(CH₂)₃—Si(OMe)₂P²,
(MeO)₃Si—(CH₂)₃—S—Sn(Bu)₂-S—(CH₂)₃—Si(OMe)₂P²,
(EtO)₃Si—(CH₂)₃—S—Sn(Me)₂-S—(CH₂)₃—Si(OEt)₂P²,
(EtO)₃Si—(CH₂)₃—S—Sn(Et)₂-S—(CH₂)₃—Si(OEt)₂P²,
(EtO)₃Si—(CH₂)₃—S—Sn(Bu)₂-S—(CH₂)₃—Si(OEt)₂P²,
(PrO)₃Si—(CH₂)₃—S—Sn(Me)₂-S—(CH₂)₃—Si(OPr)₂P²,
(PrO)₃Si—(CH₂)₃—S—Sn(Et)₂-S—(CH₂)₃—Si(OPr)₂P²,
(PrO)₃Si—(CH₂)₃—S—Sn(Bu)₂-S—(CH₂)₃—Si(OPr)₂P²,
(BuO)₃Si—(CH₂)₃—S—Sn(Me)₂-S—(CH₂)₃—Si(OBu)₂P²,
(BuO)₃Si—(CH₂)₃—S—Sn(Et)₂-S—(CH₂)₃—Si(OBu)₂P²,
(BuO)₃Si—(CH₂)₃—S—Sn(Bu)₂-S—(CH₂)₃—Si(OBu)₂P²,
(Me)(MeO)₂Si—(CH₂)₃—S—Sn(Me)₂-S—(CH₂)₃—Si(Me)(OMe)P²,
(Me)(MeO)₂Si—(CH₂)₃—S—Sn(Et)₂-S—(CH₂)₃—Si(Me)(OMe)P²,
(Me)(MeO)₂Si—(CH₂)₃—S—Sn(Bu)₂-S—(CH₂)₃—Si(OMe)(Me)P²,
(Me)(EtO)₂Si—(CH₂)₃—S—Sn(Me)₂-S—(CH₂)₃—Si(Me)(OEt)P²,
(Me)(EtO)₂Si—(CH₂)₃—S—Sn(Et)₂-S—(CH₂)₃—Si(Me)(OEt)P²,
(Me)(EtO)₂Si—(CH₂)₃—S—Sn(Bu)₂-S—(CH₂)₃—Si(OEt)(Me)P²,
(MeO)₂(Me)Si—CH₂—C(H)Me-CH₂—S—Sn(Me)₂-S—CH₂—C(H)Me-CH₂—Si(OMe)(Me)P²,
(MeO)₂(Me)Si—CH₂—C(H)Me-CH₂—S—Sn(Et)₂-S—CH₂—C(H)Me-CH₂—Si(OMe)(Me)P²,
(EtO)₂(Me)Si—CH₂—C(H)Me-CH₂—S—Sn(Me)₂-S—CH₂—C(H)Me-CH₂—Si(OEt)(Me)P²,
(EtO)₂(Me)Si—CH₂—C(H)Me-CH₂—S—Sn(Et)₂-S—CH₂—C(H)Me-CH₂—Si(OEt)(Me)P²,
(MeO)₃Si—(CH₂)—S—Sn(Me)₂-S—(CH₂)—Si(OMe)₂P²,
(MeO)₃Si—(CH₂)—S—Sn(Et)₂-S—(CH₂)—Si(OMe)₂P²,
(EtO)₃Si—(CH₂)—S—Sn(Me)₂-S—(CH₂)—Si(OEt)₂P²,
(EtO)₃Si—(CH₂)—S—Sn(Et)₂-S—(CH₂)—Si(OEt)₂P²,
(Me)(MeO)₂Si—(CH₂)—S—Sn(Me)₂-S—(CH₂)—Si(Me)(OMe)P²,
(Me)(MeO)₂Si—(CH₂)—S—Sn(Et)₂-S—(CH₂)—Si(Me)(OMe)P²,
(Me)(EtO)₂Si—(CH₂)—S—Sn(Me)₂-S—(CH₂)—Si(Me)(OEt)P²,
(Me)(EtO)₂Si—(CH₂)—S—Sn(Et)₂-S—(CH₂)—Si(Me)(OEt)P²,
(MeO)₃Si—(CH₂)₂—S—Sn(Me)₂-S—(CH₂)₂—Si(OMe)₂P²,
(MeO)₃Si—(CH₂)₂—S—Sn(Et)₂-S—(CH₂)₂—Si(OMe)₂P²,
(EtO)₃Si—(CH₂)₂—S—Sn(Me)₂-S—(CH₂)₂—Si(OEt)₂P²,
(EtO)₃Si—(CH₂)₂—S—Sn(Et)₂-S—(CH₂)₂—Si(OEt)₂P²,
(Me)(MeO)₂Si—(CH₂)₂—S—Sn(Me)₂-S—(CH₂)₂—Si(Me)(OMe)P²,
(Me)(MeO)₂Si—(CH₂)₂—S—Sn(Et)₂-S—(CH₂)₂—Si(Me)(OMe)P²,
(Me)(EtO)₂Si—(CH₂)₂—S—Sn(Me)₂-S—(CH₂)₂—Si(Me)(OEt)P²,
(Me)(EtO)₂Si—(CH₂)₂—S—Sn(Et)₂-S—(CH₂)₂—Si(Me)(OEt)P²,

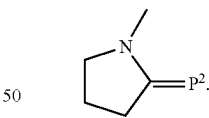

Moieties resulting from the process of chain end modification using chain end-modifying agents and having a terminal trihydrocarbylsilyl group, including trialkylsilyl, dialkylarylsilyl and triarylsilyl, are believed to function as protective groups which prevent unintended subsequent reaction of the polymer chain. Such protective groups may be removed by exposure to a compound containing a reactive hydroxyl group (—OH), such as water, alcohols and organic or inorganic acids (for example hydrochloric acid, sulfuric acid or carboxylic acids). Such exposure conditions are typically present during vulcanization. In those cases where the terminal group of the chain end-modifying agent is sulfide-linked, the exposure to a reactive hydroxyl group and deprotection will result in the formation of an unprotected thiol group (SH) as the terminal group of the polymer chain. Depending on the work-up conditions for the modified polymer (e.g. steam stripping), both the unprotected modified and the protected modified polymer may be present.

It is believed that certain terminal groups of the polymer, such as an unprotected thiol group, are reactive towards fillers such as silica and/or carbon black, which may result in a more homogeneous distribution of the filler within a polymer composition.

Specific preferred examples of the polymers containing unprotected terminal thiol groups include the following ones, including Lewis base adducts thereof (with $P^1$ and $P^2$ being as herein defined):

[HS—$(CH_2)_3$—Si(OH)(Me)]$_2P^1$, [HS—$(CH_2)_3$—Si(OH)$_2$]$_2P^1$, [HS—$(CH_2)_3$—Si(OH)(Et)]$_2P^1$,
[HS—$(CH_2)$—C(H)Me-$(CH_2)$—Si(OH)$_2$]$_2P^1$, [HS—$(CH_2)$—C(H)Me-$(CH_2)$—Si(OH)(Me)]$_2P^1$,
[HS—$(CH_2)$—C(H)Me-$(CH_2)$—Si(OH)(Et)]$_2P^1$, [HS—$(CH_2)$—Si(OH)$_2$]$_2P^1$,
[HS—$(CH_2)$—Si(OH)(Me)]$_2P^1$, [HS—$(CH_2)$—Si(OH)(Et)]$_2P^1$, [HS—$(CH_2)_2$—Si(OH)$_2$]$_2P^1$,
[HS—$(CH_2)_2$—Si(OH)(Me)]$_2P^1$, [HS—$(CH_2)_2$—Si(OH)(Et)]$_2P^1$,
[HS—$(CH_2)$—C(Me)$_2$-$(CH_2)$—Si(OH)$_2$]$_2P^1$, [HS—$(CH_2)$—C(Me)$_2$-$(CH_2)$—Si(OH)(Me)]$_2P^1$,
[HS—$(CH_2)$—C(Me)$_2$-$(CH_2)$—Si(OH)(Et)]$_2P^1$, [HS—C(H)Me-$(CH_2)_2$—Si(OH)$_2$]$_2P^1$,
[HS—C(H)Me-$(CH_2)_2$—Si(Me)(OH)]$_2P^1$, [HS—C(H)Me-$(CH_2)_2$—Si(Et)(OH)]$_2P^1$,
HS—$(CH_2)_3$—Si(OH)(Me)$P^2$, HS—$(CH_2)_3$—Si(OH)$_2P^2$, HS—$(CH_2)_3$—Si(OH)(Et)$P^2$,
HS—$(CH_2)$—C(H)Me-$(CH_2)$—Si(OH)$_2P^2$, HS—$(CH_2)$—C(H)Me-$(CH_2)$—Si(OH)(Me)$P^2$,
HS—$(CH_2)$—C(H)Me-$(CH_2)$—Si(OH)(Et)$P^2$, HS—$(CH_2)$—Si(OH)$_2P^2$, HS—$(CH_2)$—Si(OH)(Me)$P^2$,
HS—$(CH_2)$—Si(OH)(Et)$P^2$, HS—$(CH_2)_2$—Si(OH)$_2P^2$, HS—$(CH_2)_2$—Si(OH)(Me)$P^2$,
HS—$(CH_2)_2$—Si(OH)(Et)$P^2$, HS—$(CH_2)$—C(Me)$_2$-$(CH_2)$—Si(OH)$_2P^2$,
HS—$(CH_2)$—C(Me)$_2$-$(CH_2)$—Si(OH)(Me)$P^2$, HS—$(CH_2)$—C(Me)$_2$-$(CH_2)$—Si(OH)(Et)$P^2$,
HS—C(H)Me-$(CH_2)_2$—Si(OH)$_2P^2$, HS—C(H)Me-$(CH_2)_2$—Si(Me)(OH)$P^2$,
HS—C(H)Me-$(CH_2)_2$—Si(Et)(OH)$P^2$.

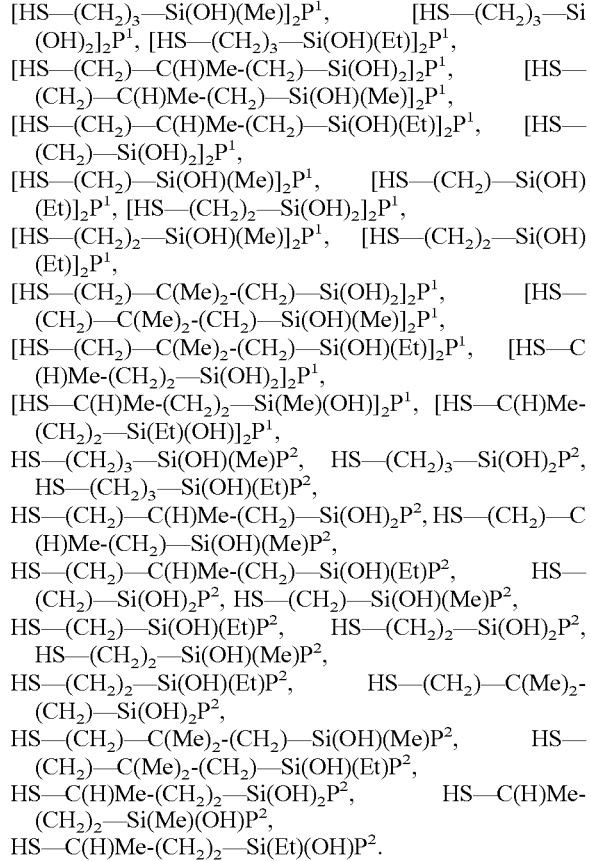

The reaction product as a chain end-modified polymer typically contains silanol groups and alkoxysilyl groups in a total amount from 0.01 to 3000 mmol/kg of polymer, preferably from 0.05 to 1500 mmol/kg, more preferably from 0.1 to 500 mmol/kg and even more preferably from 0.2 to 200 mmol/kg.

The reaction product as a chain end-modified polymer preferably contains sulfide groups (in the form of thiol groups and/or sulfide-linked protective groups) in a total amount of from 0.01 to 1000 mmol/kg of polymer, preferably from 0.05 to 500 mmol/kg, more preferably from 0.1 to 300 mmol/kg and even more preferably from 0.2 to 200 mmol/kg of polymer.

For most applications, the polymer $P^1$ and $P^2$ is preferably a homopolymer derived from a conjugated diolefin, a copolymer derived from a conjugated diolefin monomer with an aromatic vinyl monomer and/or a terpolymer of one or two types of conjugated diolefins with one or two types of aromatic vinyl compounds. Examples of particularly useful polymers include homopolymers of butadiene or isoprene and random or block co- and terpolymers of butadiene, isoprene and styrene, especially a random copolymer of butadiene with isoprene and a random or block copolymer of butadiene with styrene.

In the polymers $P^1$ and $P^2$, aromatic vinyl monomers constitute up to 60%, preferably from 2 to 55% and more preferably from 5 to 50% by weight, based on the total weight of the polymer. An amount of less than 2% by weight may lead to a deteriorated balance of rolling resistance, wet skid and abrasion resistance and to reduced tensile strength, whereas an amount of more than 60% by weight may lead to increased hysteresis loss. The polymer may be a block or random copolymer of an aromatic vinyl monomer, and preferably 40% by weight or more of the aromatic vinyl monomer units are linked singly, and 10% by weight or less are polymeric "blocks" of eight or more aromatic vinyl monomers linked successively (the length of successively linked aromatic vinyl units can be measured by an ozonolysis-gel permeation chromatography method developed by Tanaka et al. (Polymer, Vol. 22, pp. 1721-1723 (1981)). Copolymers outside this range tend to exhibit increased hysteresis loss.

Although there are no specific limitations regarding the content of 1,2-bonds and/or 3,4-bonds (hereinafter called "vinyl bond content") of the conjugated diolefin portion of the polymer $P^1$ and $P^2$, for most applications the vinyl bond content is preferably from 2 to 90% by weight, particularly preferably from 4 to 80% by weight (based on the total weight of diolefin portion). If the vinyl bond content in the polymer is less than 2% by weight, the resulting product may have an inferior balance of wet skid resistance, rolling resistance and abrasion resistance. If the vinyl content in the polymer exceeds 90% by weight, the resulting product may exhibit deteriorated tensile strength and abrasion resistance and a relatively large hysteresis loss.

Monomers

The monomers used in the preparation of the polymer of the invention are selected from conjugated olefins and optionally from aromatic vinyl compounds.

Suitable conjugated olefins include conjugated dienes, such as 1,3-butadiene, 2-alkyl-1,3-butadiene, isoprene (2-methyl-1,3-butadiene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and 1,3-cyclooctadiene and a combination of two or more thereof. 1,3-butadiene and isoprene are preferred conjugated olefins, and 1,3-butadiene is a particularly preferred one.

Suitable aromatic vinyl compounds include styrene, $C_{1-4}$ alkyl-substituted styrene, such as 2-methylstyrene, 3-methylstyrene, 4-methylstyrene, 2,4-dimethylstyrene, 2,4,6-trimethylstyrene, α-methylstyrene and stilbene, 2,4-diisopropylstyrene, 4-tert-butylstyrene, vinyl benzyl dimethylamine, (4-vinylbenzyl)dimethyl aminoethyl ether, N,N-dimethylaminoethyl styrene, tert-butoxystyrene and vinylpyridine and a combination of two or more thereof. Styrene is a particularly preferred aromatic vinyl compound.

In addition to the above-mentioned conjugated olefins and aromatic vinyl compounds, it is possible to make use of one or more monomers selected from olefins and nonconjugated diolefins, such as $C_2$-$C_{20}$ α-olefins and non-conjugated $C_4$-$C_{20}$ diolefins, especially norbornadiene, ethylidenenorbornene, 1,4-hexadiene, 1,5-hexadiene, 1,7-octadiene, 4-vinylcyclohexene and divinylbenzene including 1,2-divinylbenzene, 1,3-divinylbenzene and 1,4-divinylbenzene and mixtures thereof.

In one embodiment, the amount of divinylbenzene, including 1,2-divinylbenzene, 1,3-divinylbenzene and 1,4- divinylbenzene, is 1 mol % or less (based on the total molar amount of the monomers used to make the polymer).

Chain End-Modifying Agents

According to the second aspect of the invention, one or more chain end-modifying agents (or briefly "modifying agents") are used for reaction with the terminal ends of the polymer chain(s) obtained from the process of the second invention. Generally, silane-sulfide omega chain end modifying agents such as disclosed in WO 2007/047943, WO 2009/148932, U.S. Pat. No. 6,229,036 and US 2013/0131263, each incorporated herein by reference in its entirety, can be used for this purpose.

In a preferred embodiment, the chain end-modifying agent is selected from one or more of the chain end-modifying agents represented by Formula 11 to Formula 15. In a particularly preferred embodiment, the chain end-modifying agent is selected from one or more compounds represented by Formula 11. Specific preferred species of the chain end-modifying agent of Formula 11 include the following compounds:

$(MeO)_3Si-(CH_2)_3-S-SiMe_3$, $(EtO)_3Si-(CH_2)_3-S-SiMe_3$, $(PrO)_3Si-(CH_2)_3-S-SiMe_3$,
$(BuO)_3Si-(CH_2)_3-S-SiMe_3$, $(MeO)_3Si-(CH_2)_2-S-SiMe_3$, $(EtO)_3Si-(CH_2)_2-S-SiMe_3$,
$(PrO)_3Si-(CH_2)_2-S-SiMe_3$, $(BuO)_3Si-(CH_2)_2-S-SiMe_3$, $(MeO)_3Si-CH_2-S-SiMe_3$,
$(EtO)_3Si-CH_2-S-SiMe_3$, $(PrO)_3Si-CH_2-S-SiMe_3$, $(BuO)_3Si-CH_2-S-SiMe_3$,
$(MeO)_3Si-CH_2-CMe_2-CH_2-S-SiMe_3$, $(EtO)_3Si-CH_2-CMe_2-CH_2-S-SiMe_3$,
$(PrO)_3Si-CH_2-CMe_2-CH_2-S-SiMe_3$, $(BuO)_3Si-CH_2-CMe_2-CH_2-S-SiMe_3$,
$((MeO)_3Si-CH_2-C(H)Me-CH_2-S-SiMe_3$, $(EtO)_3Si-CH_2-C(H)Me-CH_2-S-SiMe_3$,
$(PrO)_3Si-CH_2-C(H)Me-CH_2-S-SiMe_3$, $(BuO)_3Si-CH_2-C(H)Me-CH_2-S-SiMe_3$,
$(MeO)_2(Me)Si-(CH_2)_3-S-SiMe_3$, $(EtO)_2(Me)Si-(CH_2)_3-S-SiMe_3$,
$(PrO)_2(Me)Si-(CH_2)_3-S-SiMe_3$, $(BuO)_2(Me)Si-(CH_2)_3-S-SiMe_3$,
$(MeO)_2(Me)Si-(CH_2)_2-S-SiMe_3$, $(EtO)_2(Me)Si-(CH_2)_2-S-SiMe_3$,
$(PrO)_2(Me)Si-(CH_2)_2-S-SiMe_3$, $(BuO)_2(Me)Si-(CH_2)_2-S-SiMe_3$,
$(MeO)_2(Me)Si-CH_2-S-SiMe_3$, $(EtO)_2(Me)Si-CH_2-S-SiMe_3$, $(PrO)_2(Me)Si-CH_2-S-SiMe_3$,
$(BuO)_2(Me)Si-CH_2-S-SiMe_3$, $(MeO)_2(Me)Si-CH_2-CMe_2-CH_2-S-SiMe_3$,
$(EtO)_2(Me)Si-CH_2-CMe_2-CH_2-S-SiMe_3$, $(PrO)_2(Me)Si-CH_2-CMe_2-CH_2-S-SiMe_3$,
$(BuO)_2(Me)Si-CH_2-CMe_2-CH_2-S-SiMe_3$, $((MeO)_2(Me)Si-CH_2-C(H)Me-CH_2-S-SiMe_3$,
$(EtO)_2(Me)Si-CH_2-C(H)Me-CH_2-S-SiMe_3$, $(PrO)_2(Me)Si-CH_2-C(H)Me-CH_2-S-SiMe_3$,
$(BuO)_2(Me)Si-CH_2-C(H)Me-CH_2-S-SiMe_3$, $(MeO)(Me)_2Si-(CH_2)_3-S-SiMe_3$,
$(EtO)(Me)_2Si-(CH_2)_3-S-SiMe_3$, $(PrO)Me_2Si-(CH_2)_3-S-SiMe_3$,
$(BuO)(Me)_2Si-(CH_2)_3-S-SiMe_3$, $(MeO)(Me)_2Si-(CH_2)_2-S-SiMe_3$,
$(EtO)(Me)_2Si-(CH_2)_2-S-SiMe_3$, $(PrO)(Me)_2Si-(CH_2)_2-S-SiMe_3$,
$(BuO)(Me)_2Si-(CH_2)_2-S-SiMe_3$, $(MeO)(Me)_2Si-CH_2-S-SiMe_3$, $(EtO)(Me)_2Si-CH_2-S-SiMe_3$,
$(PrO)(Me)_2Si-CH_2-S-SiMe_3$, $(BuO)(Me)_2Si-CH_2-S-SiMe_3$,
$(MeO)(Me)_2Si-CH_2-CMe_2-CH_2-S-SiMe_3$, $(EtO)(Me)_2Si-CH_2-CMe_2-CH_2-S-SiMe_3$,
$(PrO)(Me)_2Si-CH_2-CMe_2-CH_2-S-SiMe_3$, $(BuO)(Me)_2Si-CH_2-CMe_2-CH_2-S-SiMe_3$,
$((MeO)(Me)_2Si-CH_2-C(H)Me-CH_2-S-SiMe_3$, $(EtO)(Me)_2Si-CH_2-C(H)Me-CH_2-S-SiMe_3$,
$(PrO)(Me)_2Si-CH_2-C(H)Me-CH_2-S-SiMe_3$, $(BuO)(Me)_2Si-CH_2-C(H)Me-CH_2-S-SiMe_3$,
$(MeO)_3Si-(CH_2)_3-S-SiEt_3$, $(EtO)_3Si-(CH_2)_3-S-SiEt_3$, $(PrO)_3Si-(CH_2)_3-S-SiEt_3$,
$(BuO)_3Si-(CH_2)_3-S-SiEt_3$, $(MeO)_3Si-(CH_2)_2-S-SiEt_3$, $(EtO)_3Si-(CH_2)_2-S-SiEt_3$,
$(PrO)_3Si-(CH_2)_2-S-SiEt_3$, $(BuO)_3Si-(CH_2)_2-S-SiEt_3$, $(MeO)_3Si-CH_2-S-SiEt_3$,
$(EtO)_3Si-CH_2-S-SiEt_3$, $(PrO)_3Si-CH_2-S-SiEt_3$, $(BuO)_3Si-CH_2-S-SiEt_3$,
$(MeO)_3Si-CH_2-CMe_2-CH_2-S-SiEt_3$, $(EtO)_3Si-CH_2-CMe_2-CH_2-S-SiEt_3$,
$(PrO)_3Si-CH_2-CMe_2-CH_2-S-SiEt_3$, $(BuO)_3Si-CH_2-CMe_2-CH_2-S-SiEt_3$,
$((MeO)_3Si-CH_2-C(H)Me-CH_2-S-SiEt_3$, $(EtO)_3Si-CH_2-C(H)Me-CH_2-S-SiEt_3$,
$(PrO)_3Si-CH_2-C(H)Me-CH_2-S-SiEt_3$, $(BuO)_3Si-CH_2-C(H)Me-CH_2-S-SiEt_3$,
$(MeO)_2(Me)Si-(CH_2)_3-S-SiEt_3$, $(EtO)_2(Me)Si-(CH_2)_3-S-SiEt_3$, $(PrO)_2(Me)Si-(CH_2)_3-S-SiEt_3$,
$(BuO)_2(Me)Si-(CH_2)_3-S-SiEt_3$, $(MeO)_2(Me)Si-(CH_2)_2-S-SiEt_3$,
$(EtO)_2(Me)Si-(CH_2)_2-S-SiEt_3$, $(PrO)_2(Me)Si-(CH_2)_2-S-SiEt_3$, $(BuO)_2(Me)Si-(CH_2)_2-S-SiEt_3$,
$(MeO)_2(Me)Si-CH_2-S-SiEt_3$, $(EtO)_2(Me)Si-CH_2-S-SiEt_3$, $(PrO)_2(Me)Si-CH_2-S-SiEt_3$,
$(BuO)_2(Me)Si-CH_2-S-SiEt_3$, $(MeO)_2(Me)Si-CH_2-CMe_2-CH_2-S-SiEt_3$,
$(EtO)_2(Me)Si-CH_2-CMe_2-CH_2-S-SiEt_3$, $(PrO)_2(Me)Si-CH_2-CMe_2-CH_2-S-SiEt_3$,
$(BuO)_2(Me)Si-CH_2-CMe_2-CH_2-S-SiEt_3$, $((MeO)_2(Me)Si-CH_2-C(H)Me-CH_2-S-SiEt_3$,
$(EtO)_2(Me)Si-CH_2-C(H)Me-CH_2-S-SiEt_3$, $(PrO)_2(Me)Si-CH_2-C(H)Me-CH_2-S-SiEt_3$,
$(BuO)_2(Me)Si-CH_2-C(H)Me-CH_2-S-SiEt_3$, $(MeO)(Me)_2Si-(CH_2)_3-S-SiEt_3$,
$(EtO)(Me)_2Si-(CH_2)_3-S-SiEt_3$, $(PrO)(Me)_2Si-(CH_2)_3-S-SiEt_3$, $(BuO)(Me)_2Si-(CH_2)_3-S-SiEt_3$,
$(MeO)(Me)_2Si-(CH_2)_2-S-SiEt_3$, $(EtO)(Me)_2Si-(CH_2)_2-S-SiEt_3$,
$(PrO)(Me)_2Si-(CH_2)_2-S-SiEt_3$, $(BuO)(Me)_2Si-(CH_2)_2-S-SiEt_3$, $(MeO)(Me)_2Si-CH_2-S-SiEt_3$,
$(EtO)(Me)_2Si-CH_2-S-SiEt_3$, $(PrO)(Me)_2Si-CH_2-S-SiEt_3$, $(BuO)(Me)_2Si-CH_2-S-SiEt_3$,
$(MeO)(Me)_2Si-CH_2-CMe_2-CH_2-S-SiEt_3$, $(EtO)(Me)_2Si-CH_2-CMe_2-CH_2-S-SiEt_3$,
$(PrO)(Me)_2Si-CH_2-CMe_2-CH_2-S-SiEt_3$, $(BuO)(Me)_2Si-CH_2-CMe_2-CH_2-S-SiEt_3$,
$((MeO)(Me)_2Si-CH_2-C(H)Me-CH_2-S-SiEt_3$, $(EtO)(Me)_2Si-CH_2-C(H)Me-CH_2-S-SiEt_3$,
$(PrO)(Me)_2Si-CH_2-C(H)Me-CH_2-S-SiEt_3$ and $(BuO)(Me)_2Si-CH_2-C(H)Me-CH_2-S-SiEt_3$,
$(MeO)_3Si-(CH_2)_3-S-Si(Me)_2-S-(CH_2)_3-Si(OMe)_3$,
$(MeO)_3Si-(CH_2)_3-S-Si(Et)_2-S-(CH_2)_3-Si(OMe)_3$,
$(MeO)_3Si-(CH_2)_3-S-Si(Bu)_2-S-(CH_2)_3-Si(OMe)_3$,
$(EtO)_3Si-(CH_2)_3-S-Si(Me)_2-S-(CH_2)_3-Si(OEt)_3$,
$(EtO)_3Si-(CH_2)_3-S-Si(Et)_2-S-(CH_2)_3-Si(OEt)_3$,
$(EtO)_3Si-(CH_2)_3-S-Si(Bu)_2-S-(CH_2)_3-Si(OEt)_3$,
$(PrO)_3Si-(CH_2)_3-S-Si(Me)_2-S-(CH_2)_3-Si(OPr)_3$,
$(PrO)_3Si-(CH_2)_3-S-Si(Et)_2-S-(CH_2)_3-Si(OPr)_3$,
$(PrO)_3Si-(CH_2)_3-S-Si(Bu)_2-S-(CH_2)_3-Si(OPr)_3$, (MeO)₃Si—(CH₂)₂—S—Si(Me)₂-S—(CH₂)₂—Si(OMe)₃,
(MeO)₃Si—(CH₂)₂—S—Si(Et)₂-S—(CH₂)₂—Si(OMe)₃,
(MeO)₃Si—(CH₂)₂—S—Si(Bu)₂-S—(CH₂)₂—Si(OMe)₃,
(EtO)₃Si—(CH₂)₂—S—Si(Me)₂-S—(CH₂)₂—Si(OEt)₃,
(EtO)₃Si—(CH₂)₂—S—Si(Et)₂-S—(CH₂)₂—Si(OEt)₃,
(EtO)₃Si—(CH₂)₂—S—Si(Bu)₂-S—(CH₂)₂—Si(OEt)₃,
(PrO)₃Si—(CH₂)₂—S—Si(Me)₂-S—(CH₂)₂—Si(OPr)₃,
(PrO)₃Si—(CH₂)₂—S—Si(Et)₂-S—(CH₂)₂—Si(OPr)₃,
(PrO)₃Si—(CH₂)₂—S—Si(Bu)₂-S—(CH₂)₂—Si(OPr)₃,
(MeO)₃Si—CH₂—S—Si(Me)₂-S—CH₂—Si(OMe)₃,
(MeO)₃Si—CH₂—S—Si(Et)₂-S—CH₂—Si(OMe)₃,
(MeO)₃Si—CH₂—S—Si(Bu)₂-S—CH₂—Si(OMe)₃,
(EtO)₃Si—CH₂—S—Si(Me)₂-S—CH₂—Si(OEt)₃,
(EtO)₃Si—CH₂—S—Si(Et)₂-S—CH₂—Si(OEt)₃,
(EtO)₃Si—CH₂—S—Si(Bu)₂-S—CH₂—Si(OEt)₃,
(PrO)₃Si—CH₂—S—Si(Me)₂-S—CH₂—Si(OPr)₃,
(PrO)₃Si—CH₂—S—Si(Et)₂-S—CH₂—Si(OPr)₃,
(PrO)₃Si—CH₂—S—Si(Bu)₂-S—CH₂—Si(OPr)₃,
(MeO)₃Si—CH₂—CMe₂-CH₂—S—Si(Me)₂-S—CH₂—CMe₂-CH₂—Si(OMe)₃,
(MeO)₃Si—CH₂—CMe₂-CH₂—S—Si(Et)₂-S—CH₂—CMe₂-CH₂—Si(OMe)₃,
(MeO)₃Si—CH₂—CMe₂-CH₂—S—Si(Bu)₂-S—CH₂—CMe₂-CH₂—Si(OMe)₃,
(EtO)₃Si—CH₂—CMe₂-CH₂—S—Si(Me)₂-S—CH₂—CMe₂-CH₂—Si(OEt)₃,
(EtO)₃Si—CH₂—CMe₂-CH₂—S—Si(Et)₂-S—CH₂—CMe₂-CH₂—Si(OEt)₃,
(EtO)₃Si—CH₂—CMe₂-CH₂—S—Si(Bu)₂-S—CH₂—CMe₂-CH₂—Si(OEt)₃,
(PrO)₃Si—CH₂—CMe₂-CH₂—S—Si(Me)₂-S—CH₂—CMe₂-CH₂—Si(OPr)₃,
(PrO)₃Si—CH₂—CMe₂-CH₂—S—Si(Et)₂-S—CH₂—CMe₂-CH₂—Si(OPr)₃,
(PrO)₃Si—CH₂—CMe₂-CH₂—S—Si(Bu)₂-S—CH₂≤CMe₂-CH₂—Si(OPr)₃,
(MeO)₃Si—CH₂—C(H)Me-CH₂—S—Si(Me)₂-S—CH₂—C(H)Me-CH₂—Si(OMe)₃,
(MeO)₃Si—CH₂—C(H)Me-CH₂—S—Si(Et)₂-S—CH₂—C(H)Me-CH₂—Si(OMe)₃,
(MeO)₃Si—CH₂—C(H)Me-CH₂—S—Si(Bu)₂-S—CH₂—C(H)Me-CH₂—Si(OMe)₃,
(EtO)₃Si—CH₂—C(H)Me-CH₂—S—Si(Me)₂-S—CH₂—C(H)Me-CH₂—Si(OEt)₃,
(EtO)₃Si—CH₂—C(H)Me-CH₂—S—Si(Et)₂-S—CH₂—C(H)Me-CH₂—Si(OEt)₃,
(EtO)₃Si—CH₂—C(H)Me-CH₂—S—Si(Bu)₂-S—CH₂—C(H)Me-CH₂—Si(OEt)₃,
(PrO)₃Si—CH₂—C(H)Me-CH₂—S—Si(Me)₂-S—CH₂—C(H)Me-CH₂—Si(OPr)₃,
(PrO)₃Si—CH₂—C(H)Me-CH₂—S—Si(Et)₂-S—CH₂—C(H)Me-CH₂—Si(OPr)₃,
(PrO)₃Si—CH₂—C(H)Me-CH₂—S—Si(Bu)₂-S—CH₂—C(H)Me-CH₂—Si(OPr)₃,
(MeO)₂(Me)Si—(CH₂)₃—S—Si(Me)₂-S—(CH₂)₃—Si(OMe)₂(Me),
(MeO)₂(Me)Si—(CH₂)₃—S—Si(Et)₂-S—(CH₂)₃—Si(OMe)₂(Me),
(MeO)₂(Me)Si—(CH₂)₃—S—Si(Bu)₂-S—(CH₂)₃—Si(OMe)₂(Me),
(EtO)₂(Me)Si—(CH₂)₃—S—Si(Me)₂-S—(CH₂)₃—Si(OEt)₂(Me),
(EtO)₂(Me)Si—(CH₂)₃—S—Si(Et)₂-S—(CH₂)₃—Si(OEt)₂(Me),
(EtO)₂(Me)Si—(CH₂)₃—S—Si(Bu)₂-S—(CH₂)₃—Si(OEt)₂(Me),
(PrO)₂(Me)Si—(CH₂)₃—S—Si(Me)₂-S—(CH₂)₃—Si(OPr)₂(Me),
(PrO)₂(Me)Si—(CH₂)₃—S—Si(Et)₂-S—(CH₂)₃—Si(OPr)₂(Me),
(PrO)₂(Me)Si—(CH₂)₃—S—Si(Bu)₂-S—(CH₂)₃—Si(OPr)₂(Me),
(MeO)₂(Me)Si—(CH₂)₂—S—Si(Me)₂-S—(CH₂)₂—Si(OMe)₂(Me),
(MeO)₂(Me)Si—(CH₂)₂—S—Si(Et)₂-S—(CH₂)₂—Si(OMe)₂(Me),
(MeO)₂(Me)Si—(CH₂)₂—S—Si(Bu)₂-S—(CH₂)₂—Si(OMe)₂(Me),
(EtO)₂(Me)Si—(CH₂)₂—S—Si(Me)₂-S—(CH₂)₂—Si(OEt)₂(Me),
(EtO)₂(Me)Si—(CH₂)₂—S—Si(Et)₂-S—(CH₂)₂—Si(OEt)₂(Me),
(EtO)₂(Me)Si—(CH₂)₂—S—Si(Bu)₂-S—(CH₂)₂—Si(OEt)₂(Me),
(PrO)₂(Me)Si—(CH₂)₂—S—Si(Me)₂-S—(CH₂)₂—Si(OPr)₂(Me),
(PrO)₂(Me)Si—(CH₂)₂—S—Si(Et)₂-S—(CH₂)₂—Si(OPr)₂(Me),
(PrO)₂(Me)Si—(CH₂)₂—S—Si(Bu)₂-S—(CH₂)₂—Si(OPr)₂(Me),
(MeO)₂(Me)Si—CH₂—S—Si(Me)₂-S—CH₂—Si(OMe)₂(Me),
(MeO)₂(Me)Si—CH₂—S—Si(Et)₂-S—CH₂—Si(OMe)₂(Me),
(MeO)₂(Me)Si—CH₂—S—Si(Bu)₂-S—CH₂—Si(OMe)₂(Me),
(EtO)₂(Me)Si—CH₂—S—Si(Me)₂-S—CH₂—Si(OEt)₂(Me),
(EtO)₂(Me)Si—CH₂—S—Si(Et)₂-S—CH₂—Si(OEt)₂(Me),
(EtO)₂(Me)Si—CH₂—S—Si(Bu)₂-S—CH₂—Si(OEt)₂(Me),
(PrO)₂(Me)Si—CH₂—S—Si(Me)₂-S—CH₂—Si(OPr)₂(Me),
(PrO)₂(Me)Si—CH₂—S—Si(Et)₂-S—CH₂—Si(OPr)₂(Me),
(PrO)₂(Me)Si—CH₂—S—Si(Bu)₂-S—CH₂—Si(OPr)₂(Me),
(MeO)₂(Me)Si—CH₂—CMe₂-CH₂—S—Si(Me)₂-S—CH₂—CMe₂-CH₂—Si(OMe)₂(Me),
(MeO)₂(Me)Si—CH₂—CMe₂-CH₂—S—Si(Et)₂-S—CH₂—CMe₂-CH₂—Si(OMe)₂(Me),
(MeO)₂(Me)Si—CH₂—CMe₂-CH₂—S—Si(Bu)₂-S—CH₂—CMe₂-CH₂—Si(OMe)₂(Me),
(EtO)₂(Me)Si—CH₂—CMe₂-CH₂—S—Si(Me)₂-S—CH₂—CMe₂-CH₂—Si(OEt)₂(Me),
(EtO)₂(Me)Si—CH₂—CMe₂-CH₂—S—Si(Et)₂-S—CH₂—CMe₂-CH₂—Si(OEt)₂(Me),
(EtO)₂(Me)Si—CH₂—CMe₂-CH₂—S—Si(Bu)₂-S—CH₂—CMe₂-CH₂—Si(OEt)₂(Me),
(PrO)₂(Me)Si—CH₂—CMe₂-CH₂—S—Si(Me)₂-S—CH₂—CMe₂-CH₂—Si(OPr)₂(Me),
(PrO)₂(Me)Si—CH₂—CMe₂-CH₂—S—Si(Et)₂-S—CH₂—CMe₂-CH₂—Si(OPr)₂(Me),
(PrO)₂(Me)Si—CH₂—CMe₂-CH₂—S—Si(Bu)₂-S—CH₂—CMe₂-CH₂—Si(OPr)₂(Me),
(MeO)₂(Me)Si—CH₂—C(H)Me-CH₂—S—Si(Me)₂-S—CH₂—C(H)Me-CH₂—Si(OMe)₂(Me),
(MeO)₂(Me)Si—CH₂—C(H)Me-CH₂—S—Si(Et)₂-S—CH₂—C(H)Me-CH₂—Si(OMe)₂(Me),
(MeO)₂(Me)Si—CH₂—C(H)Me-CH₂—S—Si(Bu)₂-S—CH₂—C(H)Me-CH₂—Si(OMe)₂(Me), (EtO)₂(Me)Si—CH₂—C(H)Me-CH₂—S—Si(Me)₂-S—CH₂—C(H)Me-CH₂—Si(OEt)₂(Me),
(EtO)₂(Me)Si—CH₂—C(H)Me-CH₂—S—Si(Et)₂-S—CH₂—C(H)Me-CH₂—Si(OEt)₂(Me),
(EtO)₂(Me)Si—CH₂—C(H)Me-CH₂—S—Si(Bu)₂-S—CH₂—C(H)Me-CH₂—Si(OEt)₂(Me),
(PrO)₂(Me)Si—CH₂—C(H)Me-CH₂—S—Si(Me)₂-S—CH₂—C(H)Me-CH₂—Si(OPr)₂(Me),
(PrO)₂(Me)Si—CH₂—C(H)Me-CH₂—S—Si(Et)₂-S—CH₂—C(H)Me-CH₂—Si(OPr)₂(Me),
(PrO)₂(Me)Si—CH₂—C(H)Me-CH₂—S—Si(Bu)₂-S—CH₂—C(H)Me-CH₂—Si(OPr)₂(Me),
(MeO)₃Si—(CH₂)₃—S—Sn(Me)₂-S—(CH₂)₃—Si(OMe)₃,
(MeO)₃Si—(CH₂)₃—S—Sn(Et)₂-S—(CH₂)₃—Si(OMe)₃,
(MeO)₃Si—(CH₂)₃—S—Sn(Bu)₂-S—(CH₂)₃—Si(OMe)₃,
(EtO)₃Si—(CH₂)₃—S—Sn(Me)₂-S—(CH₂)₃—Si(OEt)₃,
(EtO)₃Si—(CH₂)₃—S—Sn(Et)₂-S—(CH₂)₃—Si(OEt)₃,
(EtO)₃Si—(CH₂)₃—S—Sn(Bu)₂-S—(CH₂)₃—Si(OEt)₃,
(PrO)₃Si—(CH₂)₃—S—Sn(Me)₂-S—(CH₂)₃—Si(OPr),
(PrO)₃Si—(CH₂)₃—S—Sn(Et)₂-S—(CH₂)₃—Si(OPr)₃,
(PrO)₃Si—(CH₂)₃—S—Sn(Bu)₂-S—(CH₂)₃—Si(OPr)₃,
(MeO)₃Si—(CH₂)₂—S—Sn(Me)₂-S—(CH₂)₂—Si(OMe)₃,
(MeO)₃Si—(CH₂)₂—S—Sn(Et)₂-S—(CH₂)₂—Si(OMe)₃,
(MeO)₃Si—(CH₂)₂—S—Sn(Bu)₂-S—(CH₂)₂—Si(OMe)₃,
(EtO)₃Si—(CH₂)₂—S—Sn(Me)₂-S—(CH₂)₂—Si(OEt)₃,
(EtO)₃Si—(CH₂)₂—S—Sn(Et)₂-S—(CH₂)₂—Si(OEt)₃,
(EtO)₃Si—(CH₂)₂—S—Sn(Bu)₂-S—(CH₂)₂—Si(OEt)₃,
(PrO)₃Si—(CH₂)₂—S—Sn(Me)₂-S—(CH₂)₂—Si(OPr)₃,
(PrO)₃Si—(CH₂)₂—S—Sn(Et)₂-S—(CH₂)₂—Si(OPr)₃,
(PrO)₃Si—(CH₂)₂—S—Sn(Bu)₂-S—(CH₂)₂—Si(OPr)₃,
(MeO)₃Si—CH₂—S—Sn(Me)₂-S—CH₂—Si(OMe)₃,
(MeO)₃Si—CH₂—S—Sn(Et)₂-S—CH₂—Si(OMe)₃,
(MeO)₃Si—CH₂—S—Sn(Bu)₂-S—CH₂—Si(OMe)₃,
(EtO)₃Si—CH₂—S—Sn(Me)₂-S—CH₂—Si(OEt)₃, (EtO)₃Si—CH₂—S—Sn(Et)₂-S—CH₂—Si(OEt)₃,
(EtO)₃Si—CH₂—S—Sn(Bu)₂-S—CH₂—Si(OEt)₃, (PrO)₃Si—CH₂—S—Sn(Me)₂-S—CH₂—Si(OPr)₃,
(PrO)₃Si—CH₂—S—Sn(Et)₂-S—CH₂—Si(OPr)₃, (PrO)₃Si—CH₂—S—Sn(Bu)₂-S—CH₂—Si(OPr)₃,
(MeO)₃Si—CH₂—CMe₂-CH₂—S—Sn(Me)₂-S—CH₂—CMe₂-CH₂—Si(OMe)₃,
(MeO)₃Si—CH₂—CMe₂-CH₂—S—Sn(Et)₂-S—CH₂—CMe₂-CH₂—Si(OMe)₃,
(MeO)₃Si—CH₂—CMe₂-CH₂—S—Sn(Bu)₂-S—CH₂—CMe₂-CH₂—Si(OMe)₃,
(EtO)₃Si—CH₂—CMe₂-CH₂—S—Sn(Me)₂-S—CH₂—CMe₂-CH₂—Si(OEt)₃,
(EtO)₃Si—CH₂—CMe₂-CH₂—S—Sn(Et)₂-S—CH₂—CMe₂-CH₂—Si(OEt)₃,
(EtO)₃Si—CH₂—CMe₂-CH₂—S—Sn(Bu)₂-S—CH₂—CMe₂-CH₂—Si(OEt)₃,
(PrO)₃Si—CH₂—CMe₂-CH₂—S—Sn(Me)₂-S—CH₂—CMe₂-CH₂—Si(OPr)₃,
(PrO)₃Si—CH₂—CMe₂-CH₂—S—Sn(Et)₂-S—CH₂—CMe₂-CH₂—Si(OPr)₃,
(PrO)₃Si—CH₂—CMe₂-CH₂—S—Sn(Bu)₂-S—CH₂—CMe₂-CH₂—Si(OPr)₃,
(MeO)₃Si—CH₂—C(H)Me-CH₂—S—Sn(Me)₂-S—CH₂—C(H)Me-CH₂—Si(OMe)₃,
(MeO)₃Si—CH₂—C(H)Me-CH₂—S—Sn(Et)₂-S—CH₂—C(H)Me-CH₂—Si(OMe)₃,
(MeO)₃Si—CH₂—C(H)Me-CH₂—S—Sn(Bu)₂-S—CH₂—C(H)Me-CH₂—Si(OMe)₃,
(EtO)₃Si—CH₂—C(H)Me-CH₂—S—Sn(Me)₂-S—CH₂—C(H)Me-CH₂—Si(OEt)₃,
(EtO)₃Si—CH₂—C(H)Me-CH₂—S—Sn(Et)₂-S—CH₂—C(H)Me-CH₂—Si(OEt)₃,
(EtO)₃Si—CH₂—C(H)Me-CH₂—S—Sn(Bu)₂-S—CH₂—C(H)Me-CH₂—Si(OEt)₃,
(PrO)₃Si—CH₂—C(H)Me-CH₂—S—Sn(Me)₂-S—CH₂—C(H)Me-CH₂—Si(OPr)₃,
(PrO)₃Si—CH₂—C(H)Me-CH₂—S—Sn(Et)₂-S—CH₂—C(H)Me-CH₂—Si(OPr)₃,
(PrO)₃Si—CH₂—C(H)Me-CH₂—S—Sn(Bu)₂-S—CH₂—C(H)Me-CH₂—Si(OPr)₃,
(MeO)₂(Me)Si—(CH₂)₃—S—Sn(Me)₂-S—(CH₂)₃—Si(OMe)₂(Me),
(MeO)₂(Me)Si—(CH₂)₃—S—Sn(Et)₂-S—(CH₂)₃—Si(OMe)₂(Me),
(MeO)₂(Me)Si—(CH₂)₃—S—Sn(Bu)₂-S—(CH₂)₃—Si(OMe)₂(Me),
(EtO)₂(Me)Si—(CH₂)₃—S—Sn(Me)₂-S—(CH₂)₃—Si(OEt)₂(Me),
(EtO)₂(Me)Si—(CH₂)₃—S—Sn(Et)₂-S—(CH₂)₃—Si(OEt)₂(Me),
(EtO)₂(Me)Si—(CH₂)₃—S—Sn(Bu)₂-S—(CH₂)₃—Si(OEt)₂(Me),
(PrO)₂(Me)Si—(CH₂)₃—S—Sn(Me)₂-S—(CH₂)₃—Si(OPr)₂(Me),
(PrO)₂(Me)Si—(CH₂)₃—S—Sn(Et)₂-S—(CH₂)₃—Si(OPr)₂(Me),
(PrO)₂(Me)Si—(CH₂)₃—S—Sn(Bu)₂-S—(CH₂)₃—Si(OPr)₂(Me),
(MeO)₂(Me)Si—(CH₂)₂—S—Sn(Me)₂-S—(CH₂)₂—Si(OMe)₂(Me),
(MeO)₂(Me)Si—(CH₂)₂—S—Sn(Et)₂-S—(CH₂)₂—Si(OMe)₂(Me),
(MeO)₂(Me)Si—(CH₂)₂—S—Sn(Bu)₂-S—(CH₂)₂—Si(OMe)₂(Me),
(EtO)₂(Me)Si—(CH₂)₂—S—Sn(Me)₂-S—(CH₂)₂—Si(OEt)₂(Me),
(EtO)₂(Me)Si—(CH₂)₂—S—Sn(Et)₂-S—(CH₂)₂—Si(OEt)₂(Me),
(EtO)₂(Me)Si—(CH₂)₂—S—Sn(Bu)₂-S—(CH₂)₂—Si(OEt)₂(Me),
(PrO)₂(Me)Si—(CH₂)₂—S—Sn(Me)₂-S—(CH₂)₂—Si(OPr)₂(Me),
(PrO)₂(Me)Si—(CH₂)₂—S—Sn(Et)₂-S—(CH₂)₂—Si(OPr)₂(Me),
(PrO)₂(Me)Si—(CH₂)₂—S—Sn(Bu)₂-S—(CH₂)₂—Si(OPr)₂(Me),
(MeO)₂(Me)Si—CH₂—S—Sn(Me)₂-S—CH₂—Si(OMe)₂(Me),
(MeO)₂(Me)Si—CH₂—S—Sn(Et)₂-S—CH₂—Si(OMe)₂(Me),
(MeO)₂(Me)Si—CH₂—S—Sn(Bu)₂-S—CH₂—Si(OMe)₂(Me),
(EtO)₂(Me)Si—CH₂—S—Sn(Me)₂-S—CH₂—Si(OEt)₂(Me),
(EtO)₂(Me)Si—CH₂—S—Sn(Et)₂-S—CH₂—Si(OEt)₂(Me),
(EtO)₂(Me)Si—CH₂—S—Sn(Bu)₂-S—CH₂—Si(OEt)₂(Me),
(PrO)₂(Me)Si—CH₂—S—Sn(Me)₂-S—CH₂—Si(OPr)₂(Me),
(PrO)₂(Me)Si—CH₂—S—Sn(Et)₂-S—CH₂—Si(OPr)₂(Me),
(PrO)₂(Me)Si—CH₂—S—Sn(Bu)₂-S—CH₂—Si(OPr)₂(Me),
(MeO)₂(Me)Si—CH₂—CMe₂-CH₂—S—Sn(Me)₂-S—CH₂—CMe₂-CH₂—Si(OMe)₂(Me),
(MeO)₂(Me)Si—CH₂—CMe₂-CH₂—S—Sn(Et)₂-S—CH₂—CMe₂-CH₂—Si(OMe)₂(Me), (MeO)$_2$(Me)Si—CH$_2$—CMe$_2$-CH$_2$—S—Sn(Bu)$_2$-S—CH$_2$—CMe$_2$-CH$_2$—Si(OMe)$_2$(Me),
(EtO)$_2$(Me)Si—CH$_2$—CMe$_2$-CH$_2$—S—Sn(Me)$_2$-S—CH$_2$—CMe$_2$-CH$_2$—Si(OEt)$_2$(Me),
(EtO)$_2$(Me)Si—CH$_2$—CMe$_2$-CH$_2$—S—Sn(Et)$_2$-S—CH$_2$—CMe$_2$-CH$_2$—Si(OEt)$_2$(Me),
(EtO)$_2$(Me)Si—CH$_2$—CMe$_2$-CH$_2$—S—Sn(Bu)$_2$-S—CH$_2$—CMe$_2$-CH$_2$—Si(OEt)$_2$(Me),
(PrO)$_2$(Me)Si—CH$_2$—CMe$_2$-CH$_2$—S—Sn(Me)$_2$-S—CH$_2$—CMe$_2$-CH$_2$—Si(OPr)$_2$(Me),
(PrO)$_2$(Me)Si—CH$_2$—CMe$_2$-CH$_2$—S—Sn(Et)$_2$-S—CH$_2$—CMe$_2$-CH$_2$—Si(OPr)$_2$(Me),
(PrO)$_2$(Me)Si—CH$_2$—CMe$_2$-CH$_2$—S—Sn(Bu)$_2$-S—CH$_2$—CMe$_2$-CH$_2$—Si(OPr)$_2$(Me),
(MeO)$_2$(Me)Si—CH$_2$—C(H)Me-CH$_2$—S—Sn(Me)$_2$-S—CH$_2$—C(H)Me-CH$_2$—Si(OMe)$_2$(Me),
(MeO)$_2$(Me)Si—CH$_2$—C(H)Me-CH$_2$—S—Sn(Et)$_2$-S—CH$_2$—C(H)Me-CH$_2$—Si(OMe)$_2$(Me),
(MeO)$_2$(Me)Si—CH$_2$—C(H)Me-CH$_2$—S—Sn(Bu)$_2$-S—CH$_2$—C(H)Me-CH$_2$—Si(OMe)$_2$(Me),
(EtO)$_2$(Me)Si—CH$_2$—C(H)Me-CH$_2$—S—Sn(Me)$_2$-S—CH$_2$—C(H)Me-CH$_2$—Si(OEt)$_2$(Me),
(EtO)$_2$(Me)Si—CH$_2$—C(H)Me-CH$_2$—S—Sn(Et)$_2$-S—CH$_2$—C(H)Me-CH$_2$—Si(OEt)$_2$(Me),
(EtO)$_2$(Me)Si—CH$_2$—C(H)Me-CH$_2$—S—Sn(Bu)$_2$-S—CH$_2$—C(H)Me-CH$_2$—Si(OEt)$_2$(Me),
(PrO)$_2$(Me)Si—CH$_2$—C(H)Me-CH$_2$—S—Sn(Me)$_2$-S—CH$_2$—C(H)Me-CH$_2$—Si(OPr)$_2$(Me),
(PrO)$_2$(Me)Si—CH$_2$—C(H)Me-CH$_2$—S—Sn(Et)$_2$-S—CH$_2$—C(H)Me-CH$_2$—Si(OPr)$_2$(Me),
(PrO)$_2$(Me)Si—CH$_2$—C(H)Me-CH$_2$—S—Sn(Bu)$_2$-S—CH$_2$—C(H)Me-CH$_2$—Si(OPr)$_2$(Me).

If more than one chain end-modifying agent is used for the purpose of chain end modification, the chain end-modifying agents can be added one after another to a solution of the living anionic polymer, or they can be mixed together before adding the resulting mixture to a solution of the living anionic polymer.

The chain end-modifying agents may be added intermittently (or at regular or irregular intervals) or continuously during the polymerization, but are preferably added at a conversion rate of the polymerization of more than 80 percent and more preferably at a conversion rate of more than 90 percent. Preferably, a substantial amount of the polymer chain ends is not terminated prior to the reaction with the chain end modifying agent; that is, living polymer chain ends are present and are capable of reacting with the modifying agent. The chain end modification reaction may occur before, after or during the addition of any coupling agent.

Preferably the chain end modification reaction is completed after the addition of any coupling agent. See, for example, WO 2009/148932, incorporated herein by reference.

Process of Chain End Modification

The polymer composition according to the first aspect of the invention is a reaction product of living polymer chains comprising alpha- and omega,omega'-carbanionic polymer chain ends with at least one chain end-modifying agent. The living polymer chains comprising alpha- and omega,omega'-carbanionic polymer chain ends are the reaction product of an initiator mixture comprising at least one monoanionic polymerization initiator and at least one dianionic polymerization initiator with monomers. Monoanionic initiators form, after reaction with monomers, living monoanionic polymer chain ends (alpha-carbanionic chain end), and dianionic initiators form, after reaction with monomers, living dianionic polymer chain ends (omega,omega'-carbanionic polymer chain ends). Each carbanionic polymer chain end could react with one equivalent of chain end-modifying agent resulting in alpha- or omega,omega'-modified polymer chain ends. According to the invention, the reaction of a monoanionic polymer chain end with a modifying agent results in an alpha-modified polymer chain of Formula 2, while the reaction of both dianionic polymer chain ends with a modifying agent result in a) an omega,omega'-modified polymer chain of Formula 1 (when the modifying agent is used stoichiometrically in relation to the anionic polymer chain ends), or b) a mixture of alpha-modified polymer chains of Formula 2 and omega,omega'-modified polymer chains of Formula 1 (when the modifying agent is used substoichiometrically in relation to the anionic polymer chain ends).

The chain end-modifying agent may be added directly to the polymer solution without dilution; however, it may be beneficial to add the modifying agent in dissolved form, such as in an inert solvent (e.g. cyclohexane). The amount of chain end-modifying agent to be added to the polymerization may vary depending on the monomer species, coupling agent, chain end-modifying agent, reaction conditions and desired polymer properties. In the present invention, the amount of chain end-modifying agent is specifically adjusted on the basis of the molar ratio of the compounds of Formula 9 and 10, as defined herein. The polymer chain end modification reaction may be carried out at a temperature ranging from 0° C. to 150° C., preferably from 15° C. to 120° C. and even more preferably from 30° C. to 100° C. There is no limitation as regards the duration of the chain end modification reaction. However, with respect to an economical polymerization process, for example, in the case of a batch polymerization process, the chain end modification reaction is usually stopped at about 5 to 60 minutes after the addition of the modifying agent.

A method for making the modified polymer of the invention comprises at least the following steps A through C:

Step A: reacting a compound of Formula 9 with a compound of Formula 10 to obtain an initiator mixture of mono- and dianionic initiators.

Step B: reacting the initiator mixture with one or more polymerizable monomers selected from conjugated olefins, preferably selected from butadiene and isoprene, and optionally aromatic vinyl compounds, preferably selected from styrene and alpha-methyl styrene, in a polymerization solvent and optionally in the presence of a monomer which is capable of reacting with more than one growing polymer chain, such as divinylbenzene. Suitable polymerization solvents include non-polar aliphatic and non-polar aromatic solvents, preferably hexane, heptane, butane, pentane, isopar, cyclohexane, toluene and benzene.

Step C: reacting the reaction product of step A with at least one chain end-modifying agent selected from Formula 11 to Formula 15 (as described herein), preferably from Formula 11, to form the chain end-modified polymer.

Randomizer Agents

Polar coordinator compounds, also referred to as randomizer agents, may optionally be added to the polymerization to adjust the microstructure of the conjugated diene portion (including the content of vinyl bonds of the polybutadiene fraction), or to adjust the composition distribution of the aromatic vinyl compound, thus serving as a randomizer component. Two or more randomizer agents may be used in combination. Exemplary randomizer agents are Lewis bases and include, but are not limited to, ether compounds, such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, alkyltetrahydrofurylethers, such as methyltetrahydrofurylether, ethyltetrahydrofurylether, propyltetrahydrofurylether, butyltetrahydrofurylether, hexyltetrahydrofurylether, octyltetrahydrofurylether, tetrahydrofuran, 2,2-(bistetrahydrofurfuryl)propane, bistetrahydrofurfurylformal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene and dimethoxyethane, and tertiary amine compounds, such as triethylamine, pyridine, N,N,N',N'-tetramethyl ethylenediamine, dipiperidinoethane, methyl ether of N,N-diethylethanolamine, ethyl ether of N,N-diethylethanolamine and N,N-diethylethanolamine. Examples of preferred randomizer compounds are identified in WO 2009/148932, incorporated herein by reference in its entirety. The randomizer agent(s) will typically be added at a molar ratio of randomizer compound to initiator compound of from 0.012:1 to 10:1, preferably from 0.1:1 to 8:1 and more preferably from 0.25:1 to about 6:1.

Coupling Agents

Polymerization compositions of the invention may optionally be reacted with one or more coupling agents to form branched polymers.

Coupling agents include tin tetrachloride, tin tetrabromide, tin tetrafluoride, tin tetraiodide, silicon tetrachloride, silicon tetrabromide, silicon tetrafluoride, silicon tetraiodide, alkyl tin and alkyl silicon trihalides or dialkyl tin and dialkyl silicon dihalides. Polymers coupled with tin or silicon tetrahalides have a maximum of four arms, polymers coupled with alkyl tin and alkyl silicon trihalides have a maximum of three arms, and polymers coupled with dialkyl tin and dialkyl silicon dihalides have a maximum of two arms. Hexahalo disilanes or hexahalo disiloxanes can also be used as coupling agents, resulting in polymers with a maximum of six arms. Useful tin and silicon halides coupling agents include: $SnCl_4$, $(R_1)_3SnCl$, $(R_1)_2SnCl_2$, $R_1SnCl_3$, $SiCl_4$, $R_1SiCl_3$, $(R_1)_2SiCl_2$, $(R_1)_3SiCl$, $Cl_3Si—SiCl_3$, $Cl_3Si—O—SiCl_3$, $Cl_3Sn—SnCl_3$ and $Cl_3Sn—O—SnCl_3$ wherein $R_1$ is a hydrocarbyl group, preferably an alkyl group. Examples of tin and silicon alkoxides coupling agents further include: $Sn(OMe)_4$, $Si(OMe)_4$, $Sn(OEt)_4$ and $Si(OEt)_4$. The most preferred coupling agents are: $SnCl_4$, $SiCl_4$, $Sn(OMe)_4$ and $Si(OMe)_4$.

The coupling agents may be added intermittently (or at regular or irregular intervals) or continuously during the polymerization, but are preferably added at a conversion rate of the polymerization of more than 80 percent and more preferably at a conversion rate of more than 90 percent. The coupling agent will typically be added only after a high degree of conversion has already been achieved.

For example, a coupling agent can be continuously added during the polymerization, in cases where asymmetrical coupling is desired. Such continuous addition is normally carried out in a reaction zone separate from the zone where the bulk of the polymerization is taking place. The coupling agent can be added in a hydrocarbon solution, for example, in cyclohexane, to the polymerization admixture, with suitable mixing for distribution and reaction. Typically, from 0.01 to 2.0 mol, preferably from 0.02 to 1.5 mol and more preferably from 0.04 to 0.6 mol of the coupling agent is used for every 4.0 moles of living anionic polymer chain ends.

Preferably, a substantial amount of the polymer chain ends is not terminated prior to the reaction with the coupling agent; that is, living polymer chain ends are present and capable of reacting with the coupling agent in a polymer chain coupling reaction. The coupling reaction occurs before, after or during the addition of any chain end-modifying agent. The coupling reaction is preferably completed prior to the addition of the chain end-modifying agent. In some embodiments, between 5 and 20 percent of the living polymer chain ends, as determined by GPC, have reacted with coupling agent prior to the addition of the chain end-modifying agent. In other embodiments, between 20 and 35 percent of the living polymer chain ends have reacted with coupling agent prior to the addition of the chain end-modifying agent. In yet another embodiment, between 35 and 50 percent of the living polymer chain ends have reacted with coupling agent prior to the addition of the chain end-modifying agent.

A combination of different coupling agents such as $Bu_2SnCl_2$ and $SnCl_4$; $Me_2SiCl_2$ and $Si(OMe)_4$; $Me_2SiCl_2$ and $SiCl_4$; $SnCl_4$ and $Si(OMe)_4$; $SnCl_4$ and $SiCl_4$, can also be used to couple polymer chains. It is particularly desirable to use a combination of tin and silicon coupling agents in tire tread compounds that contain both silica and carbon black. In such case, the molar ratio of the tin to the silicon compound will normally be within the range of from 20:80 to 95:5; more typically from 40:60 to 90:10 and preferably from 60:40 to 85:15. Most typically, an amount of from about 0.001 to 4.5 mmol of coupling agent is employed per 100 grams of polymer. It is normally preferred to utilize from about 0.05 to about 0.5 mmol of coupling agent per 100 grams of polymer to obtain the desired Mooney viscosity and to enable subsequent chain end functionalization of the remaining living polymer fraction. Larger quantities tend to produce polymers containing terminally reactive groups or insufficient coupling and only enable an insufficient chain end modification.

The polymer coupling reaction may be carried out in a temperature range of from 0° C. to 150° C., preferably from 15° C. to 120° C. and even more preferably from 40° C. to 100° C. There is no limitation for the duration of the coupling reaction. However, with respect to an economical polymerization process, for example in the case of a batch polymerization process, the coupling reaction is usually stopped at about 5 to 60 minutes after the addition of the coupling agent.

In a preferred embodiment of the invention divinylbenzene is used as a coupling agent. The divinylbenzene will typically be added together with the monomers before the start of the polymerization by addition of the initiator.

Method of Making the Polymer Composition

The method of making the polymer composition according to the second aspect of the invention comprises the steps of i) reacting a polymerization initiator mixture, obtainable by reacting a compound of Formula 9 as defined herein with a compound of Formula 10, with one or more polymerizable monomers selected from conjugated dienes and aromatic vinyl compounds to obtain living polymer chains, wherein the living polymer chains contain at least 40% by weight of repeating units obtained by polymerization of said conjugated dienes, and wherein the molar ratio of compounds of Formula 10 to compounds of Formula 9 is in the range of from 1:1 to 8:1, and ii) reacting the living polymer chains of step i) with one or more chain end-modifying agents of Formula 11 to Formula 15 as defined herein, preferably one or more chain end-modifying agents of Formula 11, and under the conditions as defined herein.

In one embodiment, the method of making the polymer composition comprises the steps of:

firstly reacting a compound of Formula 9 with more than 2.1 and up to 8 mol equivalents of a compound of Formula 10 to form a mixture of mono- and dianionic species and further reacting it with at least one type of polymerizable monomers selected from conjugated olefins and aromatic vinyl compounds, thus forming a mixture of alpha-monoanionic living polymer chains and omega,omega'-dianionic living polymer chains, and further adding and reacting at least one chain end modifier of Formula 11 to Formula 15, preferably of Formula 11, thus forming a polymer composition comprising a) polymers of Formula 2 which are modified at one chain end (alpha-modified) and b) polymers of Formula 1 which are modified on both terminals of the linear polymer chain ends (omega, omega'-modified).

In another embodiment, the method of making the modified polymer comprises the steps of:

firstly reacting a compound of Formula 9 with 1 to 2.1 mol equivalents of a compound of Formula 10 to form a dianionic species and further reacting it with at least one type of polymerizable monomers selected from conjugated olefins and aromatic vinyl compounds, thus forming omega, omega'-dianionic living polymer chains, and further adding and reacting at least one chain end modifier of Formula 11 to Formula 15, preferably of Formula 11, wherein the ratio of the sum of chain end modifiers to compound of Formula 10 is from 0.15 to 0.85, thus forming a polymer composition comprising a) polymers of Formula 2 which are modified at one chain end (alpha-modified) and b) polymers which are modified on both terminals of the linear polymer chain ends (omega,omega'-modified) and optionally c) polymers which are not modified.

The method of making the polymer composition is conventionally carried out in a polymerization solvent as a solution polymerization, wherein the polymer formed is substantially soluble in the reaction mixture, or as a suspension/slurry polymerization, wherein the polymer formed is substantially insoluble in the reaction medium. Suitable polymerization solvents include non-polar aliphatic and non-polar aromatic solvents, preferably hexane, heptane, butane, pentane, isopar, cyclohexane, toluene and benzene. The solution polymerization normally takes place at lower pressures, preferably below 10 MPa, preferably in a temperature range of from 0 to 120° C. The polymerization is generally conducted under batch, continuous or semi-continuous polymerization conditions.

Generally applicable information about the polymerization technologies including polar coordinator compounds and accelerators, each to increase the reactivity of the initiator, to randomly arrange aromatic vinyl compounds, to randomly arrange 1,2-polybutadiene or 1,2-polyisoprene or 3,4-polyisoprene units introduced in the polymer; the amounts of each compound; monomer(s); and suitable process conditions are described in WO 2009/148932, fully incorporated herein by reference.

Polymer Composition—Further Components

The polymer composition according to the first aspect of the invention may additionally comprise one or more further components selected from (i) components which are added to or formed as a result of the polymerization process used for making the polymer and (ii) components which remain after solvent removal from the polymerization process. Generally, this "second polymer composition" is the solvent-free result of the method of making the polymer composition and may comprise components selected from oils (softeners or extender oils), stabilizers and further (non-inventive) polymers. Suitable oils are as defined herein. The further polymers can also be made separately, for example in a different polymerization reactor, in solution and can be added to the reactor prior to completion of the polymer manufacturing process for the polymer.

The second polymer composition as obtained after removal of solvent and process water from the polymerization process preferably has a Mooney viscosity (ML 1+4, 100° C., as measured in accordance with ASTM D 1646 (2004) using a Monsanto MV2000 instrument) of up to 150, preferably from 20 to 120 and more preferably from 30 to 100. If the Mooney viscosity of the polymer composition is more than 150, the processability, as reflected by filler incorporation and heat build-up in the internal mixer, banding on the roll mill, extrusion rate, extrudate die swell, smoothness, etc., is likely to be negatively affected because the compounding machinery used by the tire manufacturer is not designed to handle such high Mooney rubber grades, and the cost of processing increases. In some cases a Mooney viscosity of less than 20 may not be preferred due to increased tack and cold flow of the uncrosslinked polymer, resulting in difficult handling, poor green strength and poor dimensional stability during storage. In other cases, when the polymer composition is used as a softener, compatibilizer or processing aid in polymer formulations, a Mooney viscosity of less than 20 may be preferred.

The preferred molecular weight distribution of the polymer composition as obtained after solvent removal from the polymerization process, reflected by the ratio of weight average molecular weight to number average molecular weight (Mw/Mn), ranges from 1.0 to 10.0, preferably from 1.1 to 8.0 and more preferably from 1.2 to 4.5.

In the polymer composition of the first aspect of the invention, the polymers of Formula 1 and 2 constitute at least 15% by weight of the polymer present, more preferably at least 30% by weight and even more preferably at least 45% by weight. The remaining amount of polymer is composed of the further polymers mentioned above. Examples of suitable further polymers are identified in WO 2009/148932 and preferably include styrene-butadiene copolymer, natural rubbers, polyisoprene and polybutadiene. It is desirable that such further polymers have a Mooney viscosity (ML 1+4, 100° C. as measured in accordance with ASTM D 1646 (2004)) in the range of from 20 to 150, preferably from 30 to 100.

The polymer composition of the invention may also comprise one or more further components which are added after the polymerization process, including one or more fillers, one or more further polymers which are not a polymer of Formula 1 or Formula 2, and one or more crosslinking agents (vulcanizing agents) ("third polymer composition"). A filler-containing polymer composition is typically the result of a mechanical mixing process involving the first or second polymer composition of the invention, one or more fillers and further optional components.

The polymer composition of the invention may further comprise one or more crosslinking agent as defined further below. A polymer composition containing crosslinking agent can be prepared by kneading a polymer composition of the invention, optionally comprising one or more components selected from oils, stabilizers, fillers and further polymers, and one or more crosslinking agents in a kneader at 140 to 180° C. Alternatively, such a polymer composition can be prepared by kneading a polymer composition of the invention in a kneader at 140 to 180° C. to form a "first stage" composition. The formation of the "first stage" composition may involve one or more mixing steps, preferably 2 to 7 mixing steps. After cooling, crosslinking (vulcanizing) agents such as sulfur, crosslinking (vulcanizing) accelerators, optionally zinc oxide and the like are added to the "first stage" composition, and the resulting "second stage" composition is blended using a Brabender mixer, Banbury mixer or open roll mill to form the desired shape.

Oils

One or more oils may be used in combination with the uncrosslinked polymer composition, optionally containing components (i) and/or (ii), filler and/or crosslinking agent, to reduce viscosity or Mooney values or to improve processability of the polymer composition and various performance properties of the polymer compositions once crosslinked.

Oils can be added to the polymer composition prior to the end of the polymer preparation process and as a separate component after the preparation process. For representative examples and classification of oils see WO 2009/148932 and US 2005/159513, each of which is incorporated herein by reference in its entirety.

Representative oils include MES (Mild Extraction Solvate), RAE (Residual Aromatic Extract, including T-RAE (Treated Residual Aromatic Extract) and S-RAE), DAE (Distillate Aromatic Extract, including TDAE (Treated Distillated Aromatic Extract)) and NAP (light and heavy naphthenic oils, including Nytex 4700, Nytex 8450, Nytex 5450, Nytex 832, Tufflo 2000 and Tufflo 1200). In addition, native oils, including vegetable oils, can be used as extender oils. Representative oils also include functionalized variations of these oils, particularly epoxidized or hydroxylated oils. The oils may contain varying concentrations of polycyclic aromatic compounds, paraffinics, naphthenics and aromatics and may have different glass transition temperatures.

Processing Aids

Processing aids can optionally be added to the polymer composition. They are usually added for reducing the viscosity. As a result, the mixing period is decreased and/or the number of mixing steps is reduced and, consequently, less energy is consumed and/or a higher throughput in the course of the rubber compound extrusion process is achieved. Representative processing aids are described in Rubber Handbook, SGF, The Swedish Institution of Rubber Technology 2000 and in Werner Kleemann, Kurt Weber, Elastverarbeitung-Kennwerte and Berechnungsmethoden, Deutscher Verlag für Grundstoffindustrie (Leipzig, 1990), each of which is incorporated herein by reference in its entirety. Examples of representative processing aids include in particular:

(A) fatty acids, including oleic acid, priolene, pristerene and stearic acid;
(B) fatty acid salts, including Aktiplast GT, PP, ST, T, T-60, 8, F; Deoflow S; Kettlitz Dispergator FL, FL Plus; Dispergum 18, C, E, K, L, N, T, R; Polyplastol 6, 15, 19, 21, 23; Struktol A50P, A60, EF44, EF66, EM16, EM50, WA48, WB16, WB42, WS180, WS280 and ZEHDL;
(C) dispersing agents, including Aflux 12, 16, 42, 54, 25; Deoflow A, D; Deogum 80; Deosol H; Kettlitz Dispergator DS, KB, OX; Kettlitz-Mediaplast 40, 50, Pertac/GR; Kettlitz-Dispergator SI; Struktol FL and WB 212; and
(D) dispersing agents or processing aids for highly active white fillers, including Struktol W33, WB42, HT207, HT254, HT276; Ultra-Flow 440 and .700S (Performance Additives).

Fillers

In one embodiment, the polymer composition of the invention comprises one or more fillers, serving as reinforcement agents. Examples of suitable fillers include carbon black (including electroconductive carbon black), carbon nanotubes (CNT) (including discrete CNT, hollow carbon fibers (HCF) and modified CNT carrying one or more functional groups, such as hydroxyl, carboxyl and carbonyl groups) graphite, graphene (including discrete graphene platelets), silica, carbon-silica dual-phase filler, clays (layered silicates, including exfoliated nanoclay and organoclay), calcium carbonate, magnesium carbonate, lignin, amorphous fillers, such as glass particle-based fillers, starch-based fillers, and combinations thereof. Further examples of suitable fillers are described in WO 2009/148932 which is fully incorporated herein by reference.

Examples of suitable carbon black include the one conventionally manufactured by a furnace method, for example having a nitrogen adsorption specific surface area of 50-200 $m^2/g$ and DBP oil absorption of 80-200 ml/100 grams, such as carbon black of the FEF, HAF, ISAF or SAF class, and electroconductive carbon black. In some embodiments, high agglomeration-type carbon black is used. Carbon black is typically used in an amount of from 2 to 100 parts by weight, or 5 to 100 parts by weight, or 10 to 100 parts by weight, or 10 to 95 parts by weight per 100 parts by weight of the total polymer.

Examples of suitable silica fillers include wet process silica, dry process silica and synthetic silicate-type silica. Silica with a small particle diameter and high surface area exhibits a high reinforcing effect. Small diameter, high agglomeration-type silica (i.e. having a large surface area and high oil absorptivity) exhibits excellent dispersibility in the polymer composition, resulting in superior processability. An average particle diameter of silica in terms of the primary particle diameter may be from 5 to 60 nm, or 10 to 35 nm. The specific surface area of the silica particles (measured by the BET method) may be from 35 to 300 $m^2/g$. Silica is typically used in an amount of from 10 to 150 parts by weight, or 30 to 130 parts by weight, or 50 to 130 parts by weight per 100 parts by weight of the total polymer.

Silica fillers can be used in combination with other fillers, including carbon black, carbon nanotubes, carbon-silica dual-phase-filler, graphene, graphite, clay, calcium carbonate, magnesium carbonate and combinations thereof.

Carbon black and silica may be added together, in which case the total amount of carbon black and silica is from 30 to 150 parts by weight or 50 to 150 parts by weight per 100 parts by weight of the total polymer.

Carbon-silica dual-phase filler is so called silica-coated carbon black made by coating silica on the surface of carbon black and commercially available under the trademark CRX2000, CRX2002 or CRX2006 (products of Cabot Co.). Carbon-silica dual-phase filler is added in the same amounts as described above with respect to silica.

Silane Coupling Agents

In some embodiments, a silane coupling agent (used for compatibilization of polymer and fillers) can be added to a polymer composition of the invention when additionally containing one or more of silica, layered silicate (such as magadiite) and carbon-silica dual-phase filler. The typical amount of a silane coupling agent added is from about 1 to about 20 parts by weight and, in some embodiments, from about 5 to about 15 parts by weight for 100 parts by weight of the total amount of silica and/or carbon-silica dual-phase filler.

Silane coupling agents can be classified according to Fritz Röthemeyer, Franz Sommer: Kautschuk Technologie, (Carl Hanser Verlag 2006):

(A) bifunctionalized silanes, including Si230 ((EtO)$_3$Si(CH$_2$)$_3$Cl), Si225 ((EtO)$_3$SiCH=CH$_2$), Si263 ((EtO)$_3$Si(CH$_2$)$_3$SH), [(EtO)$_3$Si(CH$_2$)$_3$S$_x$(CH$_2$)$_3$Si(OEt)$_3$] with x=3.75 (Si69), 2.35 (Si75) or 2.15 (Si266), Si264 ((EtO)$_3$Si—(CH$_2$)$_3$SCN) and Si363 ((EtO)Si((CH$_2$—CH$_2$—O)$_5$(CH$_2$)$_{12}$CH$_3$)$_2$(CH$_2$)$_3$SH)) (Evonic Industries AG); NXT (3-octanoylthio-1-propyltriethoxysilane), NXT-Z45, NXT-Z100 (Momentive Performance Materials Inc.); Xiameter® ofs-6030 silane (methacryloxypropyltrimethoxysilane), Xiameter® ofs-6300 silane ((MeO)$_3$SiCH=CH$_2$), and (B) monofunctional silanes, including Si203 ((EtO)$_3$—Si—C$_3$H$_7$) and Si208 ((EtO)$_3$—Si—C$_8$H$_{17}$).

Further suitable examples of silane coupling agents are given in WO 2009/148932 and include bis-(3-hydroxy-dimethylsilyl-propyl)tetrasulfide, bis-(3-hydroxy-dimethylsilyl-propyl) disulfide, bis-(2-hydroxy-dimethylsilyl-ethyl) tetrasulfide, bis-(2-hydroxy-dimethylsilyl-ethyl)disulfide, 3-hydroxy-dimethylsilyl-propyl-N,N-dimethylthiocarbamoyl tetrasulfide and 3-hydroxy-dimethylsilyl-propylbenzothiazole tetrasulfide.

Crosslinking Agents (Vulcanizing Agents)

Any crosslinking agent conventionally used in the manufacture of rubber products can be used in the invention, and a combination of two or more crosslinking agents may be used.

Sulfur, sulfur-containing compounds acting as sulfur donors, sulfur accelerator systems and peroxides are the most common crosslinking agents. Examples of sulfur-containing compounds acting as sulfur donors include dithiodimorpholine (DTDM), tetramethylthiuram disulfide (TMTD), tetraethylthiuram disulfide (TETD) and dipentamethylenethiuram tetrasulfide (DPTT). Examples of sulfur accelerators include amine derivatives, guanidine derivatives, aldehydeamine condensation products, thiazoles, thiuram sulfides, dithiocarbamates and thiophosphates. Examples of peroxides include di-tert.-butyl-peroxides, di-(tert.-butyl-peroxy-trimethyl-cyclohexane), di-(tert. -butyl-peroxy-isopropyl-)benzene, dichloro-benzoylperoxide, dicumylperoxides, tert.-butyl-cumyl-peroxide, dimethyl-di(tert.-butyl-peroxy)hexane, dimethyl-di(tert.-butyl-peroxy)hexine and butyl-di(tert.-butyl-peroxy)valerate (Rubber Handbook, SGF, The Swedish Institution of Rubber Technology 2000).

Further examples and additional information regarding crosslinking agents can be found in Kirk-Othmer, Encyclopedia of Chemical technology 3rd, Ed., (Wiley Interscience, N.Y. 1982), volume 20, pp. 365-468, (specifically "Vulcanizing Agents and Auxiliary Materials" pp. 390-402).

A crosslinking accelerator of the sulfene amide-type, guanidine-type or thiuram-type can be used together with a crosslinking agent as required. Other additives such as zinc white, crosslinking auxiliaries, aging preventives, processing adjuvants and the like may optionally be added. A crosslinking agent is typically added to the polymer composition in an amount of from 0.5 to 10 parts by weight or, in some embodiments, 1 to 6 parts by weight per 100 parts by weight of the total polymer. Examples of crosslinking accelerators and amount thereof added with respect to the total polymer are given in WO 2009/148932.

Sulfur accelerator systems may or may not contain zinc oxide. Zinc oxide is preferably used as a component of the sulfur accelerator system.

Crosslinked Polymer Composition

The crosslinked polymer composition according to the third aspect of the invention is obtained by crosslinking a polymer composition of the invention which comprises at least one crosslinking agent. Since the crosslinked elastomeric polymer compositions of the invention exhibit low rolling resistance, low dynamic heat build-up and superior wet skid performance, they are well suited for use in manufacturing tires, tire treads, side walls and tire carcasses as well as other industrial products such as belts, hoses, vibration dampers and footwear components.

The crosslinked polymer composition is the result of a reactive polymer-polymer crosslink-forming process which is performed on a polymer composition of the invention containing one or more crosslinking agents. The reactive processing converts an essentially uncrosslinked polymer composition into a crosslinked (or vulcanized) polymer composition.

The invention also provides an article comprising at least one component formed from a crosslinked polymer composition of the invention. The article may be a tire, a tire tread, a tire side wall, an automotive part, a footwear component, a golf ball, a belt, a gasket, a seal or a hose.

For producing vehicle tires, the following further polymers are of particular interest for use in combination with the polymer of the invention: natural rubber; low cis polybutadiene (LCBR) comprising less than 20 percent by weight of 1,2-polybutadiene, emulsion SBR (ESBR) and solution SBR (SSBR) rubbers with a glass transition temperature above −50° C.; polybutadiene rubber with a high cis-1,4-unit content (>90%), such as obtained by using catalysts based on nickel, cobalt, titanium, vanadium, gadolinium or neodymium; and polybutadiene rubber with a vinyl content of 0 to 75%; and combinations thereof; polybutadiene rubber with a high trans-1,4-unit content (>75%) or SBR containing, for example, between 5 and 45 wt % styrene and having a high trans-1,4-polybutadiene content (>75%) in the polybutadiene fraction of the copolymer (each type of polymer, SBR or BR, may be obtained with one or more initiator compounds comprising earth alkaline metal compounds, such as described in U.S. Pat. Nos. 6,693,160; 6,627,715; 6,489,415; 6,103,842; 5,753,579; 5,086,136; and 3,629,213, each of which is hereby incorporated herein by reference in its entirety; or by using catalysts based on cobalt, such as described in U.S. Pat. Nos. 6,310,152; 5,834,573; 5,753,761; 5,448,002 and 5,089,574 and U.S. Patent Application Publication No. 2003/0065114, each of which is hereby incorporated herein by reference in its entirety; or by using catalysts based on vanadium, such as described in EP 1 367 069; JP 11301794 and U.S. Pat. No. 3,951,936, each of which is hereby incorporated herein by reference in its entirety; or by using catalysts based on neodymium, such as described in EP 0 964 008, EP 0 924 214 and U.S. Pat. Nos. 6,184,168; 6,018,007; 4,931,376; 5,134,199 and 4,689,368, each of which is hereby incorporated herein by reference in its entirety).

The composition of the invention may also be used for producing high impact polystyrene (HIPS) and butadiene-modified acrylonitrile-butadiene-styrene copolymer (ABS) (see, for example, WO 2009/148932, incorporated herein by reference).

Definitions

Alkyl groups as defined herein, whether as such or in association with other groups, such as alkaryl or alkoxy, include both straight chain alkyl groups, such as methyl (Me), ethyl (Et), n-propyl (Pr), n-butyl (Bu), n-pentyl, n-hexyl, etc., branched alkyl groups, such as isopropyl, tert-butyl, etc., and cyclic alkyl groups, such as cyclohexyl.

Alkoxy groups as defined herein include methoxy (MeO), ethoxy (EtO), propoxy (PrO), butoxy (BuO), isopropoxy, isobutoxy, pentoxy, etc.

Aryl groups as defined herein include phenyl, biphenyl and other benzenoid compounds. Aryl groups preferably contain only one aromatic ring and most preferably contain a $C_6$ aromatic ring.

Aralkyl groups as defined herein refer to a combination of one or more aryl groups bound to one or more alkyl groups, for example in the form of alkyl-aryl, aryl-alkyl, alkyl-aryl-alkyl and aryl-alkyl-aryl. Aralkyl groups preferably contain only one aromatic ring and most preferably contain a $C_6$ aromatic ring.

EXAMPLES

The following examples are provided in order to further illustrate the invention, and are not to be construed as a limitation of the invention. The examples include the preparation and testing of modified elastomeric polymers; and the preparation and testing of uncrosslinked polymer compositions, as well as of cross-linked or cured polymer compositions, also referred to as vulcanized polymer composition. Unless stated otherwise, all parts and percentages are expressed on weight basis. "Room temperature" refers to a temperature of 20° C. All polymerizations were performed in a nitrogen atmosphere under exclusion of moisture and oxygen.

The vinyl group content in the polybutadiene fraction was determined by FT-IR measurements on a Nicolet AVATAR 360 FT-IR or a Nicolet iS 10 FT-IR, based on a calibration determination with a $^1$H-NMR method as described above. The IR samples were prepared using a press.

Bonded styrene content: A calibration curve was prepared by FT-IT (Nicolet AVATAR 360 FT-IR or Nicolet iS 10 FT-IR). The IR samples were prepared using press. For the IR determination of bonded styrene in styrene-butadiene copolymers, four bands are checked: a) band for trans-1,4-polybutadiene units at 966 cm$^{-1}$, b) band for cis-1,4-polybutadiene units at 730 cm$^{-1}$, c) band for 1,2-polybutadiene units at 910 cm$^{-1}$ and d) band for bonded styrene (styrene aromatic bond) at 700 cm$^{-1}$. The band heights are normalized according to the appropriate extinction coefficients and summarized to a total of 100%. The normalization is done via $^1$H- and $^{13}$C-NMR (Avance 400 of Bruker Analytik GmbH, $^1$H=400 MHz; $^{13}$C=100 MHz).

The 1D NMR spectra were collected on a BRUKER Avance 400 NMR spectrometer (BRUKER Corp.), using a "5 mm Dual detection probe." The field homogeneity was optimized by maximizing the deuterium lock signal. The samples were shimmed by optimizing the deuterium lock signal. The samples were run at room temperature (298 K). The following deuterated solvents were used: $C_6D_6$ (7.16 ppm for $^1$H; 128.06 ppm for $^{13}$C-NMR), CDCl$_3$ (7.26 ppm for $^1$H; 77.16 ppm for $^{13}$C-NMR), the signals of the remaining protons of deuterated solvents were each used as an internal reference.

For spectral processing, the BRUKER TopSpin software was used. Phasing, base line correction and spectral integration of the resulting spectra was done in the manual mode. For acquisition parameters see Table 1.

TABLE 1

| 1D-NMR acquisition parameters using BRUKER standard pulse sequences | | |
|---|---|---|
| | $^1$H-NMR | $^{13}$C-NMR |
| Observe frequency | 400.130 MHz | 100.613 MHz |
| Spectral width | 8278.146 Hz | 23980.814 Hz |

TABLE 1-continued

| 1D-NMR acquisition parameters using BRUKER standard pulse sequences | | |
|---|---|---|
| | $^1$H-NMR | $^{13}$C-NMR |
| BRUKER Pulse program | Zg30 | Zgpg30 |
| Pulse angle | 30° | 30° |
| Relaxation delay | 1.0 s | 2.0 s |
| Number of Data points for FT | 32K | 32K |
| Line broadening | 0.3 Hz | 1 Hz |
| Number of accumulated scans | 64 | >1000 |

GPC-Method: SEC calibrated with narrow distributed polystyrene standard.

Sample preparation:
a) About 9-11 mg dried polymer sample (moisture content<0.6%) was dissolved in 10 mL tetrahydrofuran, using a brown vial of 10 mL size. The polymer was dissolved by shaking the vial for 20 min at 200 u/min.
b) Polymer solution was transferred into a 2 ml vial using a 0.45 μm disposable filter.
c) The 2 ml vial was placed on a sampler for GPC-analysis.
Elution rate: 1.00 mL/min
Injection volume: 100.00 μL Polydispersity (Mw/Mn) was used as a measure for the width of molecular weight distribution. The values of Mw and Mn (weight average molecular weight (Mw) and number average molecular weight (Mn)) were measured by gel permeation chromatography on a SEC with refractive index detection (universal calibration). The measurement was performed in THF at 40° C. Instrument: Agilent Serie 1100/1200; Module setup: degasser, Iso pump, autosampler, thermostat, UV-Detector, RI-Detector.

In each GPC-device, 4 columns were used in a connected mode: 1× Agilent Plgel 10 μm Guard 50×7.5 mm (Part No. PL1110-1120) plus 3× Agilent PLgel 10 μm Mixed-B 300× 7.5 mm (Part No. PL1110-6100).

GPC Standards: EasiCal PS-1 Polystyrene Standards, Spatula A+B (Agilent Technologies, Part No. PL2010-0505).

Mp1, Mp2 and Mp3 correspond to the (maximum peak) molecular weight measured at the third, second and first peak of the GPC curve, respectively (the peak Mp1 (lowest molecular weight) is located on the right-hand side of the curve, and the peak Mp3 (highest molecular weight) is located on the left-hand side of the curve). Maximum peak molecular weight means the molecular weight of the peak at the position of maximum peak intensity. Mp2 and Mp3 are two or three polymer chains coupled to one macromolecule. Mp1 is one polymer chain (base molecular weight—no coupling of two or more polymer chains to one macromolecule).

Third polymer compositions were prepared by combining the component listed below in Table 4, Table 5 or Table 6 in a 380 ml Banbury mixer (Labstation 350S from Brabender GmbH & Co KG), following a two-stage mixing process. Stage 1—mixed all components together, except the components of the vulcanization package, to form a stage 1 formulation. Stage 2—components of vulcanization package were mixed into stage 1 formulation to form a stage 2 formulation.

Mooney viscosity was measured according to ASTM D 1646 (2004), with a preheating time of one minute and a rotor operation time of 4 minutes, at a temperature of 100° C. [ML1+4(100° C.)], on a MV 2000E from Alpha Technologies UK. The rubber Mooney viscosity measurement is performed on dry (solvent free) raw polymer (uncrosslinked rubber). The Mooney values of the raw polymers are listed in Table 2.

Measurement of uncrosslinked rheological properties was performed according to ASTM D 5289-95 (reapproved 2001), using a rotor-less shear rheometer (MDR 2000 E from Alpha Technologies UK) to measure Time to Cure (TC). The rheometer measurement was performed at a constant temperature of 160° C. on a non-crosslinked second stage polymer formulation, according to Table 4, Table 5 or Table 6. The amount of polymer sample is about 4.5 g. Sample shape and shape preparation are standardized and defined by the measurement device (MDR 2000 E from Alpha Technologies UK). The TC 50, TC 90 and TC 95 values are the respective times required to achieve 50%, 90% and 95% conversion of the crosslinking reaction. The torque is measured as a function of time of reaction. The crosslinking conversion is automatically calculated from the generated torque versus time curve. The TS 1 and TS 2 values are the respective times required to increase the torque by 1 dNm and 2 dNm above the respective torque minimum (ML) during crosslinking.

Tensile Strength, Elongation at Break and Modulus at 300% Elongation (Modulus 300) were measured according to ASTM D 412-98A (reapproved 2002), using a dumbbell die C test piece on a Zwick Z010. Standardized dumbbell die C test pieces of 2 mm thickness were used. The tensile strength measurement was performed at room temperature on a cured second stage polymer sample, prepared according to Table 4, Table 5 or Table 6. Stage 2 formulations were crosslinked within 16-25 minutes at 160° C. to TC 95 (95% crosslinking conversion) (see cure data in Table 7).

Heat build-up was measured according to ASTM D 623, method A, on a Doli 'Goodrich'-Flexometer. The heat build-up measurement was performed on crosslinked second stage polymer samples according to Table 4, Table 5 or Table 6. Stage 2 formulations were crosslinked at 160° C. to TC 95 (95% crosslinking conversion) (see cure data in Table 7).

Rebound resilience was measured according to DIN 53512 at 0° C. and 60° C. on a Zwick 5109. The measurement was performed on a cured second stage polymer sample, prepared according to Table 4, Table 5 or Table 6. Stage 2 formulations were crosslinked at 160° C. to TC 95 (95% crosslinking conversion) plus 5 minutes extra time (see cure data in Table 7). The smaller the index at 0° C., the better the wet skid resistance (lower=better). The larger the index at 60° C., the lower the hysteresis loss and the lower the rolling resistance (higher=better).

DIN abrasion was measured according to DIN 53516 (1987-06-01). The larger the index, the lower the wear resistance (lower=better). The abrasion measurement was performed on a crosslinked, second stage polymer formulation according to Table 4, Table 5 or Table 6.

Tan δ at 60° C. and tan δ at 0° C. as well as tan δ at -10° C. measurements were performed on rectangular specimen, with a thickness of 2 mm and a width of 10 mm, using a dynamic mechanical thermal spectrometer "Eplexor 150N," manufactured by Gabo Qualimeter Testanlagen GmbH (Germany), by applying a dynamic strain of 2%, at a frequency of 2 Hz, at the respective temperatures. The start length of the specimen, which is equal to the clamp distance of the equipment, is 10 mm. The smaller the index at a temperature of 60° C., the lower the rolling resistance (lower=better). Tan δ at 0° C. and tan δ at -10° C. were measured using the same equipment and load conditions at 0° C. and -10° C., respectively. The larger the index at 0° C., the better the wet skid resistance and the larger the index at -10° C., the better the ice grip properties (higher=better). Tan δ at 60° C. and tan δ at 0° C. as well as tan δ at -10° C. were determined (see Table 8). Stage 2 formulations were crosslinked at 160° C. to TC 95 (95% crosslinking conversion) (see cure data in Table 7). The process leads to the formation of visually "bubble free," homogeneous cured rubber plates with a thickness of 2 mm. A specimen was cut out by using a specimen cut iron with respective width of 10 mm.

In general, the higher the values for Elongation at Break, Tensile Strength, Modulus 300, and tan δ at 0° C., Rebound Resilience at 60° C. the better the sample performance; whereas the lower the tan δ at 60° C., Heat Build Up, DIN abrasion and Rebound Resilience at 0° C., the better the sample performance.

The sliding friction coefficients were determined by a method according to EN ISO 13287. The measurement is conducted with a Slip Resistance Testing Machine (PFI Germany: GSP 3034), with a measurement accuracy better than 2%. The rubber sample is pressed on a metallic surface with a defined normal force perpendicular to the horizontal surface set to 30N±2%. The sample is mounted with an angle of 7° to the horizontal line to reduce the contact surface between rubber and metal and the force is applied stationary for 0.2 seconds. The sample is forced with a defined velocity of 0.3±0.03 m/s over the metallic surface, while the force of friction, which is the needed force parallel to the surface and against the direction of movement of the sample, is measured. The coefficient of friction is defined as the ratio between the force of friction and normal force. Along the measured way about 60 measurement points are taken, the median value of these measurements is calculated. The bottom plate is made from steel Number 1.4371 conforming to EN10088-2:2005. Samples were prepared by pressing a rubber sample in a form of the size 15×80×115 mm at 100° C. with 200 bars for 7 minutes. Glossy finished chrome-plated sheets are used for pressing, with a layer of polyester film foil between rubber sample and steel sheet, to produce a very smooth and even surface for the samples. For every material four samples are prepared and measured.

The compounds P1 and P2 were synthesized according to the process described in U.S. Pat. No. 4,982,029 and are shown and characterized below:

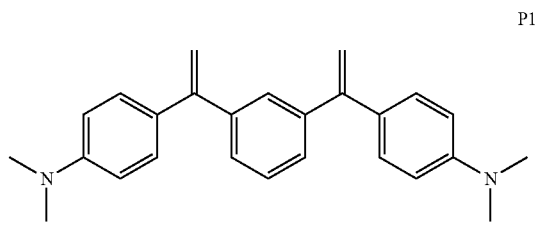

P1

$^1$H-NMR (300 MHz, 23° C., CDCl$_3$): δ=7.42 (s, 1H, Ar—H), 7.30 (s, 7H, Ar—H), 6.73 (d, 4H, Ar—H), 5.40 (s, 2H, =CH$_2$), 5.28 (s, 2H, =CH$_2$), 2.98 (s, 12H, NCH$_3$) ppm; $^{13}$C-NMR (75 MHz, 23° C., CDCl$_3$) δ=149.94, 149.70, 141.70, 128.97, 128.46, 127.78, 127.64, 112.20, 111.49, 40.65 ppm.

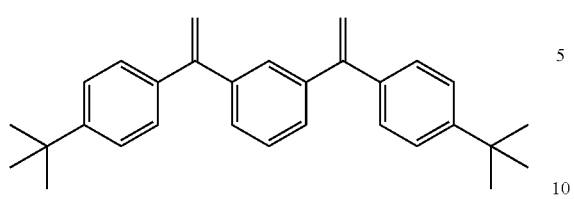

P2

$^1$H NMR (400 MHz, 23° C., CDCl$_3$): δ=7.39-7.40 (m, 1H, Ar—H), 7.35-7.26 (m, 11H, Ar—H), 5.47 (d, J=1.2 Hz, 2 H, HCH═C), 5.40 (d, J=1.2 Hz, 2 H, HCH═C), 1.33 (s, 18H, C(CH$_3$)$_3$) ppm; $^{13}$C NMR (100 MHz, 23° C., CDCl$_3$) δ=150.74, 149.60, 141.53, 138.18, 128.20, 127.85, 127.75, 125.04, 113.85, 34.54, 31.32 ppm.

Preparation of Initiator Mixture I1

The compounds P1 (34.9 g, 94.9 mmol) and TMEDA (38.7 g, 333 mmol) were dissolved in cyclohexane (286 g) and subsequently n-butyllithium (60.3 g, 190 mmol, 20 wt % solution in cyclohexane) was added. The color of the solution immediately turned dark red indicating the formation of the dianion DI1. A GC analysis of sample of I1 hydrolyzed with methanol revealed the complete conversion of P1 to the corresponding dianion DI1.

Due to the very high air and moisture sensitivity of DI1, the compound was characterized as its hydrolyzed product DI1a. Therefore, a sample of the initiator mixture was hydrolyzed with an excess of methanol and characterized by NMR and GC-MS.

$^1$H-NMR (400 MHz, 23° C., C$_6$D$_6$): δ=6.94-6.86 (m, 8H, Ar—H), 6.33-6.31 (m, 4H, Ar—H), 3.63-3.58 (m, 2H, 2× Ar—CH—Ar), 2.22 (s, 12H, NCH$_3$), 1.82-1.76 (m, 2H, Ar$_2$CH—CH$_2$), 1.07-0.88 (m, 12H, (CH$_2$)$_3$CH$_3$), 0.54 (t, 6H, (CH$_2$)$_3$CH$_3$) ppm; $^{13}$C—NMR (101 MHz, 23° C., C$_6$D$_6$) δ=149.43, 146.72, 134.07, 128.86, 128.65, 128.16, 128.15, 127.91, 113.35, 50.99, 40.50, 36.63, 32.34, 28.28, 22.99 ppm.

GC-MS (EI, 70 eV): m/z (%)=485 (M$^+$, 22), 413 (M$^+$—CH$_3$—C$_4$H$_9$, 100), 327 (4), 207 (4), 171 (51), 134 (4).

DI1

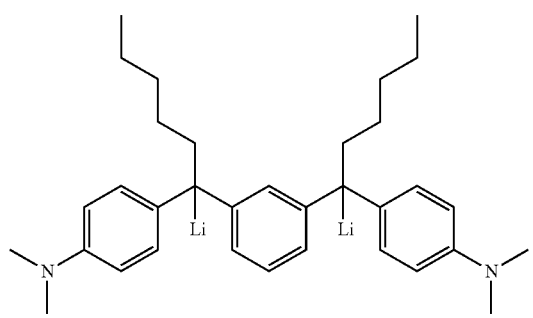

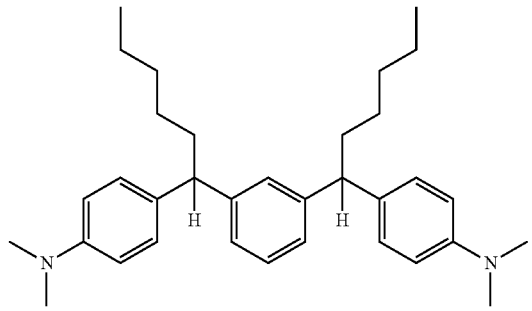

DI1a

Preparation of Initiator Mixture I2

The compounds P2 (22.1 g, 56.1 mmol) and TMEDA (22.9 g, 196 mmol) were dissolved in cyclohexane (500 g) and subsequently n-butyllithium (36.0 g, 112 mmol, 20 wt % solution in cyclohexane) was added. The color of the solution immediately turned dark red indicating the formation of the dianion DI2. A GC analysis of I2 hydrolyzed with methanol revealed the complete conversion of P2 to the corresponding dianion DI2.

Due to the very high air and moisture sensitivity of DI2, the compound was characterized as its hydrolyzed product DI2a. Therefore, a sample of the initiator mixture was hydrolyzed with an excess of methanol and characterized by NMR and GC-MS.

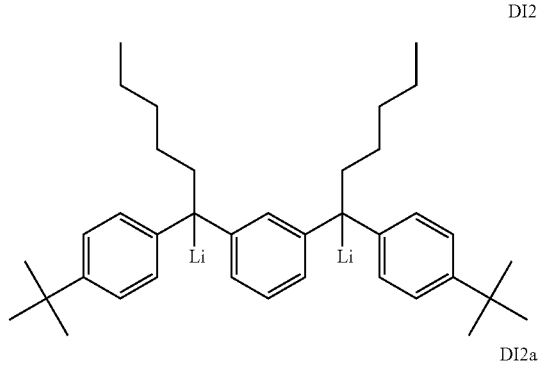

DI2

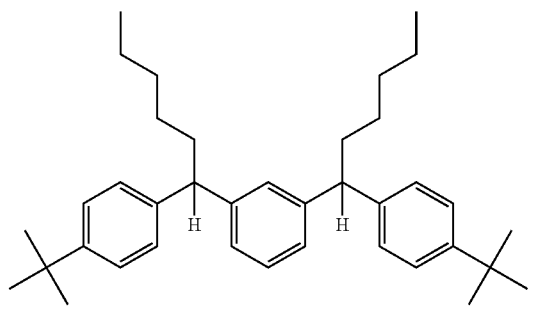

DI2a $^1$H-NMR (400 MHz, 23° C., CDCl$_3$): δ=7.28-7.27 (m, 2H, Ar—H), 7.26-7.24 (m, 2H, Ar—H), 7.16-7.11 (m, 6H, Ar—H), 7.02-6.99 (m, 2H, Ar—H), 3.81 (t, 2H, 2× Ar—CH—Ar), 2.01-1.95 (m, 4H, Ar$_2$CH—CH$_2$), 1.28 (s, 18H, 2× C(CH$_3$)$_3$), 1.27-1.17 (m, 12H, 2× (CH$_2$)$_3$CH$_3$), 0.83 (t, 6H, 2× (CH$_2$)$_3$CH$_3$) ppm; $^{13}$C-NMR (101 MHz, 23° C., CDCl$_3$) δ=148.59, 145.29, 142.67, 128.40, 127.81, 127.46, 125.69, 125.24, 51.00, 36.02, 34.41, 32.00, 31.49, 27.86, 22.66, 14.20 ppm GC-MS (EI, 70 eV): m/z (%)=511 (M$^+$, 5), 439 (M$^+$-CH$_3$C$_4$H$_9$, 100), 240 (12), 212 (13), 147 (5), 57 (11).

Preparation of Initiator Mixture I3

The compounds P2 (31.5 g, 79.8 mmol) and TMEDA (7.43 g, 63.9 mmol) were dissolved in cyclohexane (254 g) and subsequently n-butyllithium (68.2 g, 214 mmol, 20 wt % solution in cyclohexane) was added. The color of the solution immediately turned dark red indicating the formation of the dianion DI2. A GC analysis of I3 hydrolyzed with methanol revealed the complete conversion of P2 to the corresponding dianion DI2.

Preparation of Initiator Mixture I4

The compound P2 (86.7 g, 109 mmol, 50 wt % solution in cyclohexane) and TMEDA (10.0 g, 87.2 mmol) were dissolved in cyclohexane (91.7 g) and subsequently n-butyllithium (95.5 g, 301 mmol, 20 wt % solution in cyclohexane) was added. The color of the solution immediately turned dark red indicating the formation of the dianion DI2. A GC analysis of I4 hydrolyzed with methanol revealed the complete conversion of P2 to the corresponding dianion DI2.

Preparation of Initiator Mixture I5

The compound P2 (34.2 g, 86.7 mmol), TMEDA (10.4 g, 89.2 mmol), cyclohexane (75.0 g) and n-butyllithium (60.5 g, 186 mmol, 20 wt % solution in cyclohexane) were added in this order in a double wall, 0.5 liter steel reactor at 40° C. The mixture immediately reached 70° C. after the dosing of n-butyllithium. The mixture was stirred for 100 min allowing the temperature to cool down to 40° C. A GC analysis of the mixture hydrolyzed with methanol revealed the complete conversion of P2 to the corresponding dianion DI2. Further 1,3-butadiene (45.7 g, 0.84 mol) was added within 10 min. The resulting mixture was used for the polymerization of polymer sample 28.

Preparation of Initiator Mixture I6

The compounds P2 (6.80 g, 8.60 mmol) and TMEDA (0.80 g, 6.90 mmol) were dissolved in cyclohexane (30 g) and subsequently n-butyllithium (7.34 g, 16.7 mmol, 15 wt % solution in cyclohexane) was added. The color of the solution immediately turned dark red indicating the formation of the dianion DI2. A GC analysis of I6 hydrolyzed with methanol revealed the complete conversion of P2 to the corresponding dianion DI2.

Preparation of Initiator Mixture I7

The compound P2 (10.0 g, 25.3 mmol) and TMEDA (9.81 g, 88.7 mmol) were dissolved in cyclohexane (150 g) and subsequently n-butyllithium (16.0 g, 50.7 mmol, 20 wt % solution in cyclohexane) was added. The color of the solution immediately turned dark red indicating the formation of the dianion DI2. A GC analysis of I7 hydrolyzed with methanol revealed the complete conversion of P2 to the corresponding dianion DI2.

Preparation of Initiator Mixture I8

The compound P2 (4.0 g, 10.1 mmol) and TMEDA (4.16 g, 35.0 mmol) were dissolved in cyclohexane (80 g) and subsequently n-butyllithium (6.39 g, 20.3 mmol, 20 wt % solution in cyclohexane) was added. The color of the solution immediately turned dark red indicating the formation of the dianion DI2. A GC analysis of I8 hydrolyzed with methanol revealed the complete conversion of P2 to the corresponding dianion DI2.

Preparation of Initiator Mixture I9

The compounds P2 (16.7 g, 42.3 mmol) and TMEDA (17.2 g, 148 mmol) were dissolved in cyclohexane (520 g) and subsequently n-butyllithium (27.0 g, 84.7 mmol, 20 wt % solution in cyclohexane) was added. The color of the solution immediately turned dark red indicating the formation of the dianion DI2. A GC analysis of I9 hydrolyzed with methanol revealed the complete conversion of P2 to the corresponding dianion DI2.

Preparation of Initiator Mixture I10

The compounds P2 (16.7 g, 42.3 mmol) and TMEDA (17.2 g, 148 mmol) were dissolved in cyclohexane (520 g) and subsequently n-butyllithium (27.0 g, 84.7 mmol, 20 wt % solution in cyclohexane) was added. The color of the solution immediately turned dark red indicating the formation of the dianion DI2. A GC analysis of I10 hydrolyzed with methanol revealed the complete conversion of P2 to the corresponding dianion DI2.

Divinylbenzene (DVB) was purchased from Bowden Chemicals ltd. and used as 0.16 M solution in cyclohexane. The ratio of the isomers 1,3-DVB/1,4-DVB is 70/30.

Chain End-Modifying Agents

Chain End-Modifying Agent E1 is represented by Formula E1 below, and was synthesized according to the procedure described in WO 2009/148932.

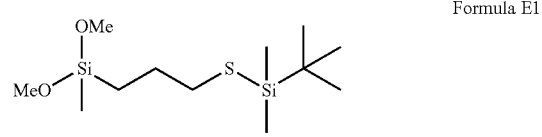 [SMILES: CO[Si](C)(CCCS[Si](C)(C)C(C)(C)C)OC]

Formula E1

Chain End-Modifying Agent E2 was purchased as 1-methyl-2-pyrrolidon from Merck Millipore.

Formula E2

Chain end modification agent E3 is represented by Formula E3 below, and was synthesized as follows:

The compound E1 (114 g, 388 mmol) was dissolved in 400 mL tert-butyl methyl ether (MTBE) and methylmagnesium chloride (140 mL, 420 mmol, 3M solution in tetrahydrofuran) was added via a dropping funnel. After complete addition of the Grignard reagent, the mixture was stirred overnight. Methanol (2 mL) was added to hydrolyze the slight excess of the Grignard reagent followed by a filtration to remove the precipitated magnesium salts. All volatiles were removed under reduced pressure and the residue was distilled fractionally to yield 170 g (79%) of a colorless liquid.

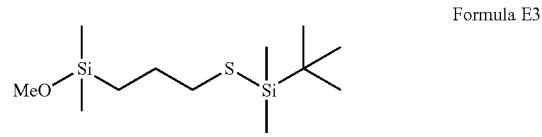 [SMILES: CO[Si](C)(C)CCCS[Si](C)(C)C(C)(C)C]

Formula E3

$^1$H-NMR (400 MHz, 23° C., C$_6$D$_6$): δ=3.25 (s, 3H, OCH$_3$), 2.50 (t, 2H, S—CH$_2$), 1.75-1.68 (m, 2H, CH$_2$—CH$_2$—CH$_2$), 1.00 (s, 9H, C(CH$_3$)$_3$), 0.69-0.65 (m, 2H, Si—CH$_2$), 0.23 (s, 6H, Si(t-Bu)(CH$_3$)$_2$), 0.04 (s, 6H, Si(O-Me)(CH$_3$)$_2$) ppm; $^{13}$C-NMR (101 MHz, 23° C., C$_6$D$_6$) δ=50.02, 30.27, 27.61, 26.55, 19.14, 15.84, −2.54, −3.39 ppm.

Chain end modification agent E4 is represented by Formula E4 below, and was synthesized according to the procedure described in WO 2009/148932.

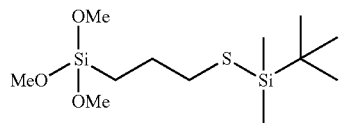

Formula E4

Copolymerization of 1,3-Butadiene with Styrene
Manufacturing of the Examples 1-11, 14-18, 20-21, 24, 28-34 and 36-39

The co-polymerizations were performed in a double wall, 10 liter steel reactor, which was first purged with nitrogen, before the addition of organic solvent, monomers, polar coordinator compound, initiator compound or other components. The following components were then added in the following order: cyclohexane solvent (4600 grams); butadiene monomer, styrene monomer, tetramethylethylenediamine (TMEDA) and optionally divinylbenzene (DVB), and the mixture was heated to 40° C., followed by titration with n-butyllithium to remove traces of moisture or other impurities. The desired polymerization initiator compound was added into the polymerization reactor to initiate the polymerization reaction. If a mixture of initiator compounds is used (e.g. I3 and n-butyllithium in Example 16 in Table 2), if not otherwise stated, they were added at the same time. The polymerization was performed for at least 80 minutes, not allowing the polymerization temperature to exceed 60° C., until the monomer conversion was at least 97%. Afterwards, 2.3% of the total butadiene monomer amount was added, followed by the addition of the chain end modifier, unless stated otherwise. After 20 minutes the polymerization was terminated by the addition of methanol (2 equivalents based on initiator amount). To the polymer solution, 2.20 g IRGANOX 1520 was added as a stabilizer. This mixture was stirred for 10 minutes. The resulting polymer solution was optionally mixed with 27.3 wt % TDAE oil (VivaTec 500, Hansen & Rosenthal KG), than stripped with steam for one hour to remove solvent and other volatiles, and dried in an oven at 70° C. for 30 minutes and then additionally for one to three days, at room temperature.

The amounts of reagents, resulting polymer composition and several of its properties are summarized in Table 2 and Table 3.
Manufacturing of the Examples 12, 13, 19 and 22

The co-polymerizations were performed in a double wall, 40 liter steel reactor, which was first purged with nitrogen, before the addition of organic solvent, monomers, polar coordinator compound, initiator compound or other components. The following components were then added in the following order: cyclohexane solvent (20200 grams); butadiene monomer, styrene monomer, tetramethylethylenediamine (TMEDA) and divinylbenzene (DVB), and the mixture was heated to 40° C., followed by titration with n-butyllithium to remove traces of moisture or other impurities. The desired polymerization initiator compound was added into the polymerization reactor to initiate the polymerization reaction. If a mixture of initiator compounds is used (e.g. I3 and n-butyllithium in Example 13 in Table 2), if not otherwise stated, they were added at the same time. The polymerization was performed for at least 80 minutes, not allowing the polymerization temperature to exceed 60° C., until the monomer conversion was at least 97%. Afterwards, 2.3% of the total butadiene monomer amount was added, followed by the addition of the chain end modifier, unless stated otherwise. After 20 minutes the polymerization was terminated by the addition of methanol (2 equivalents based on initiator amount). To the polymer solution, 2.20 g IRGANOX 1520 was added as a stabilizer. This mixture was stirred for 10 minutes. The resulting polymer solution was mixed with 27.3 wt % TDAE oil (VivaTec 500, Hansen & Rosenthal KG), than stripped with steam for one hour to remove solvent and other volatiles, and dried in an oven at 70° C. for 30 minutes and then additionally for one to three days, at room temperature.

The amounts of reagents, resulting polymer composition and several of its properties are summarized in Table 2 and Table 3.
Manufacturing of the Example 23

The co-polymerization were performed in a double wall, 10 liter steel reactor, which was first purged with nitrogen, before the addition of organic solvent, monomers, polar coordinator compound, initiator compound or other components. The following components were then added in the following order: cyclohexane solvent (4600 grams); butadiene monomer, styrene monomer, tetramethylethylenediamine (TMEDA) and the mixture was heated to 40° C., followed by titration with n-butyllithium to remove traces of moisture or other impurities. The polymerization initiator I1 was added into the polymerization reactor to initiate the polymerization reaction. The polymerization was performed for 75 minutes, not allowing the polymerization temperature to exceed 60° C. Afterwards, 0.5% of the total butadiene monomer amount was added, followed by the addition of Tin(IV) chloride as coupling agent. After 10 min, 1.8% of the total butadiene monomer amount was added, followed by the addition of the chain end modifier. After 20 minutes the polymerization was terminated by the addition of methanol (2 equivalents based on initiator amount). After removal of the polymer solution from the reactor, a large amount of a gelled residue remains around the stirrer. The amounts of reagents, resulting polymer composition and several of its properties are summarized in Table 2 and Table 3.
Manufacturing of the Example 26

The co-polymerization were performed in a double wall, 5 liter steel reactor, which was first purged with nitrogen, before the addition of organic solvent, monomers, polar coordinator compound, initiator compound or other components. The following components were then added in the following order: cyclohexane solvent (2260 grams); butadiene monomer, styrene monomer, tetramethylethylenediamine (TMEDA) and divinylbenzene (DVB), and the mixture was heated to 40° C., followed by titration with n-butyllithium to remove traces of moisture or other impurities. The polymerization initiator I2 was added into the polymerization reactor to initiate the polymerization reaction. The polymerization was performed for 80 minutes, not allowing the polymerization temperature to exceed 60° C. Afterwards, 2.3% of the total butadiene monomer amount was added, followed by the addition of the chain end modifier, unless stated otherwise. After 20 minutes the polymerization was terminated by the addition of methanol (2 equivalents based on initiator amount). To the polymer solution, 2.20 g IRGANOX 1520 was added as a stabilizer. This mixture was stirred for 10 minutes. The resulting polymer solution was than stripped with steam for one hour to remove solvent and other volatiles, and dried in an oven at 70° C. for 30 minutes and then additionally for one to three days, at room temperature.

The amounts of reagents, resulting polymer composition and several of its properties are summarized in Table 2 and Table 3.

Manufacturing of the Examples 25 and 35

The co-polymerizations were performed in a double wall, 10 liter steel reactor, which was first purged with nitrogen, before the addition of organic solvent, monomers, polar coordinator compound, initiator compound or other components. The following components were then added in the following order: cyclohexane solvent (4600 grams); butadiene monomer, styrene monomer and tetramethylethylenediamine (TMEDA) and the mixture was heated to 40° C., followed by titration with n-butyllithium to remove traces of moisture or other impurities. The polymerization initiator n-butyllithium was added into the polymerization reactor to initiate the polymerization reaction. The polymerization was performed for at least 80 minutes, not allowing the polymerization temperature to exceed 60° C., until the monomer conversion was at least 97%. Afterwards, 0.5% of the total butadiene monomer amount was added, followed by the addition of the coupling agent. The mixture was stirred for 20 minutes. Subsequently, 1.8% of the total butadiene monomer amount was added, followed by the addition of the chain end modifier, unless stated otherwise. After 20 minutes the polymerization was terminated by the addition of methanol (2 equivalents based on initiator amount). To the polymer solution, 2.20 g IRGANOX 1520 was added as a stabilizer. This mixture was stirred for 10 minutes. The resulting polymer solution was optionally mixed with 27.3 wt % TDAE oil (VivaTec 500, Hansen & Rosenthal KG), than stripped with steam for one hour to remove solvent and other volatiles, and dried in an oven at 70° C. for 30 minutes and then additionally for one to three days, at room temperature.

The amounts of reagents, resulting polymer composition and several of its properties are summarized in Table 2 and Table 3.

Manufacturing of the Example 39

The co-polymerization were performed in a double wall, 10 liter steel reactor, which was first purged with nitrogen, before the addition of organic solvent, monomers, polar coordinator compound, initiator compound or other components. The following components were then added in the following order: cyclohexane solvent (4600 grams); butadiene monomer (83% of the total butadiene amount), styrene monomer, tetramethylethylenediamine (TMEDA) and divinylbenzene (DVB), and the mixture was heated to 40° C., followed by titration with n-butyllithium to remove traces of moisture or other impurities. The polymerization initiator I3 and n-butyllithium were added at the same time into the polymerization reactor to initiate the polymerization reaction. The polymerization was performed for 100 minutes, not allowing the polymerization temperature to exceed 60° C. Afterwards, 17% of the total butadiene monomer amount was added and the mixture was further polymerized for 50 min, followed by the addition of the chain end modifier. After 20 minutes the polymerization was terminated by the addition of methanol (2 equivalents based on initiator amount). To the polymer solution, 2.20 g IRGANOX 1520 was added as a stabilizer. This mixture was stirred for 10 minutes. The resulting polymer solution was mixed with 27.3 wt % TDAE oil (VivaTec 500, Hansen & Rosenthal KG), than stripped with steam for one hour to remove solvent and other volatiles, and dried in an oven at 70° C. for 30 minutes and then additionally for one to three days, at room temperature.

The amounts of reagents, resulting polymer composition and several of its properties are summarized in Table 2 and Table 3.

Manufacturing of the Example 40

The co-polymerization were performed in a double wall, 10 liter steel reactor, which was first purged with nitrogen, before the addition of organic solvent, monomers, polar coordinator compound, initiator compound or other components. The following components were then added in the following order: cyclohexane solvent (4600 grams); butadiene monomer (83% of the total butadiene amount), styrene monomer (83% of the total styrene amount), tetramethylethylenediamine (TMEDA) and divinylbenzene (DVB), and the mixture was heated to 40° C., followed by titration with n-butyllithium to remove traces of moisture or other impurities. The polymerization initiator I3 and n-butyllithium were added at the same time into the polymerization reactor to initiate the polymerization reaction. The polymerization was performed for 120 minutes, not allowing the polymerization temperature to exceed 60° C. Afterwards, 14.7% of the total butadiene monomer amount and 17% of the total styrene monomer amount were added and the mixture was further polymerized for 60 min, followed by the addition 2.3% of the total butadiene monomer amount and 5 min thereafter addition of the chain end modifier. After 20 minutes the polymerization was terminated by the addition of methanol (2 equivalents based on initiator amount). To the polymer solution, 2.20 g IRGANOX 1520 was added as a stabilizer. This mixture was stirred for 10 minutes. The resulting polymer solution was mixed with 27.3 wt % TDAE oil (VivaTec 500, Hansen & Rosenthal KG), than stripped with steam for one hour to remove solvent and other volatiles, and dried in an oven at 70° C. for 30 minutes and then additionally for one to three days, at room temperature.

The amounts of reagents, resulting polymer composition and several of its properties are summarized in Table 2 and Table 3.

The use of a dash "-" in the tables below indicates that no constituent was added. "n.m." indicates that no measurement was taken, or that corresponding data was unavailable. If not stated otherwise n-butyllithium (BuLi) was used as 20 wt % solution in cyclohexane.

TABLE 2

Amount of Reagents Used for Making First Polymer Composition Examples

| Ex. | Initiator (g) | Coupling agent (mmol) | Chain End Modifier (mmol) | Styrene (mol) | Butadiene (mol) | TMEDA (mol) |
|---|---|---|---|---|---|---|
| 1 | (I1) 22.20 | (DVB) 0.444 | (E1) 10.67 | 1.778 | 12.85 | 2.207 |
| 2 | (I1) 22.19 | (DVB) 0.895 | (E1) 10.74 | 1.777 | 12.84 | 2.183 |
| 3 | (I1) 22.20 | (DVB) 1.338 | (E1) 10.76 | 1.776 | 12.84 | 2.186 |
| 4 | (I1) 17.16 | (DVB) 1.063 | (E1) 5.327 | 1.412 | 10.19 | 1.800 |
| 5 | (I2) 21.99 | — | (E1) 9.068 | 1.791 | 12.95 | 1.886 |
| 6 | (I2) 57.56 | (DVB) 1.356 | (E1) 4.647 | 1.778 | 12.84 | 2.325 |

TABLE 2-continued

Amount of Reagents Used for Making First Polymer Composition Examples

| Ex. | Initiator (g) | Coupling agent (mmol) | Chain End Modifier (mmol) | Styrene (mol) | Butadiene (mol) | TMEDA (mol) |
|---|---|---|---|---|---|---|
| 7 | (I2) 58.92 | (DVB) 1.336 | (E1) 9.020 | 12.72 | 1.771 | 2.212 |
| 8 | (I2) 29.31 | (DVB) 0.677 | (E1) 2.385 (E2) 4.513 | 0.905 | 6.530 | 1.127 |
| 9 | (I2) 57.44 | (DVB) 1.399 | (E3) 4.672 (E1) 4.553 | 1.771 | 12.80 | 2.377 |
| 10 | (I2) 57.61 | (DVB) 1.342 | (E2) 10.76 | 1.776 | 13.17 | 2.245 |
| 11 | (I2) 57.94 | (DVB) 1.362 | — | 1.785 | 12.89 | 2.332 |
| 12 | (I9) 175.8 | (DVB) 2.938 | (E1) 24.12 | 7.544 | 43.60 | 4.981 |
| 13 | (I3/BuLi) 16.22/0.381 | (DVB) 2.114 | (E1) 11.98 | 7.186 | 35.58 | 38.39 |
| 14 | (I4) 1.832 | (DVB) 0.415 | (E1) 2.229 | 1.373 | 6.770 | 7.483 |
| 15 | (I4) 1.840 | — | (E1) 2.406 | 1.378 | 6.795 | 7.624 |
| 16 | (I3/BuLi) 3.325/2.19 [a] | (DVB) 0.433 | (E1) 2.336 | 1.519 | 7.492 | 7.646 |
| 17 | (I3/BuLi) 3.320/2.13 [b] | (DVB) 0.434 | (E1) 2.347 | 1.519 | 7.498 | 7.758 |
| 18 | (I3/BuLi) 3.330/0.110 | (DVB) 0.437 | (E1) 2.397 | 1.518 | 7.496 | 7.804 |
| 19 | (I3/BuLi) 12.04/0.370 | (DVB) 1.581 | (E1) 8.590 | 6.263 | 30.31 | 28.37 |
| 20 | (I3/BuLi) 2.708/0.081 | (DVB) 0.352 | (E1) 1.921 | 1.520 | 7.497 | 6.323 |
| 21 | (I3/BuLi) 3.531/0.105 | (DVB) 0.583 | (E1) 2.487 | 1.509 | 7.455 | 8.262 |
| 22 | (I3/BuLi) 14.36/0.435 | (DVB) 3.110 | (E1) 10.52 | 6.133 | 30.36 | 34.00 |
| 23 | (I1) 25.67 | (SnCl$_4$) 0.115 | (E1) 12.57 | 1.773 | 12.82 | 2.571 |
| 24 | (I9) 67.61 | — | (E1) 9.404 | 1.784 | 12.88 | 1.954 |
| 25 | (BuLi) 24.74 [c] | (SnCl$_4$) 0.307 | (E1) 3.813 | 1.801 | 13.01 | 8.855 |
| 26 | (I6) 6.70 | (DVB) 0.482 | (E1) 2.576 | 0.450 | 3.193 | 3.353 |
| 27 | (I10) 50.46 | — | (E1) 8.897 | 1.790 | 12.93 | 1.802 |
| 28 | (I5) 6.125 | (DVB) 0.583 | (E1) 3.600 | 1.365 | 9.859 | 3.942 |
| 29 | (I2) 22.52 | (DVB) 0.656 | (E1) 5.366 | 1.575 | 11.37 | 1.182 |
| 30 | (I7) 25.72 | (DVB) 0.936 | (E1) 7.398 | 1.573 | 11.36 | 1.550 |
| 31 | (I7) 19.93 | (DVB) 0.634 | (E1) 3.293 | 1.573 | 11.36 | 1.074 |
| 32 | (I7) 22.57 | (DVB) 0.748 | (E1) 5.735 | 1.573 | 11.36 | 1.309 |
| 33 | (I8) 46.02 | (DVB) 1.155 | (E1) 6.022 | 1.556 | 11.24 | 2.027 |
| 34 | (I10) 47.92 | — | (E1) 8.943 | 1.791 | 12.93 | 1.937 |
| 35 | (BuLi) 7.431 [d] | Si(OMe)$_4$ 0.805 | — | 2.158 | 11.61 | 10.64 |
| 36 | (I3/BuLi) 16.95/0.321 | (DVB) 2.221 | (E1) 12.43 | 7.337 | 36.32 | 39.93 |
| 37 | (I3/BuLi) 15.57/0.513 | (DVB) 2.047 | (E1) 11.98 | 7.337 | 36.33 | 36.77 |
| 38 | (BuLi) 45.73 [c] | (E4) 1.860 | (E1) 6.914 | 6.364 | 46.04 | 33.25 |
| 39 | (I3/BuLi) 3.336/0.102 | (DVB) 0.432 | (E1) 2.405 | 1.518 | 7.499 | 7.714 |
| 40 | (I3/BuLi) 3.545/0.102 | (DVB) 0.475 | (E1) 2.534 | 1.531 | 7.497 | 8.288 |

[a] BuLi was added first to the polymerization reactor and after 5 min I3 was added to the reactor, the concentration of the n-buthyllithium solution was 0.159 mol/kg
[b] BuLi was added first to the polymerization reactor and after 10 min I3 was added to reactor, the concentration of the n-buthyllithium solution was 0.159 mol/kg
[c] Concentration of the n-buthyllithium solution was 0.179 mol/kg
[d] Concentration of the n-buthyllithium solution was 0.384 mol/kg

TABLE 3

First Polymer Composition Characterizations

| Ex. | Mn [a] [g/mol] | Mw [a] [g/mol] | PDI | Mp1 [a] [g/mol] (% Area) | Mp2 [a] [g/mol] (% Area) | Mp3 [a] [g/mol] (% Area) | Mooney viscosity [MU] | Mooney viscosity of oil extended SSBR [MU] | Vinyl content [b] [wt %] | Styrene content [c] [wt %] | TDAE content [wt %] |
|---|---|---|---|---|---|---|---|---|---|---|---|
| 1 | 277545 | 336792 | 1.21 | 298566 (87.6) | 591475 (12.4) | — | 43.9 | — | 64.8 | 20.5 | — |
| 2 | 305618 | 392003 | 1.28 | 307611 (85.8) | 604191 (14.2) | 767217 (6.7) | 53.0 | — | 66.4 | 20.6 | — |
| 3 | 313597 | 429823 | 1.37 | 303877 (72.1) | 594511 (16.5) | 768598 (11.4) | 57.3 | — | 65.9 | 20.8 | — |
| 4 | 308270 | 422425 | 1.37 | 292395 (71.4) | 578947 (17.7) | 873388 (10.9) | 64.0 | — | 62.8 | 20.8 | — |
| 5 | 273373 | 325987 | 1.19 | 311875 | — | — | 40.8 | — | 63.8 | 20.8 | — |
| 6 | 339567 | 542230 | 1.60 | 318609 (63.7) | 630158 (18.1) | 834987 (18.2) | 70.2 | — | 64.5 | 21.8 | — |
| 7 | 337377 | 542932 | 1.61 | 312349 (63.3) | 621341 (18.2) | 813941 (18.5) | 79.8 | — | 64.5 | 21.9 | — |
| 8 | 331009 | 532411 | 1.61 | 326682 (65.1) | 641273 (18.0) | 835458 (16.9) | 63.5 | — | 59.4 | 21.9 | — |
| 9 | 331358 | 504028 | 1.52 | 319440 (66.3) | 626276 (18.9) | 834375 (14.8) | 65.1 | — | 65.1 | 21.8 | — |

TABLE 3-continued

First Polymer Composition Characterizations

| Ex. | Mn [a] [g/mol] | Mw [a] [g/mol] | PDI | Mp1 [a] [g/mol] (% Area) | Mp2 [a] [g/mol] (% Area) | Mp3 [a] [g/mol] (% Area) | Mooney viscosity [MU] | Mooney viscosity of oil extended SSBR [MU] | Vinyl content [b] [wt %] | Styrene content [c] [wt %] | TDAE content [wt %] |
|---|---|---|---|---|---|---|---|---|---|---|---|
| 10 | 295366 | 407882 | 1.38 | 319904 (76.9) | 612890 (14.1) | 872015 (9.0) | 59.6 | — | 64.6 | 21.8 | — |
| 11 | 291660 | 396957 | 1.36 | 309390 (76.8) | 592515 (23.2) | — | 52.3 | — | 64.3 | 22.0 | — |
| 12 | 435828 | 598932 | 1.37 | 472876 (75.7) | 893257 (24.3) | — | — | 39.7 | 62.3 [d] | 24.4 [d] | 21.3 |
| 13 | 518576 | 781585 | 1.51 | 434542 (46.9) | 838748 (53.1) | — | — | 56.6 | 60.0 [d] | 28.2 [d] | 26.3 |
| 14 | 505233 | 779657 | 1.54 | 447388 (45.2) | 842089 (39.5) | 1175444 (15.3) | — | 57.7 | 58.8 [d] | 26.5 [d] | 27.2 |
| 15 | 446620 | 622737 | 1.39 | 451114 (55.6) | 849001 (44.4) | — | — | 48.3 | 59.2 | 26.2 | 29 |
| 16 | 530260 | 846043 | 1.60 | 502421 (46.3) | 913105 (39.0) | 1279177 (14.7) | — | 67.1 | 60.3 [d] | 25.8 [d] | 27.6 |
| 17 | 559999 | 886368 | 1.58 | 524227 (48.7) | 955081 (34.5) | 1308115 (16.8) | — | 69.3 | 59.2 | 26.2 | 27.5 |
| 18 | 538703 | 878211 | 1.63 | 509161 (47.7) | 957600 (52.3) | — | — | 64.6 | 59.9 | 25.7 | 27.4 |
| 19 | 544128 | 929002 | 1.71 | 561342 (52.0) | 1054335 (48.0) | — | — | 72.2 | 59.1 [d] | 27.6 [d] | 26.6 |
| 20 | 617383 | 980089 | 1.59 | 615759 (55.0) | 1157139 (45.0) | — | — | 70.9 | 59.7 | 25.8 | 28.3 |
| 21 | 507041 | 792995 | 1.56 | 437747 (47.4) | 840286 (52.6) | — | — | 54.2 | 58.3 | 27.2 | 27.2 |
| 22 | 502500 | 914372 | 1.82 | 435338 (42.3) | 836668 (31.4) | 1139180 (26.3) | — | 70.8 | 58.5 | 27.1 | 26.9 |
| 23 [e] | 249368 | 287185 | 1.15 | 272251 (95.1) | 571807 (4.9) | — | 36.2 | — | 67.5 [d] | 19.6 [d] | — |
| 24 | 304855 | 359899 | 1.18 | 356581 | — | — | 66.4 | — | 64.4 | 20.6 | — |
| 25 | 340525 | 465924 | 1.37 | 311812 (74.8) | 673560 (7.7) | 1025137 (17.5) | 63.9 | — | 61.8 | 20.4 | — |
| 26 | 280525 | 379988 | 1.35 | 322657 (82.3) | 627932 (17.7) | — | 53.8 | — | 63.1 | 20.1 | — |
| 27 | 296968 | 347151 | 1.17 | 352192 | — | — | 65.7 | — | 63.9 | 20.7 | — |
| 28 | 605249 | 1060876 | 1.75 | 456609 (35.9) | 862910 (64.1) | — | — | 76.3 | 60.3 | 21.0 | 26.8 |
| 29 | 530307 | 774538 | 1.46 | 575093 (75.1) | 1090064 (24.9) | — | — | 64.2 | 64.0 | 20.6 | 25.7 |
| 30 | 433994 | 631629 | 1.46 | 435886 (71.0) | 828403 (29.0) | — | — | 39.5 | 61.4 | 19.8 | 26.1 |
| 31 | 550790 | 784446 | 1.42 | 593738 (76.3) | 1383327 (16.3) | 3176470 (7.4) | — | 59.3 | 63.6 | 20.4 | 27.1 |
| 32 | 509203 | 739906 | 1.45 | 524042 (71.3) | 973998 (16.7) | 1302964 (12.0) | — | 52.2 | 63.6 | 20.7 | 25.1 |
| 33 | 306642 | 463739 | 1.51 | 294462 (68.3) | 579565 (31.7) | — | 59.9 | — | 63.4 | 20.9 | — |
| 34 | 328965 | 385104 | 1.17 | 385184 | — | — | 76.9 | — | 64.3 | 20.6 | — |
| 35 | 564021 | 883641 | 1.57 | 486639 (32.4) | 1099343 (67.6) | — | — | 56.1 | 63.4 | 25.5 | 27.2 |
| 36 | 404054 | 784206 | 1.94 | 431488 (55.2) | 819676 (44.8) | — | — | 58.8 | 59.3 | 27.4 | 26.9 |
| 37 | 495248 | 771859 | 1.56 | 442640 (49.6) | 845994 (50.4) | — | — | 55.2 | 57.5 | 27.5 | 27.1 |
| 38 | 540648 | 721726 | 1.33 | 555558 (68.2) | 1125481 (31.8) | — | — | 51.1 | 64.6 | 20.9 | 28.0 |
| 39 | 443071 | 783322 | 1.77 | 468872 (54.3) | 933802 (45.7) | — | — | 64.8 | 59.0 | 26.3 | 27.3 |
| 40 | 504557 | 805101 | 1.60 | 440423 (46.2) | 835388 (53.8) | — | — | 56.1 | 59.8 | 25.7 | 28.4 |
| 41 | 504803 | 735973 | 1.46 | 350152 (24.0) | 629357 (55.9) | 1153241 (20.1) | — | 56.4 | 62.4 | 21.0 | 27.5 |
| 42 | 477014 | 685352 | 1.44 | 313860 (22.6) | 603260 (59.1) | 1118815 (18.3) | — | 52.5 | 61.8 | 20.9 | 27.9 |
| 43 | 408629 | 575464 | 1.41 | 308292 (18.9) | 474261 (62.6) | 900438 (18.5) | — | 36.6 | 61.8 | 21.0 | 27.6 |

[a] determined by SEC
[b] vinyl content is that of the 1,2-polybutadiene unit content of the final copolymer, and is determined by IR Spectroscopy
[c] styrene content of the final copolymer, and is determined by IR Spectroscopy
[d] styrene and vinyl content of the 1,2-polybutadiene unit content of the final copolymer were determined by NMR spectroscopy
[e] data measured from the polymer solution which was not gelled Polymer Compositions Third polymer compositions were prepared by combining and compounding the constituents listed below in Table 4 in a 370 ml Banbury mixer and crosslinked in a curing press at 200 bar and at 160° C. Crosslinking process data and physical properties for each composition example are provided in Table 7 and Table 8.

Crosslinked polymer compositions (as listed in Table 4, table 5 and Table 6), which are prepared under identical conditions at the same day by the identical operator, are identified with a capital letter, e.g. A, B, etc. The first polymer composition contained in the crosslinked polymer composition is reflected by the first polymer composition number, e.g. 1, 2, etc. As a result, there are crosslinked polymer composition series, such as 6A, 8A and 11A which can be directly compared with each other.

TABLE 4

Recipe for Manufacturing Third Polymer Compositions 6A, 8A, 11A, 33D, 34D

| Components | | Amount (phr) [a] |
|---|---|---|
| 1st mixing stage | | |
| Elastomeric polymer Example (solution styrene butadiene copolymer) | Polymer 6, 8, 11, 33 or 34 | 80.0 |
| High cis 1,4-polybutadiene | Buna cis 132-Schkopau [b] | 20.0 |
| Precipitated silica | Ultrasil 7000GR [c] | 80.0 |
| Silane | Si 75 [c,d] | 6.9 |
| Stearic acid [e] | | 1.0 |
| Stabilizer system | Antilux 654 [f] | 1.5 |
| | Dusantox 6PPD [g] | 2.0 |
| Zinc oxide [h] | | 2.5 |
| Softener (Oil) | TDAE [i] | 20.0 |
| 2nd mixing stage | | |
| Sulfur [j] | | 1.4 |
| TBBS [k] | | 1.5 |
| DPG [l] | | 1.5 |

[a] phr = parts per hundred rubber, based on sum weight of the styrene butadiene copolymer and high cis 1,4-polybutadiene
[b] Styron Deutschland GmbH
[c] Evonic Industries AG
[d] Bis(triethoxysilylpropyl)disulfan, sulfur equivalents per molecule: 2.35
[e] Cognis GmbH
[f] Light & ozone protective wax, Rhein Chemie Rheinau GmbH
[g] N-(1,3-dimethylbutyl)-N'-phenyl-1,4-benzenediamine, Duslo, a.s.
[h] Grillo-Zinkoxid GmbH
[i] VivaTec 500, Hansen & Rosenthal KG
[j] Solvay AG
[k] N-tert-Butyl-2-benzothiazyl-sulfenamide; Rhein Chemie Rheinau GmbH
[l] Diphenylguanidine, Vulkacit D, Lanxess AG

TABLE 5

Recipe for Manufacturing Third Polymer Compositions 12C, 13C, 36C, 37C

| Components | | Amount (phr) [a] |
|---|---|---|
| 1st mixing stage | | |
| Elastomeric polymer Example (solution styrene butadiene copolymer) | Polymer 12, 13, 36 or 37 | 117.5 |
| High cis 1,4-polybutadiene | Buna cis 132-Schkopau [b] | 20.0 |
| Precipitated silica | Ultrasil 7000GR [c] | 80.0 |
| Silane | Si 75 [c,d] | 6.9 |
| Stearic acid [e] | | 1.0 |
| Stabilizer system: | Antilux 654 [f] | 1.5 |
| | Dusantox 6PPD [g] | 2.0 |
| Zinc oxide [h] | | 2.5 |
| 2nd mixing stage | | |
| Sulfur [i] | | 1.4 |
| TBBS [j] | | 1.5 |
| DPG [k] | | 1.5 |

[a] phr = parts per hundred rubber, Based on sum weight of the styrene butadiene copolymer (without oil content) and high cis 1,4-polybutadiene
[b] Styron Deutschland GmbH
[c] Evonic Industries AG
[d] Bis(triethoxysilylpropyl)disulfan, sulfur equivalents per molecule: 2.35
[e] Cognis GmbH
[f] Light & ozone protective wax, Rhein Chemie Rheinau GmbH
[g] N-(1,3-dimethylbutyl)-N'-phenyl-1,4-benzenediamine, Duslo, a.s.
[h] Grillo-Zinkoxid GmbH
[i] Solvay AG
[j] N-tert-Butyl-2-benzothiazyl-sulfenamide; Rhein Chemie Rheinau GmbH
[k] Diphenylguanidine, Vulkacit D, Lanxess AG

TABLE 6

Recipe for Manufacturing Third Polymer Compositions 6B, 8B, 11B

| Components | | Amount (phr) [a] |
|---|---|---|
| 1st mixing stage | | |
| Elastomeric polymer Example (solution styrene butadiene copolymer) | Polymer 6, 8 or 11 | 100.0 |
| Carbon Black [b] | IRB 8 | 60.0 |
| Stearic acid [c] | | 2.0 |
| Zinc oxide [d] | | 3.0 |
| Softener (Oil) | TDAE [e] | 15.0 |
| 2nd mixing stage | | |
| Sulfur [e] | | 1.5 |
| TBBS [f] | | 0.9 |

[a] phr = parts per hundred rubber, Based on sum weight of the styrene butadiene copolymer
[b] IRB 8, international ref. carbon black, Sid Richardson
[c] Cognis GmbH
[d] Grillo-Zinkoxid GmbH
[e] Solvay AG
[f] N-tert-Butyl-2-benzothiazyl-sulfenamide; Rhein Chemie Rheinau GmbH

TABLE 7

Crosslinking Process Data & Silica or Carbon Black Containing Crosslinked Polymer Composition Property

| Example | Modification [a] | Compound Mooney [MU] | TS 1 [min] | TS 2 [min] | TC 50 [min] | TC 90 [min] | TC 95 [min] | Heat build-up [° C.] | DIN Abrasion 0.5 kg load [mm³] |
|---|---|---|---|---|---|---|---|---|---|
| 6A  | 0/1/2 | 123.9 | 0.0 | 0.6 | 7.9  | 16.9 | 21.6 | 114.8 | 113 |
| 7A  | 2     | n.m.  | 0.4 | 1.4 | 6.9  | 16.3 | 21.1 | 106.5 | 111 |
| 8A  | 2     | n.m.  | 0.5 | 1.8 | 7.0  | 16.6 | 21.5 | 111.0 | 111 |
| 11A | 0     | 68.1  | 0.7 | 3.1 | 8.4  | 17.6 | 22.1 | 128.7 | 106 |
| 6B  | 0/1/2 | 118.7 | 5.6 | 8.2 | 11.7 | 20.7 | 24.0 | 114.2 | 165 |
| 8B  | 2     | 136.4 | 5.1 | 7.9 | 11.3 | 20.4 | 23.9 | 111.2 | 168 |
| 9B  | 2     | 130.1 | 4.6 | 6.8 | 9.6  | 18.0 | 21.7 | 113.2 | 157 |
| 11B | 0     | 79.1  | 5.2 | 8.0 | 11.9 | 20.5 | 24.0 | 122.3 | 177 |
| 35C | 0     | 95.0  | 1.0 | 3.6 | 8.4  | 16.5 | 21.2 | 117.2 | 129 |
| 12C | 2     | 145.2 | 1.2 | 3.9 | 8.1  | 16.9 | 21.4 | n.m.  | 119 |
| 13C | 1/2   | 133.4 | 0.5 | 2.3 | 8.8  | 17.4 | 21.9 | 110.3 | 110 |
| 36C | 1/2   | 137.4 | 0.8 | 3.3 | 8.4  | 16.6 | 21.3 | 111.0 | 123 |
| 37C | 1/2   | 126.6 | 0.7 | 3.1 | 8.6  | 17.0 | 21.6 | 109.8 | 121 |
| 33D | 0/1/2 | 147.4 | 0.6 | 2.1 | 7.9  | 17.3 | 21.9 | 109.2 | 133 |
| 34D | 2     | 184.1 | 0.4 | 1.1 | 5.1  | 16.1 | 20.8 | 101.8 | 137 |

[a] Modification of the contained SSBR polymer composition, whit 0 = not end-modified polymer macromolecules, 1 = chain end modification at one polymer chain end (according to Formula 2), 2 = chain end modification at both polymer chain ends (according to Formula 1); polymer compositions of the invention are represented by 1/2 or 0/1/2.

TABLE 8

Silica or Carbon Black Containing Crosslinked Polymer Composition Properties

| Example | Tensile Strength [MPa] | Elongation at Break [%] | Modulus 300 [MPa] | Rebound Resilience at 0° C. [%] | Rebound Resilience at 60° C. [%] | Tan δ at −10° C. | Tan δ at 0° C. | Tan δ at 60° C. |
|---|---|---|---|---|---|---|---|---|
| 6A  | 19.0 | 386 | 12.2 | 18.8 | 62.8 | 0.755 | 0.453 | 0.123 |
| 7A  | 18.9 | 361 | 13.5 | 18.3 | 65.9 | 0.782 | 0.474 | 0.109 |
| 8A  | 17.6 | 367 | 12.2 | 20.0 | 64.6 | 0.729 | 0.430 | 0.112 |
| 11A | 17.0 | 407 | 10.6 | 18.5 | 57.2 | 0.734 | 0.436 | 0.157 |
| 6B  | 21.3 | 399 | 14.8 | 4.8  | 55.5 | 1.151 | 0.804 | 0.158 |
| 8B  | 17.0 | 344 | 14.4 | 5.7  | 57.8 | 1.236 | 0.734 | 0.149 |
| 9B  | 21.2 | 388 | 15.3 | 5.1  | 55.9 | 1.154 | 0.806 | 0.151 |
| 11B | 17.8 | 413 | 12.2 | 5.3  | 50.0 | 1.116 | 0.862 | 0.234 |
| 35C | 19.3 | 514 | 8.4  | 10.5 | 56.0 | 0.738 | 0.514 | 0.154 |
| 12C | 18.9 | 431 | 9.6  | 10.6 | 58.5 | 0.843 | 0.466 | 0.098 |
| 13C | 17.4 | 432 | 9.2  | 9.3  | 60.0 | 0.846 | 0.504 | 0.112 |
| 36C | 19.1 | 474 | 8.7  | 9.4  | 58.9 | 0.840 | 0.516 | 0.117 |
| 37C | 21.8 | 515 | 8.9  | 9.0  | 60.0 | 0.816 | 0.536 | 0.111 |
| 33D | 20.1 | 381 | 13.1 | 11.0 | 61.2 | 0.772 | 0.442 | 0.099 |
| 34D | 19.0 | 376 | 12.3 | 11.3 | 62.0 | 0.732 | 0.430 | 0.092 |

TABLE 9

Comparison of sliding friction coefficients for linear and partially branched first polymer compositions

| Polymer sample | Modification [a] | coupling | Sliding friction coefficient | Standard deviation |
|---|---|---|---|---|
| 15 | 1/2 | none (linear) | 1.76 | 0.08 |
| 19 | 1/2 | partially branched (via DVB) | 1.60 | 0.07 |
| 38 | 0/1 | none (linear) | 1.93 | 0.12 |

[a] Modification of the contained SSBR polymer composition, whit 0 = not end-modified polymer macromolecules, 1 = chain end modification at one polymer chain end (according to Formula 2), 2 = chain end modification at both polymer chain ends (according to Formula 1); polymer compositions of the invention are represented by 1/2.

It was found that polymer compositions of the invention when used for the preparation of crosslinked (reinforced silica or carbon black) polymer compositions (see for example 6A in Table 7 and Table 8) have a relatively reduced tan δ at 60° C., a relatively reduced heat build-up and a relatively increased rebound resilience at 60° C. when compared with crosslinked rubber compositions made of an unmodified polymer composition not made according to the invention (see for example 11A in Table 7 and Table 8). Surprisingly, it was further found that the inventive polymer compositions exhibit an improved balance of processing during mechanical mixing with filler and other ingredients when compared with modified polymer compositions not made according to the invention. In addition, the performance characteristics, particularly wet grip, measured as tan delta @ 0° C., tensile strength and elongation at break of the crosslinked inventive polymer compositions are also improved, whereas the rolling resistance measured as tan delta @ 60° C., heat build-up and DIN abrasion resistance of the crosslinked inventive polymer compositions are in a comparable order when compared with modified polymers not according to the invention.

A polymer composition of the invention may be converted into a crosslinked polymer composition by first stage mixing (mixing step in which silica or carbon black filler and other ingredients are added to polymer) and second stage mixing (mixing step in which the crosslinking agent is added to the polymer composition) according to Table 4 to Table 6, followed by crosslinking according to Table 4 to Table 6 at 160° C. for 20 min as described herein. The polymer compositions and crosslinked polymer compositions (as listed in Table 4 to Table 6), prepared under identical conditions at the same day by the identical operator, are identified with a capital letter, e.g. A, B, etc. The polymer contained in the crosslinked polymer composition is identified by the polymer number, e.g. 6, 8, etc. As a result, there are crosslinked polymer composition series, such as 6A, 8A, 11A which can be directly compared with each other.

Polymer compositions of the invention have an improved processability and a well-balanced performance in hysteresis loss, wet grip, heat build-up and abrasion resistance properties, when compared with polymer compositions not according to the invention such as polymer compositions comprising essentially macromolecules only which are modified at both polymer chain ends, with "essentially" meaning that more than 85% of all polymer chains are modified at both chain ends ($\omega,\omega'$-modified, according to Formula 1), which is not according to the invention.

As shown in Table 7 and Table 8, compound Mooney values of the non-crosslinked, filler-containing polymer compositions of the invention are reduced when compared with non-crosslinked polymer compositions comprising essentially elastomeric macromolecules which are modified at both polymer chain ends. "Tensile Strength", "Elongation at Break" and "Tan $\delta$ at 0° C." values of crosslinked polymer compositions comprising the first polymer compositions of the invention are increased, compared with crosslinked polymer compositions not made according to the invention. Reduced Mooney values of the non-crosslinked, filler-containing polymer compositions indicate a reduced viscosity resulting in a more economic processing behavior during the mechanical mixing of a polymer composition with fillers and other optional ingredients. Increased values of "Tensile Strength" and "Elongation at Break" result in an improved tear strength of the crosslinked polymer composition. "Tan $\delta$ at 0° C." values correlate with the grip property on a wet surface, with a higher value corresponding to a higher wet grip. Heat build-up, "Rebound resilience at 60° C." and "Tan $\delta$ at 60° C." values of crosslinked rubber compositions according to the invention are not or not significantly deteriorated in comparison with crosslinked polymer compositions in which the polymer macromolecules are essentially modified at both chain ends. Polymer "heat build-up" reduction is believed to improve the durability of the resulting crosslinked polymer composition and corresponds to a reduced crosslinked polymer composition hysteresis energy loss. Furthermore, "heat build-up" reduction is usually combined with a decreased rolling resistance, with an increased overall elasticity.

To demonstrate the benefit of the invention in more detail, some further examples are given.

The polymer composition of example 6 (Table 2 and Table 3) was made by the reaction of compound P2 with 2 equivalents n-butyllithium to form a dianionic initiator DI2, which was subsequently used in the polymerization of 1,3-butadiene and styrene to obtain dianionic living styrene-butadiene polymer chains which were subsequently modified by the reaction with the modifier E1 in a ratio of modifier to lithium of 1:2 to yield a 1:1 mixture of $\omega$- and $\omega,\omega'$-modified polymer chains. This was used to prepare an inventive filler-containing polymer composition 6A (Table 7). Example 6A has a significantly lower heat build-up, tan$\delta$ at 60° C. and an increased rebound resilience at 60° C., tensile strength and elongation at break, when compared with the non-inventive polymer composition 11A, comprising a non-inventive non-modified polymer which was made under the same procedure but not applying chain end-modifier E1 (Table 7). Furthermore filler-containing polymer compositions contain polymers which are made by a) copolymerizing 1,3-butadiene and styrene using a mixed initiator system comprising dianionic DI2 and n-butyllithium and b) modification of the resulting $\omega,\omega'$-dianionic and $\omega$-monoanionic copolymer chains with modifier E1 to obtain a mixture of $\omega$- (according to Formula 2) and $\omega,\omega'$- (according to Formula 1) modified macromolecules (example 37 in Table 2 and Table 3). According to example 37C, the uncrosslinked filler-containing polymer composition (according to Table 5) has a significantly lower compound Mooney viscosity of 126.6 compared with 145.2 of the non-inventive uncrosslinked polymer composition example 12C (according to Table 5). The non-inventive polymer composition 12C is based on the non-inventive polymer example 12 made by the polymerization of 1,3-butadiene and styrene with diinitiator DI2 and modifying the resulting dianionic polymer macromolecules with modifier E1. Thus, the non-inventive polymer 12 comprises essentially $\omega,\omega'$-modified polymer chains (according to Formula 1). The wet grip/rolling resistance balance of example 37C is still in a similar order compared with the reference 12C, considering a slightly deteriorated tans at 60° C. and a slightly improved tan $\delta$ at 0° C. value (0.536 of example 37C vs. 0.466 of example 12C). Furthermore, higher values of the tensile strength and elongation at break values of example 37C indicate relatively improved mechanical properties for the inventive example.

It is generally accepted that linear polymer chains have deteriorated storage stability due to a higher cold flow and an increased stickiness. Conventionally, linear polymer chains are at least partially coupled with metal halides or alkoxides (e.g. $SnCl_4$, $Si(OMe)_4$, $SiCl_4$) to yield star-shaped polymers. Polymer composition example 23 demonstrates that the use of $SnCl_4$ as a coupling agent leads to a significant gelation made through reaction with polymer chains having two reactive chain ends ($\omega$, $\omega'$-anionic polymer chain ends). Surprisingly, it was further found that polymer compositions according to the invention have a reduced stickiness which corresponds to a relatively reduced sliding friction coefficient. Examples for sliding friction coefficients of non-inventive and inventive polymer compositions are given in Table 9 and the FIGURE. The non-inventive polymer composition 38 has a relatively high sliding friction coefficient of 1.93, whereas the inventive polymer composition 15 has a relatively low value of 1.76. A further reduced sliding friction coefficient of 1.60 was found for inventive polymer composition 19, which further comprises coupled polymer chains, when compared to polymer compositions 15 and 38.

The invention claimed is:

1. A polymer composition comprising modified polymers according to Formula 1 and Formula 2:

$A^1\text{-}P^1\text{-}A^2$      Formula 1

$A^3\text{-}P^2$      Formula 2 wherein $P^1$ and $P^2$ are each independently a polymer chain obtained by anionic polymerization of one or more polymerizable monomers selected from conjugated dienes and aromatic vinyl compounds, wherein each polymer chain $P^1$ and $P^2$ contains at least 40% by weight of repeating units obtained by polymerization of said conjugated dienes, and wherein at least the anionic polymerization for polymer chain P¹ is carried out in the presence of a compound of Formula 9a:

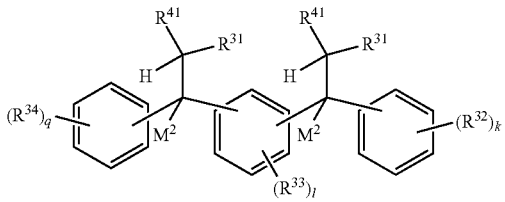

Formula 9a wherein each $R^{31}$ is independently selected from hydrogen, ($C_1$-$C_{10}$) alkyl, ($C_6$-$C_{12}$) aryl and ($C_7$-$C_{18}$) aralkyl; each $R^{32}$, $R^{33}$ and $R^{34}$ is independently selected from hydrogen, ($C_1$-$C_{18}$) alkyl and ($C_1$-$C_{18}$) alkoxy; each $R^{41}$ is independently selected from ($C_1$-$C_{100}$) alkyl and ($C_2$-$C_{100}$) alkenyl, wherein each $R^{41}$ is optionally substituted with one to three ($C_6$-$C_{12}$) aryl groups and is optionally bonded to the skeleton of Formula 9a via an oligomer chain composed of up to 25 monomer units selected from conjugated dienes and aromatic vinyl compounds; each $M^2$ is independently selected from lithium, sodium and potassium; and k, l and q are integers independently selected from 0, 1, 2 and 3;

$A^1$, $A^2$ and $A^3$ are independently selected from Formula 3 to Formula 8:

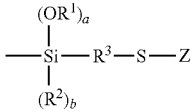

Formula 3 wherein each $R^1$ is independently selected from ($C_1$-$C_{16}$) alkyl;

each $R^2$ is independently selected from ($C_1$-$C_{16}$) alkyl, ($C_6$-$C_{18}$) aryl and ($C_7$-$C_{18}$) aralkyl;

a and b are integers independently selected from 0, 1 and 2, with a+b=2;

$R^3$ is independently selected from divalent ($C_1$-$C_{16}$) alkyl, divalent ($C_6$-$C_{18}$) aryl, divalent ($C_7$-$C_{18}$) aralkyl and —$R^4$—O—$R^5$—, wherein $R^4$ and $R^5$ are independently selected from divalent ($C_1$-$C_6$) alkyl; and Z is independently selected from ($C_1$-$C_{16}$) alkyl, ($C_6$-$C_{18}$) aryl, ($C_7$-$C_{18}$) aralkyl, (C=S)—S—$R^6$, wherein $R^6$ is selected from ($C_1$-$C_{16}$) alkyl, ($C_6$-$C_{18}$) aryl and ($C_7$-$C_{18}$) aralkyl, and —$M^1(R^7)_c(R^8)_d$, wherein $M^1$ is silicon or tin, each $R^7$ is independently selected from ($C_1$-$C_{16}$) alkyl, ($C_6$-$C_{18}$) aryl and ($C_7$-$C_{18}$) aralkyl;

each $R^8$ is independently selected from —S—$R^3$—Si(OR¹)r(R²)s, wherein $R^1$, $R^2$ and $R^3$ are as defined for Formula 3, r is an integer independently selected from 1, 2 and 3 and s is an independently integer selected from 0, 1 and 2, with r+s=3;

c is an integer independently selected from 2 and 3; d is an integer independently selected from 0 and 1; and c+d=3;

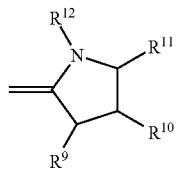

Formula 4

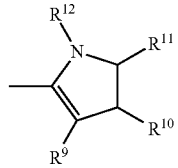

Formula 5 wherein $R^9$, $R^{10}$, $R^{11}$ and $R^{12}$ are independently selected from hydrogen, ($C_1$-$C_{16}$) alkyl, ($C_6$-$C_{16}$) aryl and ($C_7$-$C_{16}$) aralkyl;

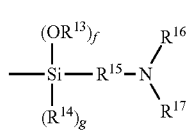

Formula 6

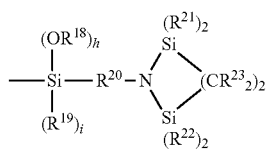

Formula 7 wherein each $R^{13}$, $R^{14}$, $R^{18}$ and $R^{19}$ is independently selected from ($C_1$-$C_{16}$) alkyl;

$R^{15}$ and $R^{20}$ are independently selected from divalent ($C_1$-$C_{16}$) alkyl, divalent ($C_6$-$C_{18}$) aryl, divalent ($C_7$-$C_{18}$) aralkyl and —$R^{24}$—O—$R^{25}$—, wherein $R^{24}$ and $R^{25}$ are independently selected from divalent ($C_1$-$C_{16}$) alkyl;

$R^{16}$ and $R^{17}$ are independently selected from ($C_1$-$C_{16}$) alkyl and —$SiR^{26}R^{27}R^{28}$, wherein $R^{26}$, $R^{27}$ and $R^{28}$ are independently selected from ($C_1$-$C_{16}$) alkyl, ($C_6$-$C_{18}$) aryl and ($C_7$-$C_{18}$) aralkyl;

each $R^{21}$ and $R^{22}$ is independently selected from ($C_1$-$C_{16}$) alkyl, ($C_6$-$C_{18}$) aryl and ($C_7$-$C_{18}$) aralkyl;

each $R_{23}$ is independently selected from hydrogen and ($C_1$-$C_6$) alkyl;

f, g, h and i are integers independently selected from 0, 1 and 2; f+g=2; and h+i=2;

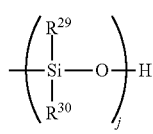

Formula 8 wherein each $R^{29}$ and $R^{39}$ is independently selected from ($C_1$-$C_{16}$) alkyl, ($C_6$-$C_{18}$) aryl, ($C_7$-$C_{18}$) aralkyl and vinyl; and j is an integer selected from 1 to 200; and wherein the amount of the polymer of Formula 1 is 15 to 85% by mole based on the total amount of polymer of Formula 1 and polymer of Formula 2.

2. The polymer composition according to claim 1 further comprising (i) components which are added to or formed as a result of a polymerization process used for making the polymers of Formula 1 and 2, (ii) components which remain after solvent removal from the polymerization process, and mixtures thereof.

3. The polymer composition according to claim 2, wherein the one or more further components are selected from extender oils, stabilizers and further polymers which are not a polymer of Formula 1 or Formula 2.

4. The polymer composition according to claim 1 which comprises one or more components which are added after the polymerization process, selected from one or more fillers, one or more further polymers which are not a polymer of Formula 1 or Formula 2, and one or more crosslinking agents.

5. The polymer composition according to claim 4 which comprises one or more crosslinking agents.

6. The polymer composition according to claim 1, wherein the polymers of Formula 1 and Formula 2 constitute at least 15% by weight of the polymer present.

7. The polymer composition according to claim 6, wherein the polymers of Formula 1 and Formula 2 constitute at least 30% by weight of the polymer present.

8. The polymer composition according to claim 1, wherein $A^1$, $A^2$ and $A^3$ are independently selected from Formula 3 as defined in claim 1.

9. The polymer composition according to claim 1, wherein in the compound of Formula 9a
$M^2$ is lithium;
$R^{41}$ is selected from $(C_1-C_{10})$ alkyl;
each $R^{31}$ is independently selected from hydrogen and $(C_1-C_{10})$ alkyl;
$R^{32}$ and $R^{34}$ are identical and are selected from hydrogen and $(C_1-C_{18})$ alkyl;
each $R^{33}$ is independently selected from hydrogen and $(C_1-C_{18})$ alkyl.

10. The polymer composition according to claim 1, wherein $P^1$ and $P^2$ are each independently selected from homopolymers of butadiene and isoprene, random or block copolymers of butadiene and isoprene, butadiene and styrene, and isoprene and styrene, and random or block terpolymers of butadiene, isoprene and styrene.

11. The polymer composition according to claim 1, wherein aromatic vinyl monomers constitute from 2 to 55% by weight of the polymers $P^1$ and $P^2$.

12. A method of preparing the polymer composition as defined in claim 1, the method comprising:
i) reacting a polymerization initiator mixture obtained by reacting a compound of Formula 9:

Formula 9

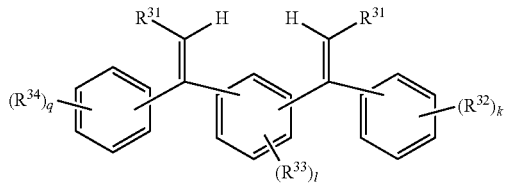

wherein each $R^{31}$ is independently selected from hydrogen, $(C_1-C_{10})$ alkyl, $(C_6-C_{12})$ aryl and $(C_7-C_{18})$ aralkyl; each $R^{32}$, $R^{33}$ and $R^{34}$ is independently selected from hydrogen, $(C_1-C_{18})$ alkyl and $(C_1-C_{18})$ alkoxy; k, l and q are integers independently selected from 0, 1, 2 and 3, with a compound of Formula 10:

$$M^2-R^{41} \quad \text{Formula 10}$$

wherein $M^2$ is selected from lithium, sodium and potassium and $R^{41}$ is selected from $(C_1-C_{100})$ alkyl and $(C_2-C_{100})$ alkenyl, wherein each $R^{41}$ is optionally substituted with one to three $(C_6-C_{12})$ aryl groups and is optionally bonded to $M^2$ via an oligomer chain composed of up to 25 monomer units selected from conjugated dienes and aromatic vinyl compounds;

with one or more polymerizable monomers selected from conjugated dienes and aromatic vinyl compounds to obtain living polymer chains, wherein the living polymer chains contain at least 40% by weight of repeating units obtained by polymerization of said conjugated dienes, and wherein the molar ratio of compounds of Formula 10 to compounds of Formula 9 is in the range of from 1:1 to 8:1, and ii) reacting the living polymer chains of step i) with one or more chain end-modifying agents selected from compounds of Formula 11 to Formula 15:

Formula 11

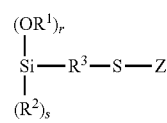

wherein $R^1$, $R^2$, $R^3$, Z, r and s are as defined for Formula 3 in claim 1;

Formula 12

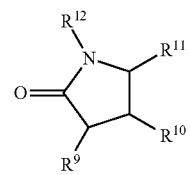

wherein $R^9$, $R^{10}$, $R^{11}$ and $R^{12}$ are as defined for Formula 4 in claim 1;

Formula 13

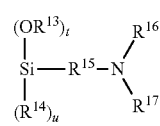

wherein $R^{13}$, $R^{14}$, $R^{15}$, $R^{16}$ and $R^{17}$ are as defined for Formula 6 in claim 1; t is an integer selected from 1, 2 and 3; u is an integer selected from 0, 1 and 2; and t+u=3;

Formula 14

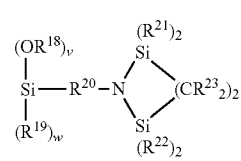

wherein $R^{18}$, $R^{19}$, $R^{20}$, $R^{21}$, $R^{22}$ and $R^{23}$ are as defined for Formula 7 in claim 1; v is an integer selected from 1, 2 and 3; w is an integer selected from 0, 1 and 2; and v+w=3;

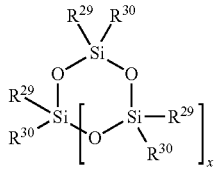

Formula 15 wherein each $R^{29}$ and $R^{30}$ is as defined for Formula 8 in claim 1; and x is an integer selected from 1 to 6; and
wherein chain end-modifying agents of Formula 11 to Formula 15 are used in a total amount of
(i) 0.15 to 0.85 moles per mole of compounds of Formula 10 when the molar ratio of compounds of Formula 10 to compounds of Formula 9 is in the range of from 1:1 to 2.1:1, and
(ii) 0.5 to 3 moles per mole of compounds of Formula 10 when the molar ratio of compounds of Formula 10 to compounds of Formula 9 is in the range of from more than 2.1:1 to 8:1.

13. The method according to claim 12, wherein in the compound of Formula 9
each $R^{31}$ is independently selected from hydrogen and $(C_1-C_{10})$ alkyl, preferably hydrogen;
$R^{32}$ and $R^{34}$ are identical and are selected from hydrogen and $(C_1-C_{18})$ alkyl;
each $R^{33}$ is independently selected from hydrogen and $(C_1-C_{18})$ alkyl; and
in the compound of Formula 10
$M^2$ is lithium; and
$R^{41}$ is selected from $(C_1-C_{10})$ alkyl.

14. The method according to claim 12, wherein the molar ratio between the compound of Formula 10 and the compound of Formula 9 is in the range of from 1.5:1 to 8:1.

15. The method according to claim 12, wherein the molar ratio of the compound of Formula 10 to the compound of Formula 9 is in the range of 2.1:1 to 7:1.

16. The method according to claim 12, wherein the one or more chain end-modifying agents are selected from compounds of Formula 11 as defined in claim 11.

17. The method according to claim 12, wherein one or more components selected from a randomizer agent and a coupling agent is added.

18. The method according to claim 17, wherein the coupling agent is divinylbenzene.

19. A crosslinked polymer composition which is obtained by crosslinking the polymer composition as defined in claim 5.

20. An article comprising at least one component formed from a crosslinked polymer composition as defined in claim 19.

21. The article according to claim 20 which is a tire, a tire tread, a tire side wall, an automotive part, a footwear component, a golf ball, a belt, a gasket, a seal or a hose.

* * * * *